United States Patent [19]
Sipila

[11] Patent Number: 6,081,534
[45] Date of Patent: Jun. 27, 2000

[54] IMPLEMENTATION OF MUTUAL RATE ADAPTATIONS IN DATA SERVICES BETWEEN GSM AND DECT

[75] Inventor: Tuomo Sipila, Espoo, Finland

[73] Assignee: Nokia Mobile Phones, Ltd., Salo, Finland

[21] Appl. No.: 08/659,590

[22] Filed: Jun. 6, 1996

[30] Foreign Application Priority Data

Jun. 7, 1995 [FI] Finland ................................... 952813

[51] Int. Cl.$^7$ .................................................. H04L 12/66
[52] U.S. Cl. .......................................... 370/466; 455/426
[58] Field of Search ..................... 370/466, 467, 370/469; 455/426, 449

[56] References Cited

U.S. PATENT DOCUMENTS

| 5,367,558 | 11/1994 | Gillig et al. | 379/59 |
| 5,369,636 | 11/1994 | Ueno et al. | 370/84 |
| 5,384,824 | 1/1995 | Alvesalo | 379/59 |
| 5,600,705 | 2/1997 | Maenpaa | 379/58 |

FOREIGN PATENT DOCUMENTS

| 0 415 502 A2 | 3/1991 | European Pat. Off. . |
| 0 559 957 A2 | 9/1993 | European Pat. Off. . |
| WO 93/00778 | 1/1993 | WIPO . |
| WO 95/25407 | 9/1995 | WIPO . |

OTHER PUBLICATIONS

J.L. Moughton, "Adapting To The ISDN–Which Rate Adaption Scheme Should I Use?", IEE, International Conference on Data Transmission–Advances in Modem and ISDN Technology and Applications (Conf. Publ. No. 356), pp. 94–99, Sep. 1992.

B. Rashidzadeh et al., "Prospects For A Common Air Interface For Cellular And Cordless Systems", Fifth International Conference on Mobile Radio and Personal Communications (Conf. Publ. No. 315), pp. 162–166, Dec. 1989.

F.C. Owen, "The DECT Radio Interface", IEE Colloquium on 'CT2/CAI and DECT Cordless Telecommunications' (Digest No. 165), pp. 7/1–6, Nov. 1990.

A. Elberse, "DECT: The Ideal Telework Access Technology", IEE Colloquium on 'Teleworking and Teleconferencing' (Digest No. 1994/144), pp. 7/1–9, Jun. 1994.

2nd International Conference on Universal Personal . . . , vol. 1, 1993, (New York), Olanders Peter, "The role of Cordless Communications in PCS" p. 269–p. 273.

Primary Examiner—Melvin Marcelo
Attorney, Agent, or Firm—Perman & Green, LLP

[57] ABSTRACT

The invention relates to a method and equipment with which it is possible to use data services of a cellular telecommunication system, especially the GSM system, from a terminal (26) belonging to a second cellular telecommunication system, especially the DECT system. According to the invention, it is added to the base station (20) of said second telecommunication system the means (22, 23, 24, 27, 28, 30, 32, 34) required for performing the rate adaptations and mappings with which the transferred data are converted from the format of said first telecommunication system to the format of said second telecommunications system and vice versa. All changes to the current systems as required by applying the invention are made in the base station (20) near its interface to the switching center (1), so there will be no changes as regards the user and the operation of the switching centre.

23 Claims, 13 Drawing Sheets

IMPLEMENTATION OF MUTUAL RATE ADAPTATIONS IN DATA SERVICES BETWEEN GSM AND DECT

FIELD OF THE INVENTION

The invention relates in general to the operation of a switching center and base station equipment in data communication networks, an in particular to the arrangement of their rate and protocol adaptations required for using data services provided by a cellular telecommunication system, especially the GSM system, from a terminal belonging to another cellular telecommunication system, especially the DECT system.

BACKGROUND OF THE INVENTION

In digital data communications there are known several internationally standardized systems and network implementations based on them. A user of a data communication service is usually not interested in the technical details of the system or network that conveys his or her message. From the user's point of view user-friendliness means that various networks and systems can be made to work together in a versatile and reliable way, thus making it possible to use a variety of services from a terminal of any one system. In the description below we will use the GSM and DECT systems as examples.

The data communication services of both the GSM (Groupe Speciale Mobile/Global System for Mobile Communications) system and the DECT (Digital European Cordless Telecommunications) system are widely used in Europe. In both systems the principle is the same: the user has a small and lightweight portable terminal which for data communication purposes is radio-linked to a fixed base station which in turn is linked in a fixed manner to a switching centre equipment controlling the operation of the system. The systems employ different standardized functions for packetizing, encoding and modulating the data to be transferred. Data is handled according to so-called protocols, which are known to those skilled in the art. The GSM system protocols relevant to this invention and instructions for their implementation are described e.g. in the "The GSM System for Mobile Communications" by Michel Mouly and Marie-Bernadette Pautet, published by the authors, ISBN 2-9507190-0-7, Palaiseau 1992, 701 pp. The DECT system protocols relevant to this invention and instructions for their implementation are described e.g. in the following standards and documents: ETS 300 175-1 to 300 175-8, prETS 300 444, prETS 300 331, I-ETS 300 176, ETR 015, ETR 043, ETR 056, prETS 300 466, ETS 300 370 and ETS 300 xxx: "Radio Equipment and Systems (RES); Digital European Cordless Telecommunications (DECT) Data services profile, Generic data link service, Service Type C, Class 2".

It is known to connect a DECT base station, called a fixed part (FP), directly to a GSM mobile switching centre (MSC), thus making it possible to have a speech connection from a mobile telephone in a DECT system to another telephone through a GSM network. The methods so far have not, however, provided the possibility of using the varied range of GSM system data services during such a connection since there has not been a method of implementing the rate adaptations required by these services in the data communication between the systems.

OBJECTS AND SUMMARY OF THE INVENTION

It is an object of this invention to provide a method for using data services provided by a first telecommunication system from a terminal belonging to a second system. It is also an object of this invention to provide a method for implementing the rate adaptations required by the GSM system in the data communication between the DECT and GSM systems. It is a further object of the invention to provide a particularly advantageous method for implementing said rate adaptations.

These objects are achieved by placing the adaptation functions and communication protocols required by said first system in the base station of said second system, preferably in its interworking unit (IWU).

It is characteristic of the method according to the invention that the rate adaptations and mappings for converting the transferred data from/to the format of said first telecommunication system to/from the format of said second telecommunication system take place in said base station.

The invention also relates to equipment for implementing the method mentioned above. It is characteristic of the equipment according to the invention, including a base station, that said base station includes means for carrying out the rate adaptations and mappings with which the transferred data are converted from/to the format of said first telecommunication system to/from the format of said second telecommunication system.

The GSM system includes very precisely standardized definitions of data communication protocols and their implementation. One of the advantageous features of the GSM system is the permanence of its standards: changing of definitions is not common. On the other hand, this has been considered a disadvantage because it has been felt that adapting the system to interwork with another system is difficult. For example, in the interworking adaptation of the GSM and DECT systems, the aim has been not to make any changes in the standard GSM switching centre.

The invention is based on an idea according to which the GSM standards are partly transferred to the DECT system. In order for the changes in the DECT system to be as small as possible from the point of view of an ordinary user, the adaptation between the DECT and GSM standards is proposed to be placed near the system interface. In a preferable embodiment of the invention the adaptations are placed in the DECT base station, advantageously in its interworking unit (IWU).

The idea of the invention can be applied to all systems in which the switching centre equipment is standardized so rigorously that no changes can be made in it, but in which changes in the base station equipment are possible. When applying the idea of the invention to data communication between systems other than the DECT and GSM, the standards mentioned in this description that refer to said systems naturally have to be replaced by standards of the systems in question.

BRIEF DESCRIPTION OF THE DRAWING

The invention is further described using the embodiment mentioned above as an example and referring to the accompanying drawing in which.

DETAILED DESCRIPTION OF THE INVENTION

Corresponding parts in the figures have the same reference numbers. The description below and the accompanying drawing concentrate on describing circuit switched data services which are used as an example. However, the method according to the invention can also be used in connection with packet switched data services.

Figure 1:
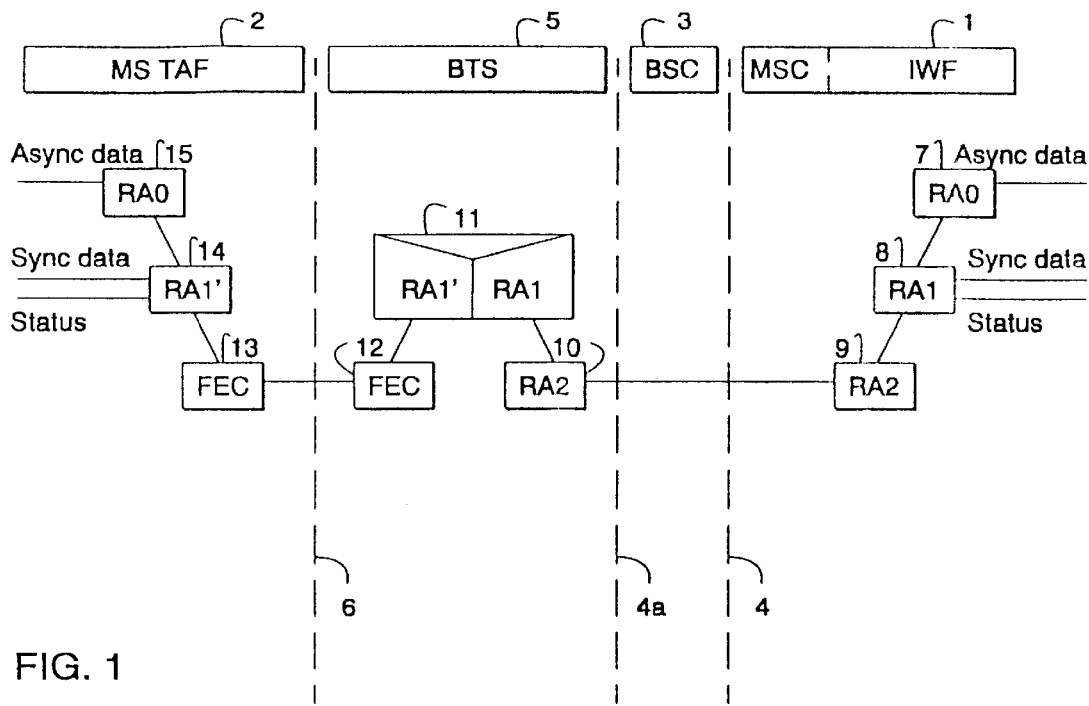
FIG. 1 shows a known arrangement for providing transparent circuit switched data services in a GSM network.
Figure 2:
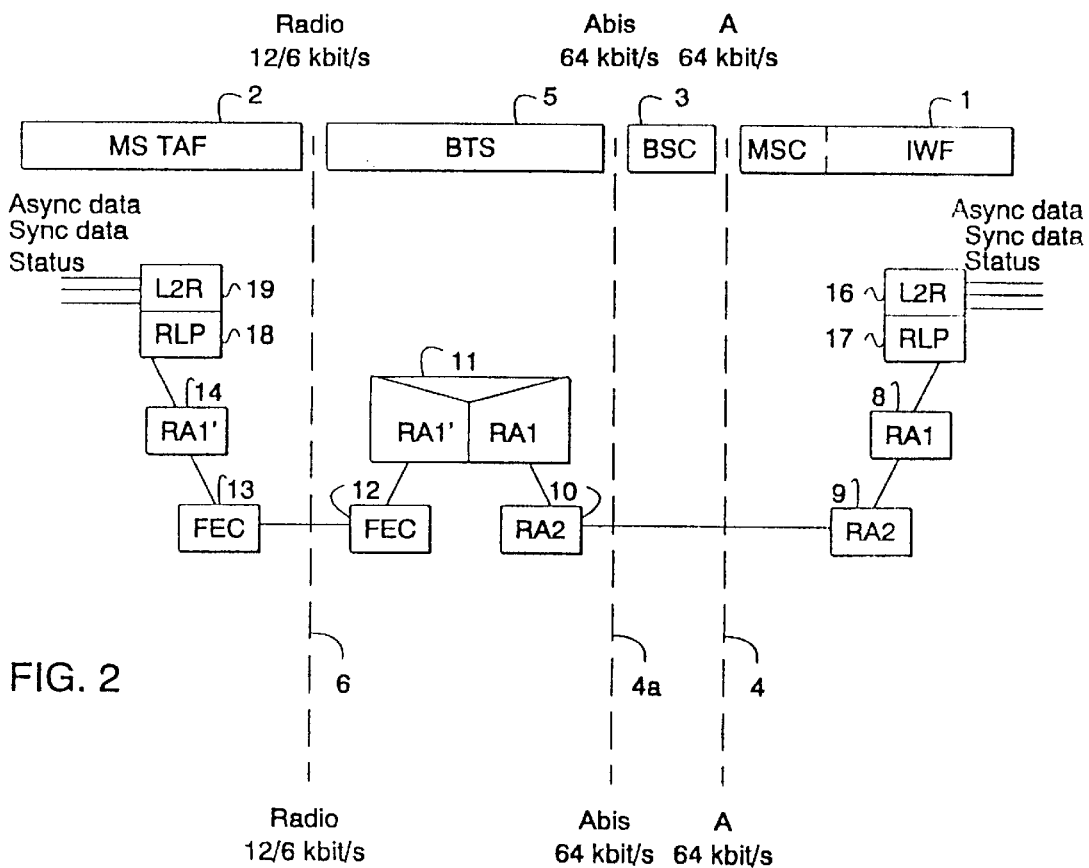
FIG. 2 shows a known arrangement for providing non-transparent circuit switched data services in a GSM network.

First, referring to FIGS. 1 and 2, arrangements are described which, though they are known, are essential for understanding the invention, namely, arrangements for implementing data communication in the GSM system.

The following bearer services are known in the GSM system:

data circuit duplex asynchronous: rates 300, 1200, 1200/75, 2400, 4800 and 9600 bit/s, transparent and non-transparent (T/NT), data circuit duplex synchronous: rates 1200, 2400, 4800 and 9600 bit/s, transparent and non-transparent (T/NT), PAD access circuit asynchronous (PAD=packet assembler/disassembler): rates 300, 1200, 1200/75, 2400, 4800 and 9600 bit/s, transparent and non-transparent (T/NT), data packet duplex synchronous: rates 2400, 4800 and 9600 bit/s, transparent and non-transparent (T/NT), alternate speech/unrestricted data: during a call it is possible to alternate between speech and data connection, transparent and non-transparent (T/NT), speech followed by data: after a speech connection of a certain duration the user can switch to a data connection during the same call but not back to speech again, transparent and non-transparent (T/NT), 12 kbit/s unrestricted digital, used only inside GSM.

Transparent and non-transparent data transmission imply that it is possible to have automatic error correction in the data communication. Error correction is not used in transparent data transmission, whereby the transmission rate is constant and the error ratio varies according to the network load situation and connection quality. In non-transparent data transmission the sending device packetizes the data into radio link protocol (RLP) frames which are numbered. If the receiving device does not receive a frame correctly, it may request a retransmission of the frame in question. In non-transparent data transmission the error ratio is constant, but the transmission rate varies according to the network load situation and connection quality.

Teleservices of a higher hierarchy level, such as the facsimile group 3 known to one skilled in the art, use one of the above-mentioned bearer services to convey the data from the sending terminal through a GSM network to the receiving terminal. With the exception of the 12 kbit/s unrestricted digital data transmission all services mentioned are based on synchronous/asynchronous and transparent/non-transparent data communication at 9600 bit/s at the most. However, since the communication between the switching centre equipment (MSC) and the base station controller (BSC) controlling the operation of the base station occurs at 64 kbit/s, various rate adaptations (RA) are needed in the system.

FIG. 1 is a schematic representation of a known transparent circuit switched connection between a GSM switching centre 1 and GSM terminal 2. The switching centre 1 is connected to a base station controller 3. The interface 4 between the switching centre 1 and base station controller 3 is generally called the A interface. It conforms to the CCITT (ComitéConsultatif International Télégraphique et Téléphonique) standard G.703 and is capable of providing 64 kbit/s connections multiplexed at 2 Mbit/s. The base station controller 3 is further connected to a GSM base transceiver station 5 (BTS), and the interface 4a between them is called the Abis interface. Between the base transceiver station 5 and terminal 2 there is a radio interface 6.

As shown in FIG. 1, the interworking functions part IWF in the GSM switching centre includes three basic rate adaptations specified in the GSM system standards, performing adaptation according to the CCITT recommendation V.110. The first rate adaptation 7, which will be called RA0 in accordance with the GSM standards, adapts asynchronous data for synchronous transmission. The second rate adaptation 8, called RA1 in accordance with the GSM standards, changes the transmission rate into an intermediate rate, which is 8 or 16 kbit/s, and the third rate adaptation 9, called RA2 in accordance with the GSM standards, changes the transmission rate into 64 kbit/s for transmission across the A interface 4 and Abis interface 4a.

The base transceiver station 5 includes an RA2-type adaptation which adapts the data back to the intermediate rate. The data are taken to a handling block 11, in which the frame according to the V.110 standard is adapted for transmission across the radio interface 6. Before the radio interface 6 the data are taken to a forward error correction (FEC) block 12, which together with a corresponding block 13 on the terminal 2 side improves the reliability of the transmission across the radio interface 6. The terminal 2 includes an RA1 and RA0 type adaptation 14, 15, the first of which reconstructs synchronous data and status information and the latter reconstructs asynchronous data. Transmission in the opposite direction includes substantially the same stages in the reverse order.

FIG. 2 is a schematic representation of a known non-transparent circuit switched connection between a GSM switching centre 1 and GSM terminal 2. The arrangement differs from that of FIG. 1 in that both the switching centre 1 and the terminal 2 include a data protocol block 16, 17; 18, 19 consisting of two sub-blocks which are called L2R (Layer 2 Relay Function) 16; 19 and RLP (Radio Link Protocol) 17; 18. The L2R block 16 of the switching centre 1 arranges the data into protocol data units (PDU) consisting of state octets according to the GSM standard GSM 07.02 which are taken one at a time to the RLP block 17. There the data are arranged into RLP frames according to the GSM standard GSM 04.22, comprising a 16-byte header, a 200-byte information part and a 24-byte frame check sequence (FCS). The complete RLP frames are taken to a rate adaptation including an RA1 type adaptation 8; 14 in the switching centre 1 and terminal 2, and in addition, an RA2 type adaptation 9 in the switching centre.

Below it will be described arrangements according to the invention for implementing data communication between the DECT and GSM, referring to FIGS. 3 to 8.

Figure 3:
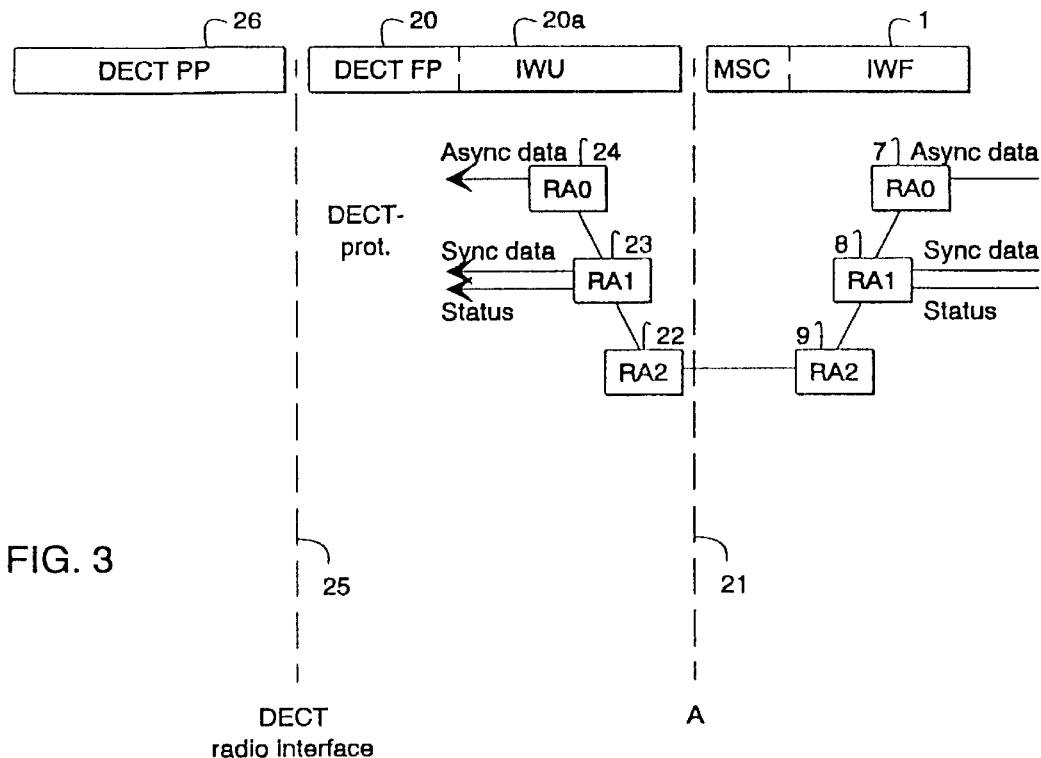
FIG. 3 shows an arrangement according to the invention for providing transparent circuit switched data services between the GSM and DECT systems.

A DECT base station, which is called a fixed part (FP) includes an interworking unit 20a to provide data communication in the direction of the switching centre. If a DECT base station 20 (FP) is connected via an interworking unit 20a to a GSM switching centre 1 in a manner which is known, the transmission rate between them is 64 kbit/s and the interface 21 is called an A interface in the same way as in the GSM system described above. According to the invention, RA0, RA1 and RA2 type rate adaptation blocks 24, 23, 22 corresponding to those in the GSM switching centre 1 are added, as shown in FIG. 3, to the DECT base station 20, preferably to its interworking unit 20a. When data are transferred from the GSM system to a DECT base station, synchronous data and status information flow from the output of an RA1 type block 23 to DECT protocol blocks (not shown) and from there further in the form required by DECT standards across the DECT radio interface 25 to a DECT terminal 26, which is called a portable part (PP). Asynchronous data are obtained from the output of an RA0 type adaptation block 24. When transferring data in the opposite direction, the DECT protocol blocks (not shown) of the base station 20 forward asynchronous data to the RA0 type block 24 and/or synchronous data and status information to the RA1 type block 23, which send the data via the RA2 type block 22 across the A interface 21 towards the GSM base station 1.

Figure 4:
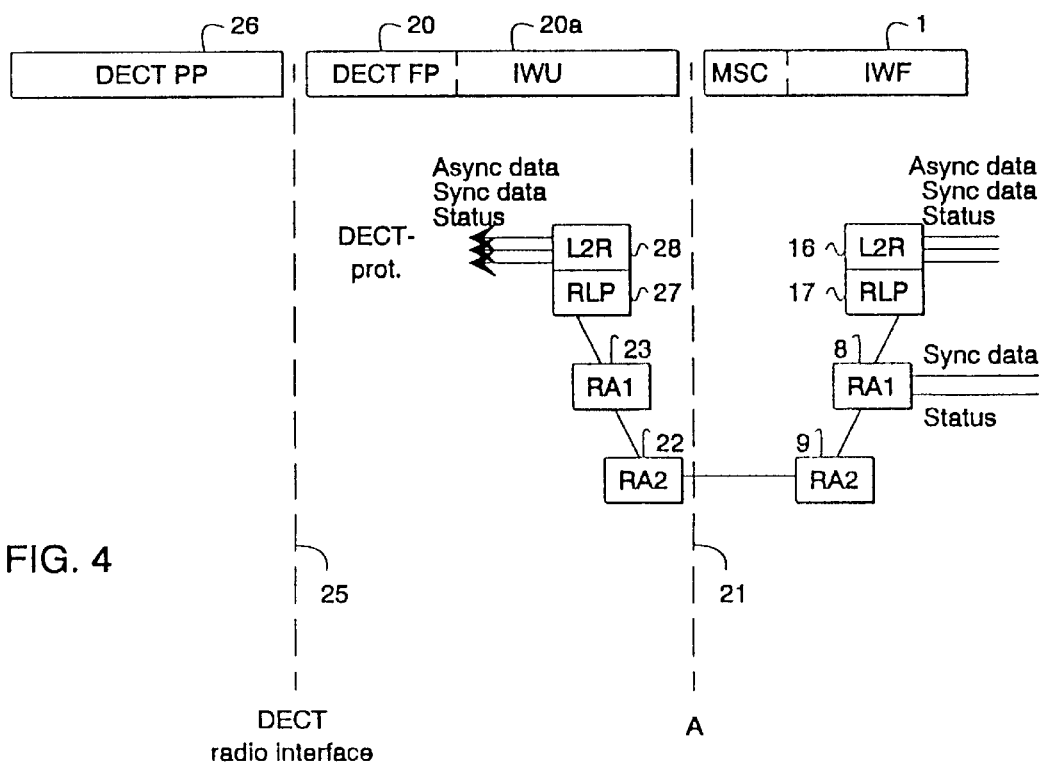
FIG. 4 shows an arrangement according to the invention for providing non-transparent circuit switched data services between the GSM and DECT systems.

FIG. 4 is a schematic representation of the arrangement according to the invention for implementing non-transparent data communication between a GSM switching centre 1 and a DECT base station 20. The same blocks as those in the arrangement of FIG. 2 take part in the operation in the GSM switching centre 1. The DECT base station includes a data protocol block comprising an RLP block 27 and an L2R block the operation of which corresponds to that depicted in FIG. 2 with the exception that the data transferred in the direction of the terminal 26 are taken from the L2R block 28 of the base station further to the protocol blocks (not shown) of the DECT system and further in the form required by the DECT standards across the DECT radio interface 25 to the DECT terminal 26.

It is a substantial feature of the described embodiment of the method according to the invention that the transmission chain conforming to the GSM standards ends in a DECT base station 20, advantageously in its interworking unit 20a. Above it has been described the implementation of RA0, RA1 and RA2 type rate adaptations 24, 23, 22 as well as L2R and RLP type data protocols 28, 27 in an interworking unit 20a of a DECT base station. These blocks are used to implement at the rate of 9600 bit/s at the most the asynchronous or synchronous and transparent or non-transparent data communication mentioned above in connection with the description of GSM bearer services. Above it was also mentioned that these provide a basis for the bearer services listed, and the higher-level telecommunication services in turn use said bearer services. According to the invention, the higher-level blocks that are needed to use said higher-level telecommunication services are also included in the DECT base station 20, preferably in its interworking unit 20a. According to the order specified in the GSM standards, these blocks are placed above the rate adaptations in the base station hierarchy.

Figure 5:
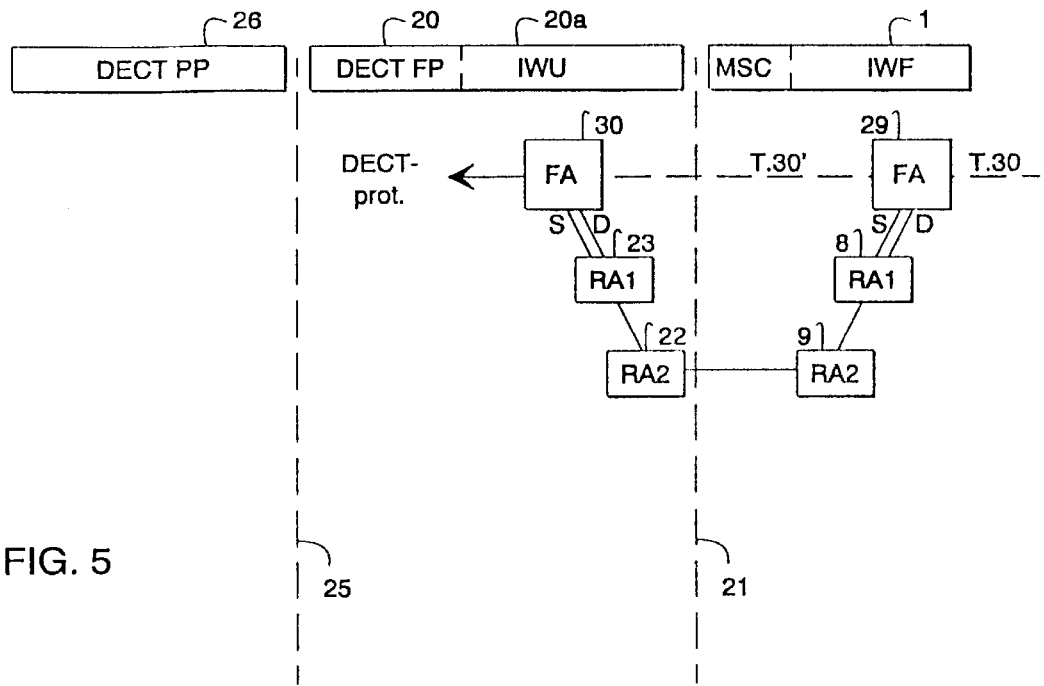
FIG. 5 shows an arrangement according to the invention for providing transparent fax services between the GSM and DECT systems.
Figure 6:
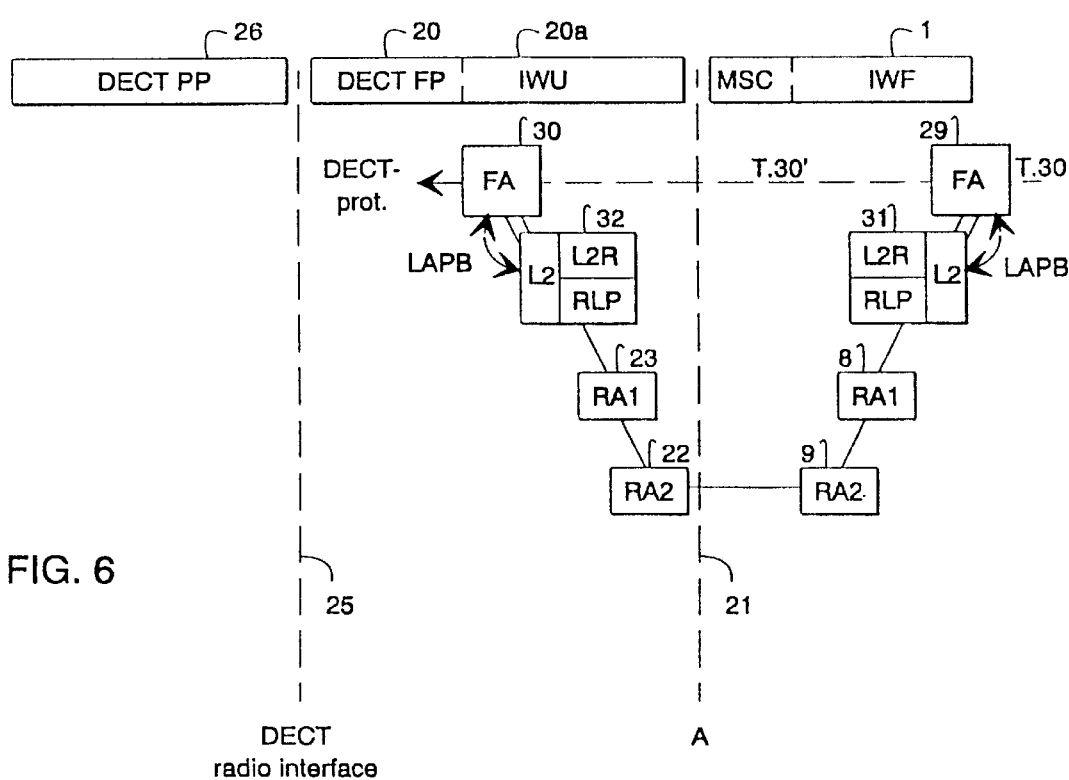
FIG. 6 shows an arrangement according to the invention for providing non-transparent fax services between the GSM and DECT systems.

A fax service according to FIGS. 5 and 6 is presented as an example. FIG. 5 shows an arrangement according to the invention for implementing transparent fax transmission between a GSM switching centre 1 and a DECT base station 20. Both the switching centre 1 and the base station 20 include a fax adapter (FA) 29; 30 conforming to the T.30 standard, placed above the RA1 type rate adaptation block 8; 23 in the hierarchy. Letters S and D emphasize that according to the T.30 standard the connection can be used to transmit both status information (S) and data (D). In non-transparent fax service there is, as shown in FIG. 6, between the RA1 type rate adaptation 8; 23 and the fax adapter 29; 30 a data protocol block 31; 32 that includes L2R and RLP type sub-blocks for implementing error correction in the same way as described above with reference to FIG. 4.

Figure 7:
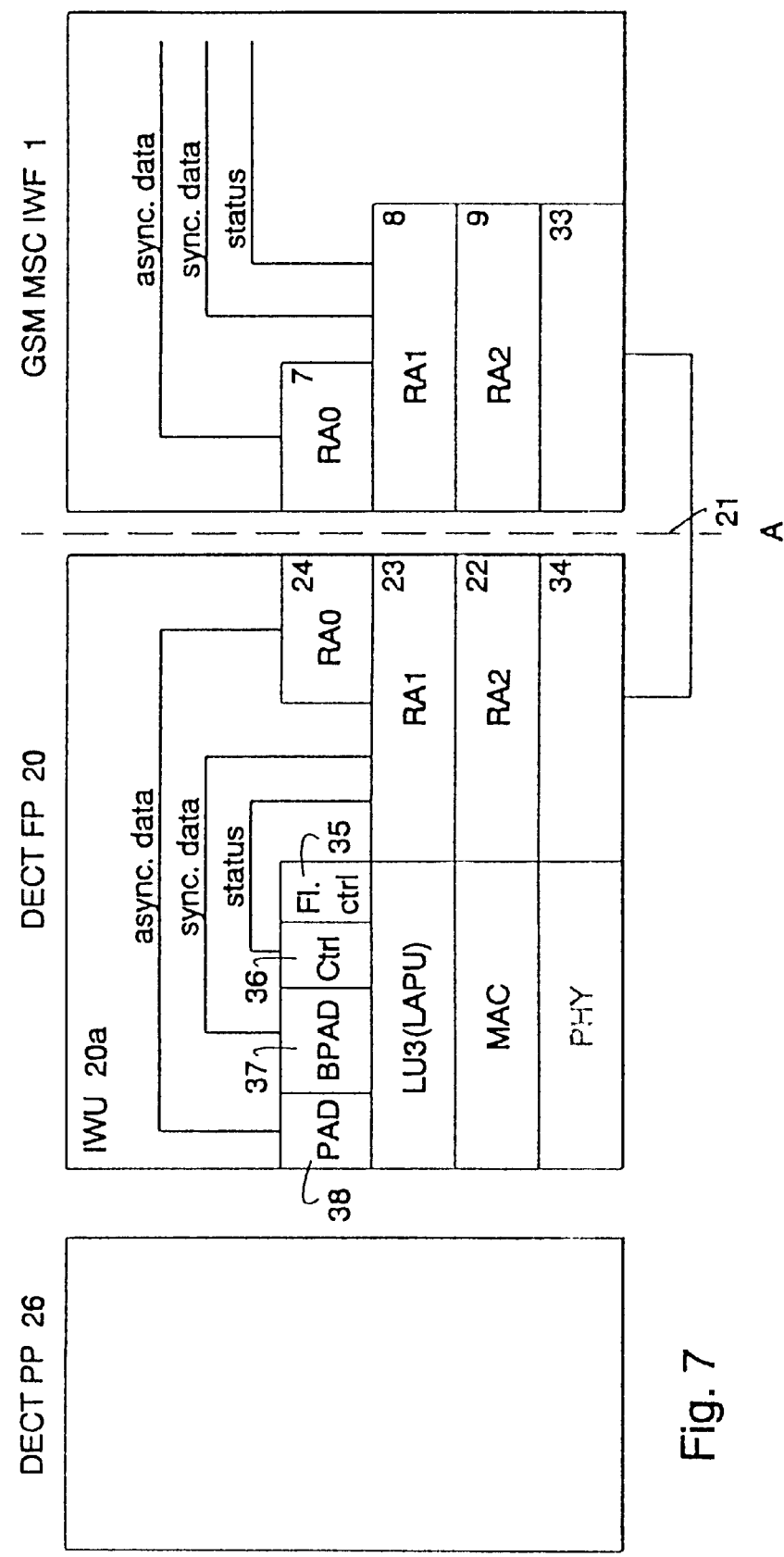
FIG. 7 shows more closely the flow of data between the functional blocks of a base station using the method according to the invention in a case according to FIG. 3.

Next, referring to FIGS. 7 and 8, it will be described in greater detail the implementation of the method according to the invention with emphasis on how the data flow between the DECT and GSM blocks in a DECT base station. The arrangement of FIG. 7 is a more detailed representation of the case depicted in FIG. 3 dealing with transparent data communication according to the invention between a GSM switching centre 1 and a DECT base station 20. FIG. 7 includes the lower levels 33, 34 which were not shown in the earlier figures but which in all cases participate in the physical transmission of the signal between different devices, as is clear to a person skilled in the art. In a situation depicted in FIG. 7, the status information included in the data flows in a DECT base station 20 between an RA1 type rate adaptation block 23 conforming to the GSM standards and a Ctrl block 36 conforming to the DECT standards. Similarly, synchronous data flow between said RA1 block 23 and a BPAD block 37 conforming to the DECT standards, and asynchronous data flow between an RA0 type adaptation block 24 conforming to the GSM standards and a PAD block 38 conforming to the DECT standards. The base station 20 also includes other blocks conforming to the DECT standards which in the operations hierarchy are placed below said Ctrl, BPAD and PAD blocks 36, 37, 38 and the Fl.ctrl block 35 at the same level with them.

Figure 8:
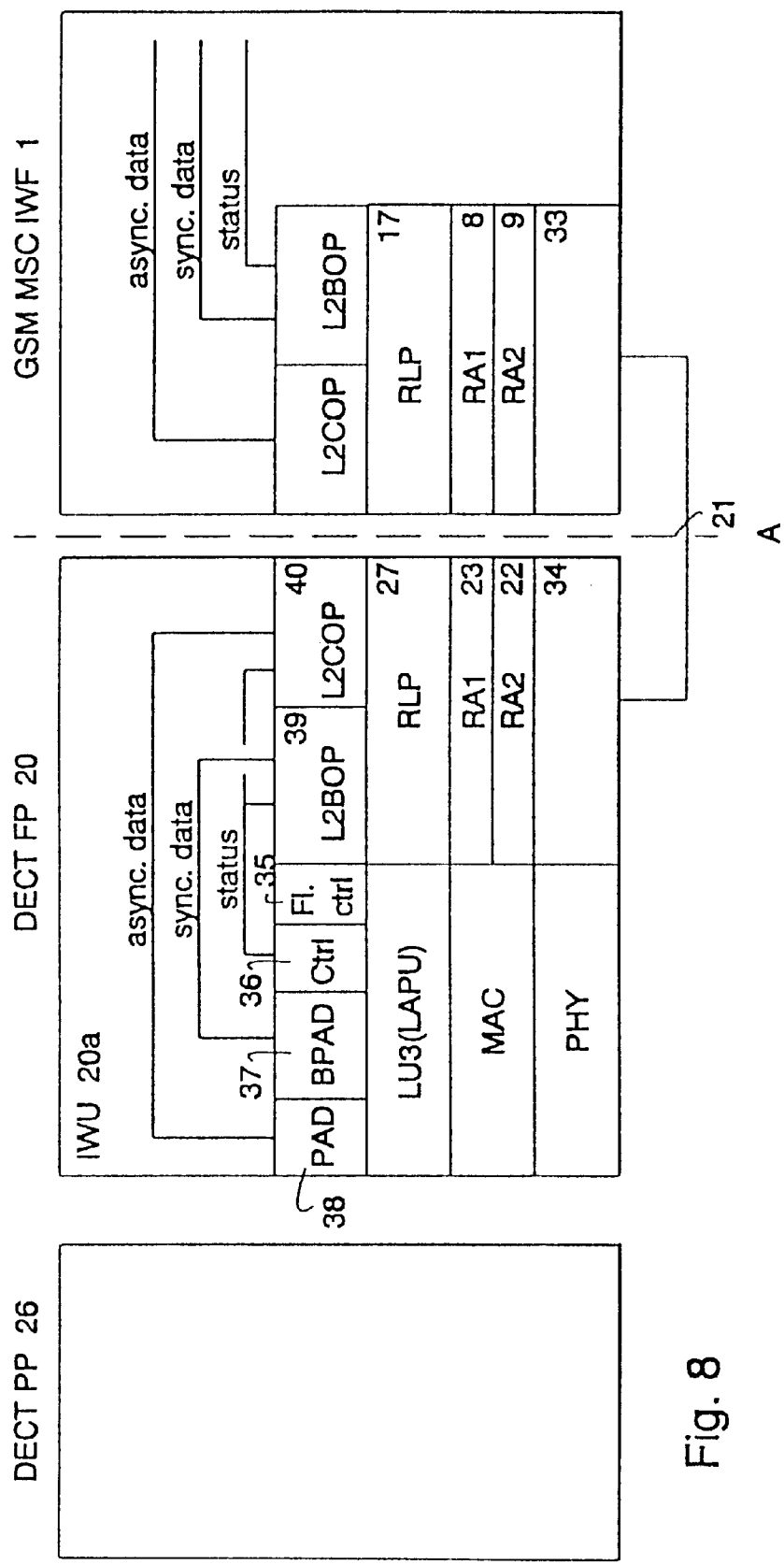
FIG. 8 shows more closely the flow of data between the functional blocks of a base station using the method according to the invention in a case according to FIG. 4.

Similarly, FIG. 8 is a more detailed representation of the situation depicted in FIG. 4 dealing with non-transparent data communication according to the invention between a GSM switching centre 1 and a DECT base station 20. In FIG. 7 an L2R protocol block 28 as shown in FIG. 4 is further divided into a synchronous sub-block 39 (L2BOP, Layer 2 Bit Oriented Protocol) and an asynchronous sub-block 40 (L2COP, Layer 2 Character Oriented Protocol), the first of which is connected to a BPAD block 37 conforming to the DECT standards and the second to a PAD block 38 conforming to the DECT standards. FIGS. 7 and 8 show that the arrangement according to the invention is both in transparent (FIGS. 3 and 7) and in non-transparent data communication (FIGS. 4 and 8) connected to the same blocks 36, 37, 38 conforming to the DECT standards since in the DECT system the radio interface 25 and accordingly the operation of the DECT base station conforming to the standards is identical in both transmission methods.

Data communication conversions between the GSM format and DECT format are shown in detail in tables of the accompanying Appendices A and B of which the "DECT/GSM interworking of bearer services: implementation description, complete coding mapping of GSM and DECT elements" (Appendix A) concerns the first embodiment of the method according to the invention and the "DECT/GSM interworking of bearer services: implementation description, transparent coding transportation of the Bearer Capability" (Appendix B) concerns the second embodiment of the method according to the invention.

Next, referring to FIGS. 9a to 9e, it will be described in greater detail the setting up of a data call between a DECT terminal, a base station employing the method of the invention and a GSM switching centre. The purpose of this description is to illustrate those new functions related to the setup of a data call that are included in a base station employing the method of the invention. FIGS. 9a to 9e show a DECT terminal 26, a base station 20 employing the method of the invention and a GSM switching centre 1. The arrows represent messages between equipment and they are arranged in temporal order so that in each figure time flows from top down. For reasons of clarity, the message, parameter and record names related to the DECT standard are typed in upper-case letters in the description, and the corresponding names related to the GSM standard are typed in lower-case letters.

Setting up of a data call originated by a terminal 26 (FIGS. 9a to 9c) is performed largely in the same manner as defined in the ETS 300 370 standard, but in the so-called service negotiation procedure there are some differences depending on what kind of operation the base station 20 supports. The negotiable parameter is in this case the code <<modem type>> referring to the type of the modem. The minimum requirement for the base station operation is the "negotiation not possible" function according to FIG. 9a. To provide this function, no changes are required in the operation of the base station 20 as regards the ETS 300 370 standard. As the interworking unit 20a (not shown) of the base station 20 receives the CC-SETUP message 41 sent by the terminal 26, and the <<NEGOTIATION INDICATOR FIELD>> of the message indicates that the service negotiation is not possible, the interworking unit sends a "Setup" message 42 to the switching centre but prevents negotiation with the switching centre 1. This means that if the switching centre 1 indicates in the "Call proceeding" message 43 that it cannot provide the service requested by the terminal 26, the connection is disconnected using the CC-RELEASE-COM message 44 to the terminal 26 (with the notice "Incompatible service" in the <<RELEASE REASON>> field) and the "Release Complete" message 45 to the switching centre 1.

Figure 9A:
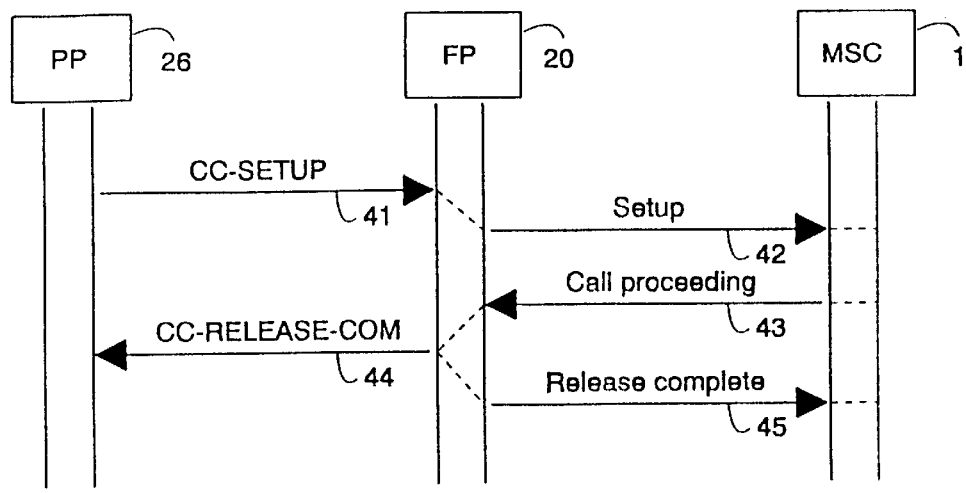
FIG. 9a shows the messages exchanged between a terminal, a base station using the method of the invention and a switching centre when the terminal is setting up a data call.
Figure 9B:
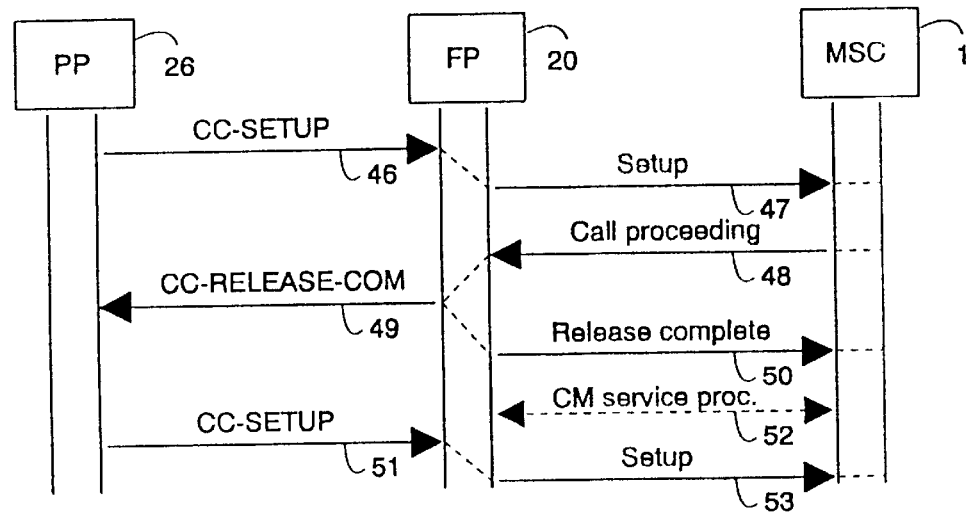
FIG. 9b shows an alternative procedure for the case of FIG. 9a, FIG. 9c shows a second alternative procedure for the case of FIG. 9a, FIG. 9d shows the messages exchanged between a terminal, a base station using the method of the invention and a switching centre when the terminal is receiving a data call.

A second possible procedure for the base station 20 is shown in FIG. 9b. When the interworking unit 20a (not shown) of the base station 20 receives the CC-SETUP message 46 sent by the terminal 26, and the <<NEGOTIATION INDICATOR FIELD>> contains a value representing the message "Exchange parameter negotiation", the interworking unit either rejects the negotiation request directly with the message "Negotiation not supported" (not shown) if the base station does not support service negotiation, or it maps the <<IWU-ATTRIBUTES>> and <<END-TO-END-COMPATIBILITY>> records conforming to the DECT standard into the <<bearer capability>> record conforming to the GSM standard in the manner described in tables 7, 11 and 12 of the accompanying document "DECT/GSM interworking of bearer services: implementation description, complete coding mapping of GSM and DECT elements" (Appendix A) and sends this record to the switching centre 1 in the "Setup" message 47.

If after that the switching centre 1 sends to the base station 20 a "Call proceeding" message 48 with new values in the <<bearer capability>> record, the base station will map those values into the <<IWU-ATTRIBUTES>> and <<END-TO-END-COMPATIBILITY>> records in the CC-RELEASE-COM message 49 sent to the terminal 26 and send a "Release complete" message 50 toward the switching centre 1. Then the terminal 26 may start the process anew by sending a CC-SETUP message 51 containing the new values, after which the data call setup continues according to the manner 52, 53 defined in the ETS 300 370 standard. If the switching centre did not send a "Call proceeding" message or if the message sent did not contain the <<bearer capability>> record, the intermediate stage 49, 50, 51 is not included in the data call setup procedure.

Figure 9C:
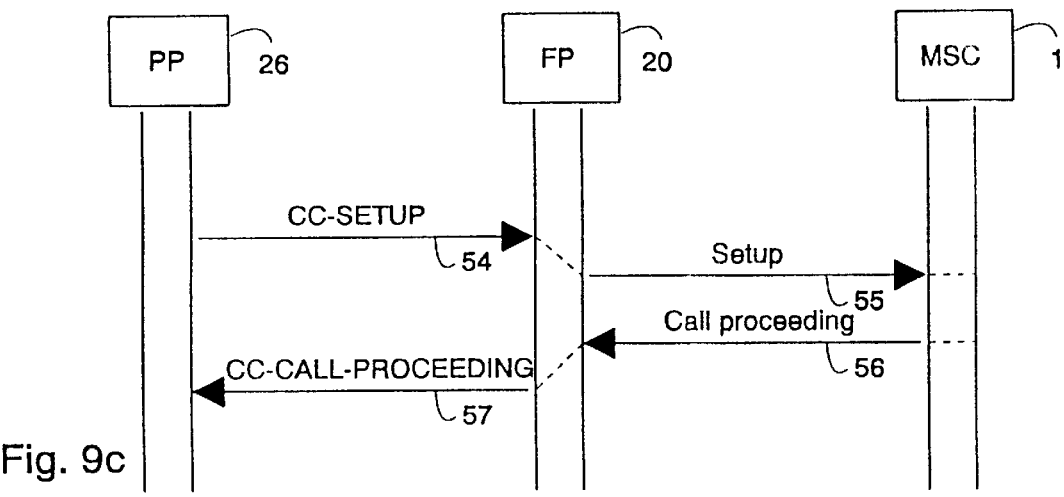
FIG. 9e shows an alternative procedure for the case of FIG. 9d.

FIG. 9c shows a third possible procedure for the base station 20. When the interworking unit 20a (not shown) of the base station 20 receives a CC-SETUP message 54 from the terminal 26 with a value representing the message "Extended exchange parameter negotiation" in the <<NEGOTIATION INDICATOR FIELD>>, it either rejects the negotiation request directly with the message "Negotiation not supported" (not shown) if the base station does not support extended service negotiation, or it maps the <<IWU-ATTRIBUTES>> and <<END-TO-END-COMPATIBILITY>> records conforming to the DECT standard into the <<bearer capability>> record conforming to the GSM standard in the manner described in tables 7, 11 and 12 in the accompanying document "DECT/GSM interworking of bearer services: implementation description, complete coding mapping of GSM and DECT elements" (Appendix A) and sends this record to the switching centre 1 in the "Setup" message 55.

If after that the switching centre 1 sends to the base station 20 a "Call proceeding" message 56 with new values in the <<bearer capability>> record, the base station will map those values into the <<IWU-ATTRIBUTES>> and <<END-TO-END-COMPATIBILITY>> records in the CC-CALL-PROCEEDING message 57 sent to the terminal 26 in the manner described in tables 5, 9 and 10 in the accompanying document "DECT/GSM interworking of bearer services: implementation description, complete coding mapping of GSM and DECT elements" (Appendix A). If the switching centre did not send a "Call proceeding" message or if the message did not contain the <<bearer capability>> record, the switching centre has accepted the parameters and the mapping of values into the CC-CALL-PROCEEDING message 57 to the terminal 26 is not required.

According to the second embodiment of the method of the invention the <<IWU-ATTRIBUTES>> record conforming to the DECT standard is redefined in the manner described in Chapter 6 of the accompanying document "DECT/GSM inter-working of bearer services: implementation description, transparent coding transportation of the Bearer Capability" (Appendix B), whereafter the <<IWU-ATTRIBUTES>> record conforming to the new definition fully complies with the requirements of the GSM standard bearer services. The <<IWU-ATTRIBUTES>> record conforming to the new definition makes the selection of the bearer service easier and the <<END-TO-END-COMPATIBILITY>> record need then not be used.

Setting up of a data call received by the terminal 26 (FIGS. 9d and 9e) is also performed largely as defined in the ETS 300 370 standard, but also in this case there are certain differences in the service negotiation procedure depending on what kind of operation the base station 20 supports. The negotiable parameters in this case are the number of data, stop and parity bits, use of the user layer 2 protocol and modem type; the codes for these are, respectively, <<number of data bits>>, <<number of stop bits>>, <<number of parity bits>>, <<user layer 2 protocol>> and <<modem type>>. The minimum requirement for the operation of the base station 20 is still the "negotiation not possible" function. To provide this function, no changes are required in the operation of the base station as regards the ETS 300 370 standard because the terminal 26 decides to disconnect if there is the code <<Negotiation not possible>> in the <<NEGOTIATION INDICATOR FIELD>> of the the CC-SETUP message received by the terminal and the values of said parameters are not suitable.

Figure 9D:
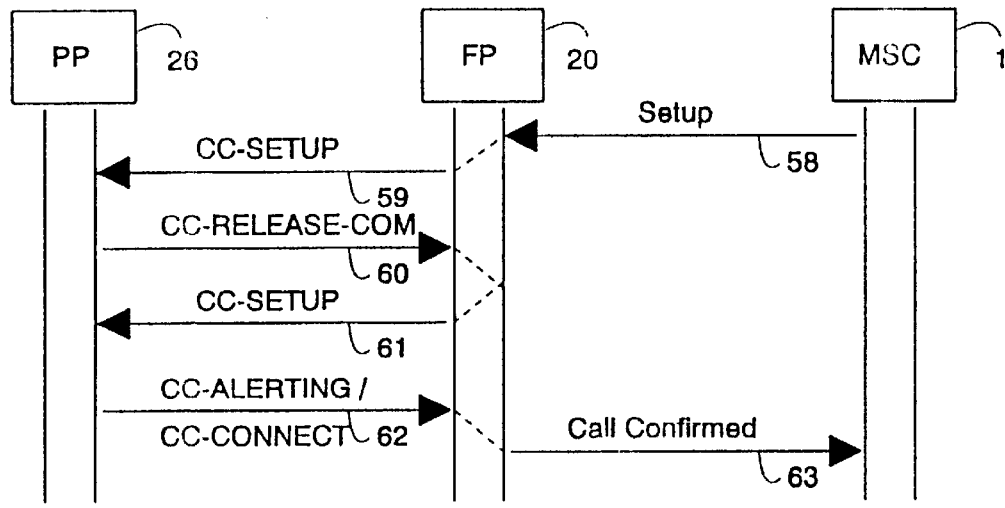

In the case illustrated by FIG. 9d the base station 20 supports service negotiation. First it maps the "Setup" message 58 from the switching centre 1 into a CC-SETUP message 59 conforming to the DECT standard and sends it to the terminal 26. If the terminal 26 does not support service negotiation it rejects the negotiation request directly with the message "Negotiation not supported" (not shown). Otherwise, the terminal 26 adds the appropriate parameters to the <<IWU-ATTRIBUTES>> and <<END-TO-END-COMPATIBILITY>> records in the CC-RELEASE-COM message 60 sent by it to the base station 20. The base station 20 does not map the parameters into any message sent to the switching centre 1 but sends a new CC-SETUP message 61 to the terminal 26 with new values in the <<IWU-ATTRIBUTES>> and <<END-TO-END-COMPATIBILITY>> records. The base station 20 must be able to associate this new CC-SETUP message 61 with the GSM data call that has arrived from the switching centre 1 and is waiting for a response. When the terminal 26 responds to the new CC-SETUP message 61 by sending to the base station 20 a CC-ALERTING or CC-CONNECT message 62, the base station 20 maps the new parameters into the <<bearer capability>> record in the "Call Confirmed" message 63 sent to the switching centre 1 in the manner described in tables 8, 11 and 12 in the accompanying document "DECT/GSM interworking of bearer services: implementation description, complete coding mapping of GSM and DECT elements" (Appendix A).

Figure 9E:
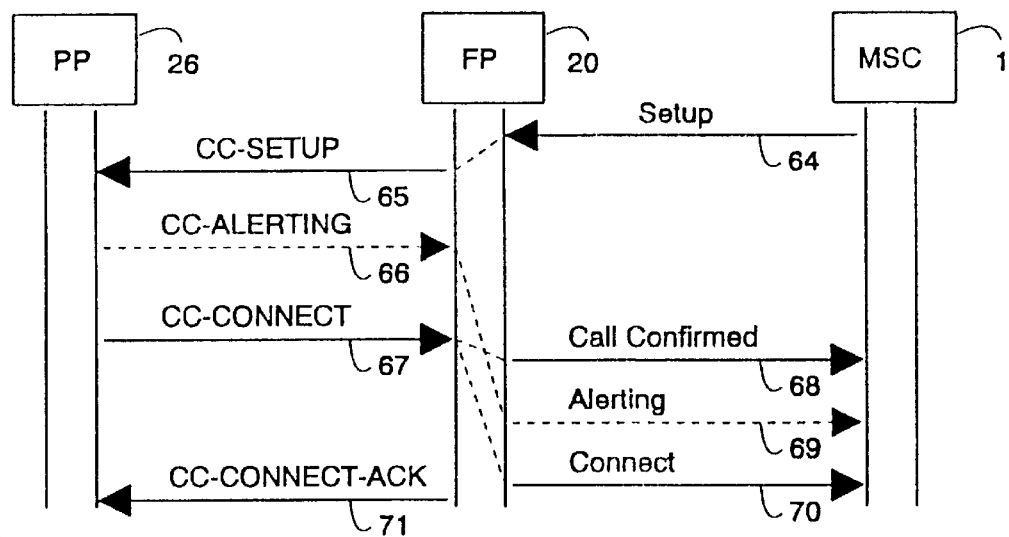

FIG. 9e shows an alternative procedure for the case described above. The "Setup" 64 and CC-SETUP 65 messages are handled as above. If the terminal 26 does not support service negotiation it rejects also in this case the service request directly with the message "Negotiation not supported" (not shown). Otherwise, the terminal 26 adds the appropriate parameters to the <<IWU-ATTRIBUTES>> and <<END-TO-END-COMPATIBILITY>> records in the CC-CONNECT message 67 sent to the base station 20. The base station 20 does not send to the switching centre 1 a "Call Confirmed" 68 or "Alerting" 69 message before it has received said parameters. The base station 20 maps the new parameters into the <<bearer capability>> record in the "Call Confirmed" message 68 sent to the switching centre 1 in the manner described in tables 8, 11 and 12 in the accompanying document "DECT/GSM interworking of bearer services: implementation description, complete coding mapping of GSM and DECT elements" (Appendix A). Other mappings conform to the ETS 300 370 standard. If the terminal 26 accepts the first parameter values that it received in the CC-SETUP message 65, it will not use the <<IWU-ATTRIBUTES>> and <<END-TO-END-COMPATIBILITY>> records of the CC-CONNECT message 67, whereby the data call setup proceeds as defined by the ETS 300 370 standard.

With the method according to the invention it is possible to use data services of the GSM system from a terminal belonging to the DECT system because the rate adaptations required by the GSM data services are included in the DECT base station and the transmission format conversions are performed between functional blocks of the base station.

The interface to a GSM switching centre of a DECT base station applying the method according to the invention conforms to the GSM standards and, therefore, no changes are needed in the GSM switching centres, and a GSM switching centre does not even have to know that it is transferring data to or from the DECT system. Neither does the method of the invention require changes in the radio interface of the DECT base station to the terminal and, hence, to the user, and so the user does not have to replace his or her DECT terminal with a new one. The DECT terminal can also be used for using non-GSM-based data services in the same way as before.

DECT/GSM Interworking of Bearer Services:

Implementation Description,

Transparent Coding Transportation of the Bearer Capability

---

Contents

| | | |
|---|---|---|
| 1. | REFERENCES | 5 |
| 2. | DEFINITIONS, ABBREVIATIONS AND SYMBOLS | 7 |
| | 2.1. DECT definitions | 7 |
| | 2.2. Abbreviations | 10 |
| | 2.3. GSM abbreviations and definitions | 11 |
| | 2.4. Symbols for status columns | 11 |
| 3. | GENERAL | 11 |

-continued

Contents

| | | | | |
|---|---|---|---|---|
| 4. | INTER-WORKING REQUIREMENTS | | | 12 |
| | 4.1. | General | | 12 |
| | 4.2. | Reference configurations | | 12 |
| | | 4.2.1. | FP functional attachment to the GSM PLMN | 12 |
| | 4.3. | General inter-working model for FP GSM PLMN attachment | | 12 |
| | 4.4. | Inter-working context | | 13 |
| | | 4.4.1. | General | 13 |
| | | 4.4.2. | Basic inter-working rules | 13 |
| | | 4.4.3. | Interpretation of broadcast attributes | 14 |
| | | 4.4.4. | Interpretation of Terminal capability | 14 |
| 5. | INTER-WORKING MAPPINGS, FP ATTACHED TO THE GSM PLMN | | | 15 |
| | 5.1. | FP C-plane IWU procedures | | 15 |
| | | 5.1.1. | CC IWU procedures | 15 |
| | | | 5.1.1.1. Outgoing data call | 15 |
| | | | 5.1.1.2. Service negotiation in the case of outgoing call | 15 |
| | | |     5.1.1.2.1. Negotiation not possible | 15 |
| | | |     5.1.1.2.2. Exchange attributes negotiation | 16 |
| | | |     5.1.1.2.3. Extended exchange parameter negotiation | 17 |
| | | | 5.1.1.3. Incoming data call | 18 |
| | | | 5.1.1.4. Service negotiation in the case of incoming call | 18 |
| | | |     5.1.1.4.1. Negotiation not possible | 18 |
| | | |     5.1.1.4.2. Exchange attributes negotiation | 18 |
| | | |     5.1.1.4.3. Extended exchange parameter negotiation | 19 |
| | | | 5.1.1.5. Other CC procedures | 20 |
| | | 5.1.2. | MM IWU procedures | 20 |
| | | 5.1.3. | Other IWU procedures | 21 |
| | | 5.1.4. | Message mappings | 21 |
| | | | 5.1.4.1. GSM to DECT | 21 |
| | | |     5.1.4.1.1. SETUP - CC-SETUP | 21 |
| | | |     5.1.4.1.2. CALL PROCEEDING-CC-RELEASE-COM | 22 |
| | | |     5.1.4.1.3 CALL PROCEEDING-CC-CALL-PROCEEDING | 22 |
| | | | 5.1.4.2. DECT to GSM | 22 |
| | | |     5.1.4.2.1. CC-SETUP - SETUP | 23 |
| | | |     5.1.4.2.2. CC-CONNECT - CALL CONFIRMED | 23 |
| | | 5.1.5. | Information element mappings | 24 |
| | | | 5.1.5.1. GSM to DECT | 24 |
| | | |     5.1.5.1.1. Bearer capability 1 - Iwu-attributes | 24 |
| | | |     5.1.5.1.2. Bearer capability 1 - end-to-end-compatibility | 25 |
| | | |     5.1.5.1.3. Lower layer compatibility - Iwu-to-iwu | 26 |
| | | |     5.1.5.1.4. Higher layer compatibility - Iwu-to-iwu | 26 |
| | | | 5.1.5.2. DECT to GSM | 27 |
| | | |     5.1.5.2.1. Iwu-attributes - Bearer capability 1 | 27 |
| | | |     5.1.5.2.2. End-to-end-compatibility - Bearer capability 1 | 28 |
| | | |     5.1.5.2.3. Iwu-to-iwu - Lower layer compatibility | 28 |
| | | |     5.1.5.2.4. Iwu-to-iwu - Higher layer compatibility | 29 |
| | | 5.1.6. | Fields in information element coding | 29 |
| | | | 5.1.6.1. GSM to DECT and DECT to GSM | 29 |
| | | |     5.1.6.1.1. Coding standard—Coding standard | 29 |
| | | |     5.1.6.1.2. Transfer mode—transfer mode | 29 |
| | | |     5.1.6.1.3. Information transfer capability—information transfer capability | 30 |
| | | |     5.1.6.1.4. Structure—Structure | 30 |
| | | |     5.1.6.1.5. Configuration—Configuration | 31 |
| | | |     5.1.6.1.6. Establishment—Establishment | 31 |
| | | |     5.1.6.1.7. Rate adaptation - User protocol ID | 31 |
| | | |     5.1.6.1.8. User information layer 2 protocol - L2 protocol ID | 32 |
| | | |     5.1.6.1.9. Duplex mode - Duplex mode (DUP) | 33 |
| | | |     5.1.6.1.10. Synchronous/asynchronous - Synchronous/asynchronous (S/A) | 33 |
| | | |     5.1.6.1.11. Number of stop bits - stop bit coding | 33 |
| | | |     5.1.6.1.12. Negotiation - Negotiation (Neg) | 34 |
| | | |     5.1.6.1.13. Number of data bits exl. parity - data bits coding | 34 |
| | | |     5.1.6.1.14. User rate - User rate coding | 34 |
| | | |     5.1.6.1.15. Intermediate rate - intermediate rate | 35 |
| | | |     5.1.6.1.16. Network independent clocking (NIC) on transmission (Tx) - Network independent clocking on transmission (NIC Tx) | 35 |
| | | |     5.1.6.1.17. Network independent clocking (NIC) on reception (Tx) - Network independent clocking on reception (NIC Tx) | 36 |
| | | |     5.1.6.1.18. Parity information - parity coding | 36 |
| | | |     5.1.6.1.19. Modem type - Modem type | 37 |
| | | |     5.1.6.1.20. Cause-value - Release Reason-code | 38 |
| | 5.2. | FP U-plane IWU procedures | | 39 |
| | | 5.2.1. | General | 39 |
| | | 5.2.2. | Transparent service (T) | 39 |
| | | | 5.2.2.1. General | 39 |
| | | |     5.2.2.1.1. Asynchronous | 39 |
| | | |     5.2.2.1.2. Synchronous | 40 |
| | | | 5.2.2.2. CCITT V.24 Interchange circuit signalling mapping | 40 |

-continued

Contents

|   |   |   |   |   |
|---|---|---|---|---|
| | | 5.2.2.3. | Flow control | 41 |
| | | 5.2.2.4. | Call establishment signalling mapping | 41 |
| | 5.2.3. | Non-transparent service (NT) | | 41 |
| | | 5.2.3.1. | General | 41 |
| | | | 5.2.3.1.1.  Asynchronous | 42 |
| | | | 5.2.3.1.2.  Synchronous | 42 |
| | | 5.2.3.2. | Interchange circuit signalling mapping | 43 |
| | | 5.2.3.3. | Flow control | 43 |
| | | 5.2.3.4. | Call establishment signalling mapping | 43 |
| | 5.2.4. | Synchronization | | 43 |
| 5.3. | PP C-plane IWU procedures | | | 43 |
| 5.4. | PP U-plane IWU procedures | | | 43 |
| 6. | ADDITIONS TO THE BASE STANDARD | | | 44 |
| 6.1. | Exchange attributes negotiation | | | 44 |
| | 6.1.1. | {CC-RELEASE-COM} message | | 44 |
| 6.2. | Extended exchange parameter negotiation | | | 44 |
| | 6.2.1. | {CC-CALL-PROCEEDING} message | | 45 |
| | 6.2.2. | {CC-CONNECT} messages | | 45 |
| 6.3. | New <<IWU-ATTRIBUTES>> coding | | | 46 |
| 6.4. | New <<END-TO-END-COMPATIBILITY>> coding | | | 46 |
| 7. | INTERWORKING CONNECTION TYPES | | | 47 |
| | 7.1. | Connection type definitions | | 47 |
| | | 7.1.1. | IWU-ATTRIBUTES information element for BS 21 . . . 26 UDI | 47 |
| | | 7.1.2. | END-TO-END-COMPATIBILITY information element for BS 21 . . . 26, UDI | 48 |
| | | 7.1.3. | IWU-ATTRIBUTES information element for BS 21 . . . 26 3.1 kHz | 49 |
| | | 7.1.4. | END-TO-END-COMPATIBILITY information element for BS 21 . . . 26, 3.1 kHz | 50 |
| | | 7.1.5. | IWU-ATTRIBUTES information element for BS 31 . . . 34, non X.32, UDI | 51 |
| | | 7.1.6. | END-TO-END-COMPATIBILITY information element for BS 31 . . . 34, non X.32, UDI | 52 |
| | | 7.1.7. | IWU-ATTRIBUTES information element for BS 31. . . 34, X.32, UDI | 53 |
| | | 7.1.8. | END-TO-END-COMPATIBILITY information element for BS 31 . . . 34, X.32, UDI | 54 |
| | | 7.1.9. | IWU-ATTRIBUTES information element for BS 31 . . . 34, non X.32, 3.1 kHz | 55 |
| | | 7.1.10. | END-TO-END-COMPATIBILITY information element for BS 31 . . . 34, non X.32, 3.1 kHz | 56 |
| | | 7.1.11. | IWU-ATTRIBUTES information element for BS 31 . . . 34, X.32, 3.1 kHz | 57 |
| | | 7.1.12. | END-TO-END-COMPATIBILITY information element for BS 31 . . . 34, X.32, 3.1 kHz | 58 |
| | | 7.1.13. | IWU-ATTRIBUTES information element for BS 41 . . . 46, PAD | 59 |
| | | 7.1.14. | END-TO-END-COMPATIBILITY information element for BS 41 . . . 46, PAD | 60 |
| | | 7.1.15. | IWU-ATTRIBUTES information element for BS 51 . . . 53, Packet | 61 |
| | | 7.1.16. | END-TO-END-COMPATIBILITY information element for BS 51 . . . 53, Packet | 62 |
| 8. | GSM BEARER CAPABILITY DEFAULT VALUES | | | 63 |

1. REFERENCES

[1] ETS 300 175-1: "Radio Equipment and Systems (RES); Digital European Cordless Telecommunications (DECT) Common Interface Part 1: Overview".

[2] ETS 300 175-2: "Radio Equipment and Systems (RES); Digital European Cordless Telecommunications (DECT) Common Interface Part 2: Physical layer".

[3] ETS 300 175-3: "Radio Equipment and Systems (RES); Digital European Cordless Telecommunications (DECT) Common Interface Part 3: Medium access control layer".

[4] ETS 300 175-4: "Radio Equipment and Systems (RES); Digital European Cordless Telecommunications (DECT) Common Interface Part 4: Data link control layer".

[5] ETS 300 175-5: "Radio Equipment and Systems (RES); Digital European Cordless Telecommunications (DECT) Common Interface Part 5: Network layer".

[6] ETS 300 175-6: "Radio Equipment and Systems (RES); Digital European Cordless Telecommunications (DECT) Common Interface Part 6: Identities and addressing".

[7] ETS 300 175-7: "Radio Equipment and Systems (RES); Digital European Cordless Telecommunications (DECT) Common Interface Part 7: Security features".

[8] ETS 300 175-8: "Radio Equipment and Systems (RES); Digital European Cordless Telecommunications (DECT) Common Interface Part 8: Speech coding and transmission".

[9] prETS 300 444: "Radio Equipment and Systems (RES); Digital European Cordless Telecommunications (DECT): Generic Access Profile (GAP)".

[10] prETS 300 331: "Radio Equipment and Systems (RES); Digital European Cordless Telecommunications (DECT) Common Interface: DECT Authentication Module".

[11] I-ETS 300 176: "Radio Equipment and Systems (RES); Digital European Cordless Telecommunications Approval Test Specification".

[12] 91/263/EEC: "Council Directive of Apr. 29, 1991 on the approximation of the laws of the Member states concerning telecommunications terminal equipment, including the mutual recognition of their conformity". (Terminal Directive).

[13] ETR 015: "Digital European Cordless Telecommunications Reference document".

[14] ETR 043: "Radio Equipment and Systems (RES); Digital European Cordless Telecommunications (DECT) Common Interface Services and Facilities requirements specification".

[15] ETR 056: "Digital European Cordless Telecommunications System description document".

[16] prETS 300 466: "Digital European Cordless Telecommunications/Global System for Mobile Communications (DECT/GSM) Inter-working profile: General Description of Service Requirements, Functional Capabilities and Information flows".

[17] Reserved.

[18] ECMA TR/44 (1989): "An architectural framework for private networks".

[19] GSM 01.02: "European digital cellular telecommunication system (Phase 2); General Description of a GSM PLMN".
[20] GSM 01.04: "European digital cellular telecommunication system (Phase 2); Abbreviations and acronyms".
[21] ETS 300 522: "European digital cellular telecommunication system; Network architecture GSM 03.02—phase 2".
[22] ETS 300 551: "European digital cellular telecommunication system; GSM PLMN Access Reference Configuration GSM 04.02—phase 2".
[23] PH2 GSM 04.08 (v4.8.0): "European digital cellular telecommunication system; Mobile Radio Interface—Layer 3 Specification GSM 04.08—phase 2".
[24] ETS 300 580-1: "European digital cellular telecommunication system; Speech Processing Functions: General Description GSM 06.01—phase 2".
[25] ETS 300 590: "European digital cellular telecommunication system; BSS-MSC Layer 3 Specification GSM 08.08—phase 2".
[26] PH2 GSM 11.11: "European digital cellular telecommunication system; Specifications of the SIM/ME interface GSM 11.11—phase 2".
[27] ISO IS 9646-1: "Information Technology—OSI Conformance Testing Methodology and Framework, Part 1: General Concepts".
[28] ISO IS 9646-6: "Information Technology—OSI Conformance Testing Methodology and Framework, Part 6: Protocol Profile Test Specification".
[29] ISO/IEC 9646-7 (1992): "Information Technology—OSI Conformance Testing Methodology and Framework, Part 7: Implementation Conformance Statements" (working draft for CD 9646-7).
[30] Draft prETS 300 xxx Version 5.00: "Radio Equipment and Systems (RES); Digital European Cordless Telecommunications (DECT) Data services profile, Generic data link service, Service Type C, Class 2".
[31] ETS 300 370: Radio Equipment and Systems (RES); Digital European Cordless Telecommunications/Global System for Mobile Communcations (DECT/GSM) Interworking profile, Access and mapping (Protocol/procedure description for 3.1 Hz speech service).
[32] ETS 300 582: European digital cellular telecommunication system (Phase 2); General on Terminal Adaptation Functions (TAF) for Mobile Stations (MS) (GSM 07.01).
[33] ETS 300 583: European digital cellular telecommunication system (Phase 2); Terminal Adaptation Functions (TAF) for services using asynchronous bearer capabilities (GSM 07.02).
[34] ETS 300 584: European digital cellular telecommunication system (Phase 2); Terminal Adaptation Functions (TAF) for services using synchronous bearer capabilities (GSM 07.03).

2. DEFINITIONS, ABBREVIATIONS AND SYMBOLS 2.1. DECT Definitions

Attach: the process whereby a PP within the coverage area of a FP to which it has access rights, notifies this FP that it is operative. The reverse process is detach, which reports the PP as inoperative.

NOTE 1: An operative PP is assumed to be ready to receive calls.

Authentication: the process whereby a DECT subscriber is positively verified to be a legitimate user of a particular FP.

NOTE 2: Authentication is generally performed at call set-up, but may also be done at any other time (e.g. during a call).

Bearer service: a type of telecommunication service that provides a defined capability for the transmission of signals between user-network interfaces.

NOTE 3: The DECT user-network interface corresponds to the top of the network layer (layer 3).

C-plane: the control plane of the DECT protocol stacks, which contains all of the internal DECT protocol control, but may also include some external user information.

NOTE 4: The C-plane stack always contains protocol entities up to and including the network layer.

Call: all of the NetWork (NWK) layer processes involved in one network layer peer-to-peer association.

NOTE 5: Call may sometimes be used to refer to processes of all layers, since lower layer processes are implicitly required.

DECT NetWork (DNW): a network that uses the DECT air interface to interconnect a local network to one or more portable applications. The logical boundaries of the DECT network are defined to be at the top of the DECT network layer.

NOTE 6: A DECT NetWork (DNW) is a logical grouping that contains one or more fixed radio termination plus their associated portable radio termination. The boundaries of the DECT network are not physical boundaries.

Fixed Part (DECT Fixed Part) (FP): a physical grouping that contains all of the elements in the DECT network between the local network and the DECT air interface.

NOTE 7: A DECT FP contains the logical elements of at least one fixed radio termination, plus additional implementation specific elements.

Fixed Part GSM PLMN Attachment (DECT Fixed Part attached to a GSM MSC): a definition of a functional environment where a DECT system (FP) is attached to an GSM MSC. The MSC in this case refers to a functional entity providing the required MM and CC functionality defined in this ETS in order to communicate with the FP.

Fixed radio Termination (FT): a logical group of functions that contains all of the DECT processes and procedures on the fixed side of the DECT air interface.

NOTE 8: A fixed radio termination only includes elements that are defined in the DECT CI standard. This includes radio transmission elements together with a selection of layer 2 and layer 3 elements.

Generic Access Profile (GAP): a defined part of the DECT Common Interface standard (DECT CI) that ensures interoperability between FPs and PPs for public business and residential access services.

Geographically unique identity: this term relates to FP identities, Primary Access Rights Identities (PARIs) and Radio Fixed Part Identities (RFPIs). It indicates that two systems with the same PARI, or respectively two RFPs with the same RFPI, can not be reached or listened to at the same geographical position.

Global NetWork (GNW): a telecommunication network capable of offering a long distance telecommunication service.

NOTE 9: The term does not include legal or regulatory aspects, nor does it indicate if the network is a public or a private network.

Globally unique identity: the identity is unique within DECT (without geographical or other restrictions).

Handover: the process of switching a call in progress from one physical channel to another physical channel. These processes can be internal (see internal handover) or external (see external handover).

NOTE 10: There are two physical forms of handover, intra-cell handover and inter-cell handover. Intra-cell handover is always internal. Inter-cell handover can be internal or external.

Incoming call: a call received at a PP.

Inter-cell handover: the switching of a call in progress from one cell to another cell.

Internal handover: handover processes that are completely internal to one Fixed radio Termination (FT). Internal handover re-connects the call at the lower layers, while maintaining the call at the NWK layer.

NOTE 11: The lower layer reconnection can either be at the Data Link Control (DLC) layer (connection handover) or at the MAC layer (bearer handover).

Inter-operability: the capability of FPs and PPs, that enable a PP to obtain access to teleservices in more than one location area and/or from more than one operator (more than one service provider).

Inter-operator roaming: roaming between FP coverage areas of different operators (different service providers).

Inter-Working Unit (IWU): a unit that is used to inter-connect sub-networks.

NOTE 12: The IWU will contain the inter-working functions necessary to support the required sub-network inter-working.

Intra-cell handover: the switching of a call in progress from one physical channel of one cell to another physical channel of the same cell.

Intra-operator roaming: roaming between different FP coverage areas of the same operator (same service provider).

Local NetWork (LNW): a telecommunication network capable of offering local telecommunication services.

NOTE 13: The term does not include legal or regulatory aspects, nor does it indicate if the network is a public network or a private network.

Locally unique identity: the identity is unique within one FP or location area, depending on application.

Location area: the domain in which a PP may receive (and/or make) calls as a result of a single location registration.

Location registration: the process whereby the position of a DECT portable termination is determined to the level of one location area, and this position is updated in one or more databases.

NOTE 14: These databases are not included within the DECT FT.

Medium Access Control (MAC) Connection: an association between one source MAC Multi-Bearer Control (MBC) entity and one destination MAC MBC entity. This provides a set of related MAC services (a set of logical channels), and it can involve one or more underlying MAC bearers.

Outgoing call: a call originating from a PP.

Portable Application (PA): a logical grouping that contains all the elements that lie beyond the DECT network boundary on the portable side.

NOTE 15: The functions contained in the portable application may be physically distributed, but any such distribution is invisible to the DECT network.

Portable Part (DECT Portable Part) (PP): a physical grouping that contains all elements between the user and the DECT air interface. PP is a generic term that may describe one or several physical pieces.

NOTE 16: A DECT PP is logically divided into one portable termination plus one or more portable applications.

Portable radio Termination (PT): a logical group of functions that contains all of the DECT processes and procedures on the portable side of the DECT air interface.

NOTE 17: A PT only includes elements that are defined in the DECT CI standard. This includes radio transmission elements (layer 1) together with a selection of layer 2 and layer 3 elements.

Radio Fixed Part (RFP): one physical sub-group of an FP that contains all the radio end points (one or more) that are connected to a single system of antennas.

Registration: an ambiguous term, that should always be qualified. See either location registration or subscription registration.

Roaming: the movement of a PP from one FP coverage area to another FP coverage area, where the capabilities of the FPs enable the PP to make or receive calls in both areas.

NOTE 18: Roaming requires the relevant FPs and PP to be inter-operable.

Subscription registration: the infrequent process whereby a subscriber obtains access rights to one or more FPs.

NOTE 19: Subscription registration is usually required before a user can make or receive calls.

2.2. Abbreviations

For the purposes of this document, the following abbreviations apply:

| | |
|---|---|
| ARI | Access Rights Identity. See SARI and TARI |
| BCD | Binary Coded Decimal |
| BSC | GSM Base Station Controller |
| CC | Call Control |
| CCITT | (The) International Telegraph and Telephone Consultative Committee |
| CI | Common Interface |
| CISS | Call Independent Supplementary Services |
| CK | Cipher Key. |
| CLMS | ConnectionLess Message Service |
| COMS | Connection Oriented Message Service |
| CRSS | Call Related Supplementary Services |
| DAM | DECT Authentication Module |
| DAM DA | DECT Authentication Module DECT Application |
| DAM GA | DECT Authentication Module, GSM Application |
| DECT | Digital European Cordless Telecommunications |
| DLC | Data Link Control, Layer 2b of the DECT protocol stack |
| DSAA | DECT Standard Authentication Algorithm |
| DTMF | Dual Tone Multi-Frequency |
| FP | Fixed Part, (see definitions) |
| FT | Fixed radio Termination, (see definitions) |
| GAP | Generic Access Profile |
| IMEI | International Mobile Equipment Identity |
| IMSI | International Mobile Subscriber Identity |
| IPEI | International Portable Equipment Identity |
| IPUI | International Portable User Identity |
| ISDN | Integrated Services Digital Network |
| ISO | International Organisation for Standardisation |
| ISUP | Integrated Services Digital Network User Part |
| IWU | Inter-Working Unit, (see definitions) |
| K | authentication Key |
| LCE | Link Control Entity |
| LLME | Lower Layer Management Entity |
| MAC | Medium Access Control, Layer 2a of the DECT protocol stack |
| MAP | GSM Mobile Application Part |
| MM | Mobility Management, a NWK layer functional grouping |
| MSB | Most Significant Bit |
| MS | Mobile Station |
| MSC | Mobile Switching Centre |
| NWK | Network, Layer 3 of the DECT protocol stack |
| OSI | Open Systems Interconnection |
| PA | Portable Application |
| PARI | Primary Access Rights Identity |
| PARK | Portable Access Rights Key |
| PCM | Pulse Coded Modulation |
| PE | Portable Equipment |
| PLMN | Public Land Mobile Network |
| PP | Portable Part |
| PSTN | Public Switched Telephone Network |
| PT | Portable radio Termination. See definition |
| PTNX | Private Telecommunications Network eXchange |

-continued

| | |
|---|---|
| PUN | Portable User Number |
| PUT | Portable User Type |
| RAND | A RANDom challenge issued by a FP |
| RES | A RESponse calculated by a PP |
| RFP | Radio Fixed Part, (see definitions) |
| RFPI | Radio Fixed Part Identity |
| RS | A value used to establish authentication session keys |
| SARI | Secondary Access Rights Identity |
| SS | Supplementary Services |
| SRES | A GSM specific authentication response calculated by the GSM SIM or the DAM |
| TAF | Terminal Adaptation Function |
| TARI | Tertiary Access Rights Identity |
| TMSI | Temporary Mobile Subscriber Identity |
| TPUI | Temporary Portable User Identity |
| TUP | Telephony User Part |
| UPI | User Personal Identification |

2.3. GSM Abbreviations and Definitions

Definition and specific GSM abbreviations may be found in GSM 01.04 [20].

2.4. Symbols for Status Columns

The symbols defined in this subclause are applied for procedures, features, messages, information elements, fields and field codings in this document if not explicitly otherwise stated. The interpretation of status columns in all tables is as follows:

M for mandatory to map/support/use;

O for optional to map/support/use;

I for out-of-scope (not subject for testing);

X for prohibited or excluded to map/support/use (the message, information element may be allowed to be used in the standard/standards but it is not allowed to be mapped/used depending on the environment/dynamic conditions etc.);

N/A or -(dash) for not applicable to map/support/use;

C for conditional to map/support/use (the message, information element mapping depends on the selection of other optional or/and conditional items).

NOTE: The symbol "-" in the mapping section of this ETS means that there is no message, information element or coding specified in this column.

3. GENERAL

This document specifies how GSM circuit switched bearer services are provided over the DECT air interface.

This document is made up of 5 main clauses:

Clause 4: Inter-working requirements—includes reference configurations and the protocol architecture models. Also describes the main service requirements.

Clauses 5: Inter-Working Unit (IWU) mappings—shows the C plane and U plane mappings needed in addition to the ETS 300 370 [31] for the FP GSM PLMN attachment in respective order. Two IWUs are considered; the FP IWU and the PP IWU, although the FP IWU is expected to be the largest. The signalling mappings are described in terms of IWU procedures with informative data flow diagrams. Detailed descriptions follow using tables of what is mapped, what is ignored, and what is transferred transparently.

Clause 6: Additions to the base standard—this clause defines the optional changes needed in the ETS 300 175-5 [5] for a full interworking in service negotiation. Also some new attributes/parameter codings are proposed to widen the service range closer to GSM PLMN bearer services.

Clause 7: Connection types—this clause identifies the main DECT connection types (U plane+C plane) at the air interface and defines the attributes codings used in the DECT air interface for identification of the different GSM bearer services.

Clause 8: GSM Bearer Capability default values—this clause lists the default values for GSM BC information element fields.

4. INTER-WORKING REQUIREMENTS 4.1. General

This document defines the mandatory requirements to the FP interworking functions if the GSM circuit switched bearer services are interworked to DECT. The interworking shall comply completely with ETS 300 370 [31] in terms of MM and CC message mappings with the additions presented in this document. The additional interworking mapping are based on the GSM phase 2 standards.

The mandatory minimum requirement of this document is compatible with the DECT/GSM interworking profile ETS 300 370 [31], ETS 300 xxx DECT C.2. data profile [30] and ETS 300 175-5 DECT Network Layer [5]. However, if full interworking with service negotiation is needed some changes/additions listed in subclause 6 of this document are required to ETS 300 175-5 [5]. The procedures utilizing these changes are optional.

4.2. Reference Configurations 4.2.1. FP functional attachment to the GSM PLMN

Figure 10:
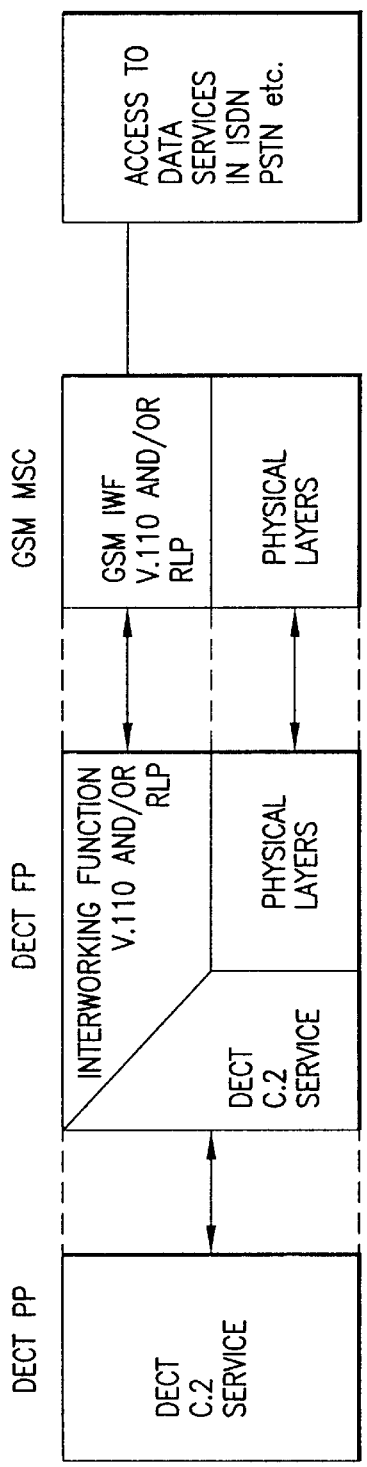
FIG. 10 shows a profile reference configuration showing (U-plane) inter-working to GSM data services.

The configuration is shown in FIG. 10.

4.3. General Inter-working Model for FP GSM PLMN Attachment

Figure 11:
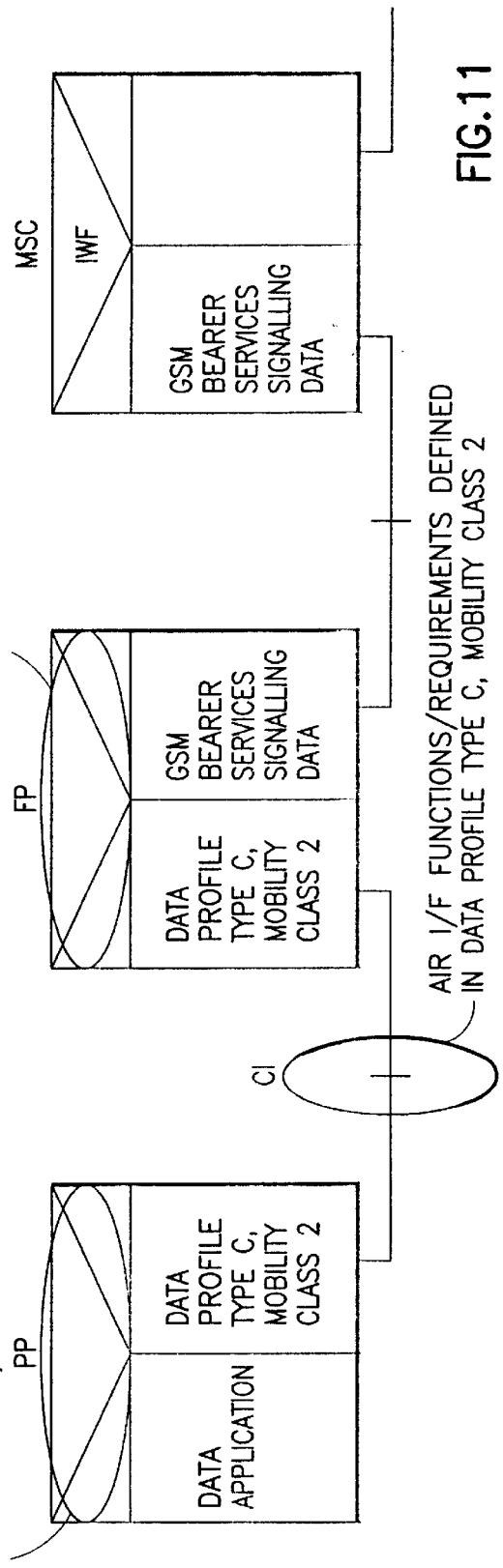
FIG. 11 shows general inter-working model for bearer services for FP GSM PLMN attachment.

The general interworking model is shown in FIG. 11. It describes a general interworking model containing both control and user planes. The figure also shows the locations of the interworking units (IWUs).

The FP IWU provides mappings between GSM CC/MM and DECT CC/MM messages. The mappings defined in this document in subclause 5 are additions to the ETS 300 370 [31]. The PP TAF defined in the ETS 300 xxx C.2 profile annex C.2 [30] provides a CCITT V.24 connection to the DECT data application.

4.4. Inter-working Context 4.4.1. General

The PP complying with this standard shall be compatible with the requirements of the ETS 300 xxx C.2 data profile [30] and ETS 300 370 [31], those which are based on the minimum requirements of GAP [9] when regarding the MM aspects. The CC requirements are based on the C.2 data profile [30] which are GAP [9] with some data transmission specific additional requirements. This document does not require the support of the GAP based voice services i.e. the PP may be a data only terminal with the GSM access capabilities and a GSM subscription as defined in ETS 300 370 [31].

4.4.2. Basic-Inter-Working Rules

The interworking rules are as defined in ETS 300 370 [31].

Table 1 defines the GSM bearer services supported by this document. Both, GSM transparent (T) and non-transparent (NT) bearer services are supported while DECT is interworking with GSM. The DECT air interface does not separate the NT or T cases thus the C.2 profile will be used for both cases. Both rate adaptation schemes are terminated of the FP IWU and are introduced in the FP IWU U-plane section, however, to support both is not a mandatory requirement.

TABLE 1

The GSM bearer services supported

| Bearer service number | Bearer service name |
|---|---|
| 21 | Asynchronous 300 bps |
| 22 | Asynchronous 1.2 kbps |
| 23 | Asynchronous 1200/75 bps |
| 24 | Asynchronous 2.4 bps |
| 25 | Asynchronous 4.8 bps |
| 26 | Asynchronous 9.6 bps |
| 31 | Synchronous 1.2 kbps |
| 32 | Synchronous 2.4 kbps |
| 33 | Synchronous 4.8 kbps |
| 34 | Synchronous 9.6 kbps |
| 41 | PAD access 300 bps |
| 42 | PAD access 1.2 kbps |
| 43 | PAD access 1200/75 bps |
| 44 | PAD access 2.4 kbps |
| 45 | PAD access 4.8 kbps |
| 46 | PAD access 9.6 kbps |

The selection of a GSM bearer service is done in the mobile originated call by defining the services requirements in the <<iwu-attributes>> and <<end-to-end-capability>> information elements as defined in subclause 7. Part of the values of these elements are mapped to GSM <<Bearer capability>> element as defined in subclause 5.1.4.. Since not all DECT fields are mappable with GSM fields some of the values are utilized i.e they are ignored in the GSM part of the connection establishment. Due to the same reason some GSM Bearer capability fields use default values as defined in subclause 8.

The selection of a GSM bearer service is done in the mobile terminated call by defining the service requirements in the GSM <<Bearer capability>> element. Part of the values of this element are mapped to <<iwu-attributes>> and <<end-to-end-compatibility>> information elements as defined in subclause 5.1.4. Since not all GSM fields are mappable with DECT fields some of the values are not utilized i.e they are ignored in the DECT part of the connection establishment. Due to the same reason some fields of DECT <<iwu-attributes>> and <<end-to-end-compatibility>> use default values as defined in subclause 7.

4.4.3.. Interpretation of broadcast attributes

This subclause refers to Annex F of ETS 300 175-5 [5] (Broadcast attributes coding). The coding are done as defined in ETS 300 370 [31] with the exceptions listed here.

a32 ADPCM/G.721 Voice service: may be set to value "1". (NOTE 1)

a33 PAP/GAP voice supported: may be set to value "1". (NOTE 1)

a34 Non-voice circuit switched service: shall be set to value "1";

NOTE 1. This document does not require the support of the voice service, however, it is not prohibited either.

4.4.4. Interpretation of Terminal capability

If <<TERMINAL CAPABILTY>> information element is used the following codings indicated the support of the GSM bearer services:

Profile Indicator_1 Coding (Octet 4) of TERMINAL CAPABLITY information element:

| Bits | 7 | 6 | 5 | 4 | 3 | 2 | 1 | Meaning |
|---|---|---|---|---|---|---|---|---|
| | x | x | x | x | 1 | x | x | GSM profile supported |
| | 1 | x | x | x | x | x | x | Data Services Profile C Class 2 |

Both codings are required.

5. INTER-WORKING MAPPINGS, FP ATTACHED TO THE GSM PLMN

5.1. FP C-plane IWU Procedures

5.1.1. CC IWU procedures

The CC procedures are compatible with ETS 300 370 [31] with the exceptions described here.

The <<IWU ATTRIBUTES>> and <<END-TO-END-COMPATIBILITY>> information elements included in the {CC-SETUP} message will define the GSM bearer service to be requested. The coding combinations used for alternate bearer services is defined in the subclause 7 of this document.

Only BEARER CAPABILITY 1 is recognized in the GSM messages. That is, if a GSM Call Control message contains multiple BEARER CAPABLITY information elements only the first one is mapped and conveyed to DECT PP.

Only the first <<IWU-ATTRIBUTES>> and <<END-TO-END-COMPATIBILITY>> information elements are mapped into GSM BEARER CAPABILITY element.

The LOWER LAYER COMPATIBILITY and HIGHER LAYER COMPATIBILITY information elements, if present in a GSM CC message, are carried with no mappings over the air interface as described in subclauses 5.1.5.1.3, 5.1.5.1.4, 5.1.5.2.3 and 5.1.5.2.4. The FP will not do any mapping of these elements. The utilization of these elements is completely a matter of the DECT data application in PP i.e this document does not define their usage.

5.1.1.1. Outgoing data call

The call procedures for outgoing data call (PP originated) are compatible with the procedures of containing the <<CALLED-PARTY-NUMBER>> in the {CC-INFO} message as defined in the ETS 300 370 [31]. This procedure is compatible with ETS 300 xxx C.2 data profile [30] call establishment.

5.1.1.2. Service negotiation in the case of outgoing call

There are three alternate options in the services negotiation procedures in (PP originated) outgoing call. Minimum mandatory requirement is to support the negotiation not possible case defined in clause 5.1.1.2.1. The alternate service negotiation procedures are indicated/requested with <<Negotiation indicator>> field in the <<IWU-ATTRIBUTES>> information element. In order to facilitate the optional service negotiations defined in subclauses 5.1.1.2.2. and 5.1.1.2.3. changes/additions defined in subclause 7 of this document to DECT network layer ETS 300 175-5 [5] have to be implemented.

The negotiable parameters in the case of mobile originated call is <<Modem type>>.

5.1.1.2.1. Negotiation not possible

Upon receipt of CC-SETUP-ind with <<IWU-ATTRIBUTES>> containing the value "Negotiation not possible" in the <<Negotiation indicator field>> from the CC entity the FP IWU will reject all negotiation towards/from MSC. That is, if the MSC cannot provide the PP the requested service the connection is disconnected by using CC-REJECT-req with <<Release reason>> Hex 05 "Incompatible service" towards PP.

It is then the responsiblity of the FP IWU in the case the {Call proceeding} contains new service parameter values to disconnect the connection towards the GSM PLMN by issuing {Release complete} message with cause 79; "Service or option not implemented, unspecified".

Figure 12:
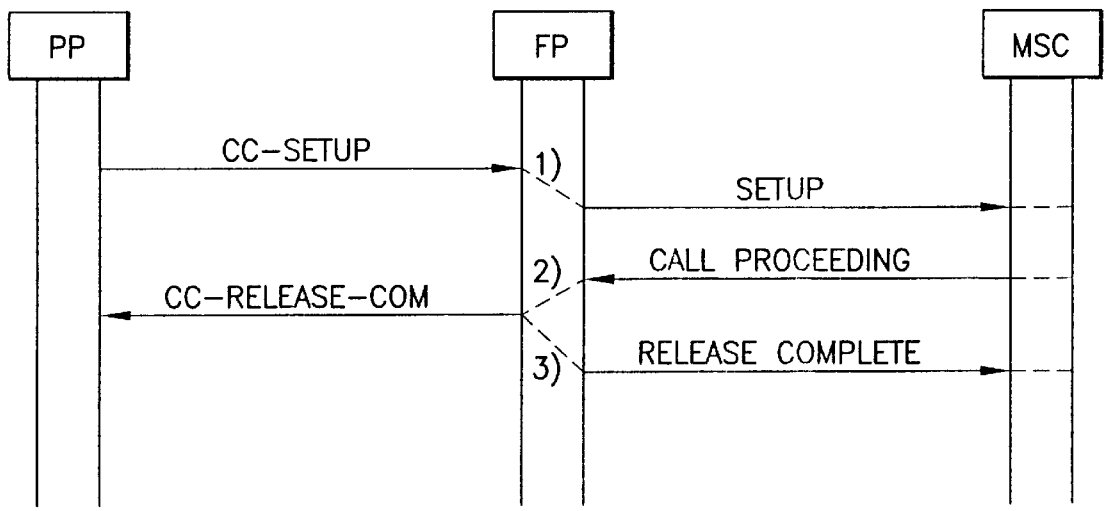
FIG. 12 shows the rejection of a negotiation request from the MSC.

If no {Call proceeding} message is received from MSC or it does not contain <<BEARER CAPABILITY>> information element the service parameters have been accepted by the MSC IWF and the call establishment proceeds as defined in ETS 300 370 [31]. (See FIG. 12)

5.1.1.2.2. Exchange attributes negotiation

The following procedures require the additions defined in subclause 6.

Upon receipt of CC-SETUP-ind with <<IWU-ATTRIBUTES>> containing the value "Exchange parameter negotiation" in the <<Negotiation indicator field>> from the CC entity the FP IWU will reject the request immediately issuing MNCC-REJECT-req with <<Release reason>> Hex 07 "Negotiation not supported" if the FP cannot support exchange attributes negotiation as defined in the subclause 15.2.3 of ETS 300 175-5 [5].

If the FP can support the Exchange parameter negotiation the FP IWU will map the <<IWU-ATTRIBUTES>> and the <<END-TO-END-COMPATIBLITY>> information elements contained in {CC-SETUP} to the GSM BEARER CAPABILTY element of GSM {Setup} message as described in subclause 5.1.4.2.1.

1) Upon receipt of the GSM {Call proceeding} message with new values in <<Bearer capabilty>> information element the FP IWU will release the connection by using MNCC-REJECT-ind with new values in the <<IWU-ATTRIBUTES>> and <<END-TO-END-COMPATIBLITY>> information elements.

2) Whereupon the FP IWU will send the MSC {RELEASE COMPLETE} message with cause code 31 "Normal, unspecified". The PP may now initiate a new call with new parameter values following the normal call establishment precedures defined in this document and in ETS 300 370 [31].

Figure 13:
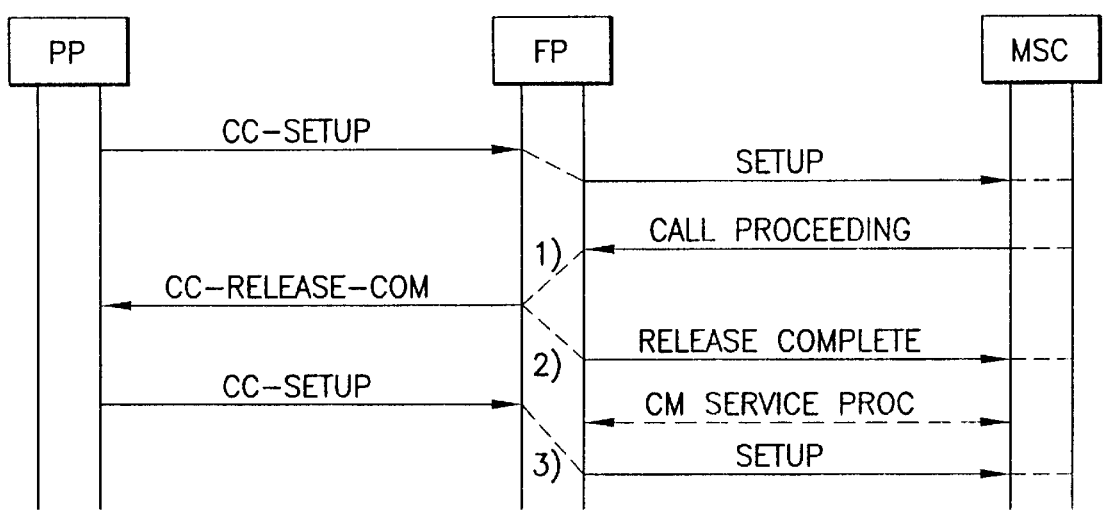
FIG. 13 shows the exchange attributes negotiation procedure in outgoing call.

If no {Call proceeding} message is received or it does not contain <<BEARER CAPABILITY>> information element the service parameters have been accepted by the MSC IWF and the call establishment proceeds as defined in ETS 300 370 [31]. (See FIG. 13)

5.1.1.2.3. Extended exchange parameter negotiation

The following procedures require the additions defined in subclause 6.

Upon receipt of CC-SETUP-ind with <<IWU-ATTRIBUTES>> containing the value "Extended exchange parameter negotiation" in the <<Negotiation indicator field>> from the CC entity the FP IWU will reject the request immediately issuing MNCC-REJECT-req with <<Release reason>> Hex 07 "Negotiation not supported" if the FP cannot support Extended exchange attributes negotiation.

If the FP can support the Extended exchange parameter negotiation the FP IWU will map the <<IWU-ATTRIBUTES>> and the <<END-TO-END-COMPATIBLITY>> information elements contained in {CC-SETUP} message to the GSM <<BEARER CAPABILTY>> element of GSM {Setup} message as described in subclause 5.1.4.2.1.

1) Upon receipt of the GSM {Call proceeding} message the FP IWU will map the new values of the <<Bearer capability>> into the <<IWU-ATTRIBUTES>> and <<END-TO-END-COMPATIBLITY>> information elements of the DECT <<CC-CALL-PROCEEDING>> message as defined in subclause 5.1.4.1.3.

Figure 14:
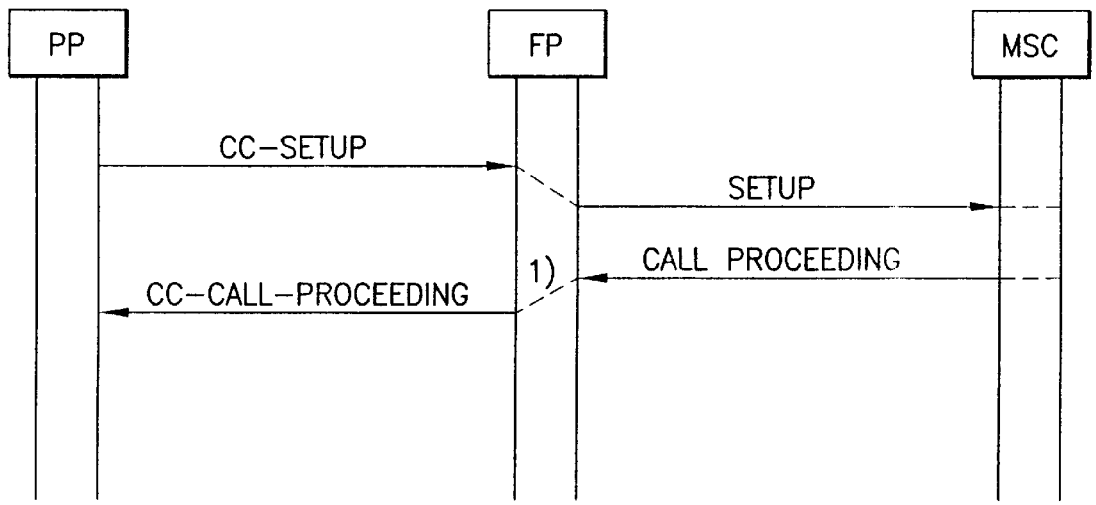
FIG. 14 shows the extended exchange attributes negotiation in the case of outgoing call.

If no {Call proceeding} message is received or it does not contain <<BEARER CAPABILITY>> information element the service parameters have been accepted by the MSC IWF and no mapping between the <<BEARER CAPABILITY>> and <<IWU-ATTRIBUTES>> and <<END-TO-END-COMPATIBLITY>> information elements is needed. (See FIG. 14)

5.1.1.3. Incoming data call

The call procedures for incoming data call (network originated) are compatible with the procedures defined in the ETS 300 370 [31]. This procedure is compatible with ETS 300 xxx C.2 data profile [30] call establishment.

5.1.1.4. Service negotiation in the case of incoming call

There are three alternate options in the services negotiation procedures in (network originated) incoming call. Minimum mandatory requirement is to support the negotiation not possible case defined in clause 5.1.1.4.1. The alternate service negotiation procedures are indicated/requested with <<Negotiation indicator>> field in the <<IWU-ATTRIBUTES>> information element. In order to facilitate the optional service negotiations defined in subclauses 5.1.1.4.2. and 5.1.1.4.3. changes/additions defined in subclause 6 of this document to DECT network layer ETS 300 175-5 [5] have to be implemented.

The negotiable parameters in the case of mobile terminated call are <<number of data bits>>, <<number of stop bits>>, <<number of parity bits>>, <<user layer 2 protocol>> and <<Modem type>>.

5.1.1.4.1. Negotiation not possible

Upon receipt of CC-SETUP-ind with <<IWU-ATTRIBUTES>> containing the value "Negotiation not possible" in the <<Negotiation indicator field>> from the CC entity the PP IWU will reject all negotiation. That is, if the PP cannot accept the parameters indicated in the <<IWU-ATTRIBUTES>> and the <<END-TO-END-COMPATIBLITY>> information elements the connection is disconnected by using CC-REJECT-req with <<Release reason>> Hex 05 "Incompatible service".

If the PP IWU accepts the parameters proposed by MSC the call establishment proceeds as defined in ETS 300 370 [31].

5.1.1.4.2. Exchange attributes negotiation

The following procedures require the additions defined in subclause 6.

1). Upon receipt of CC-SETUP-ind with <<IWU-ATTRIBUTES>> containing the value "Exchange parameter negotiation" in the <<Negotiation indicator field>> from the CC entity the PP IWU will reject the request immediately issuing MNCC-REJECT-req with <<Release reason>> Hex 07 "Negotiation not supported" if the PP cannot support exchange attributes negotiation as defined in the subclause 15.2.3 in ETS 300 175-5 [5].

If the PP can support the Exchange parameter negotiation the PP IWU will add the new desired values into the <<IWU-ATTRIBUTES>> and the <<END-TO-END-COMPATIBLITY>> information elements of the {CC-RELEASE-COM} message.

2). Upon receipt of the {CC-RELEASE-COM} message with indication of "Exchange parameter negotiation" in the <<Negotiation indicator>> field of the <<IWU-ATTRIBUTES>> element the FP will not directly map the message according to 300 370 [31] but issue immediately a new CC-SETUP-ind with new set parameters in <<IWU-ATTRIBUTES>> and <<END-TO-END-COMPATIBLITY>> elements. It is then the responsibility of the FP IWU to join the GSM call waiting for response and the new DECT call with new parameters.

3) Upon receipt of the {CC-ALERTING} or {CC-CONNECT} as a response to the new {SETUP} message the procedure will proceed as illustrated in ETS 300 370 [31] with new parameter values mapped into the <<BEARER CAPABILITY>> element in the {Call Confirmed} message.

Figure 15:
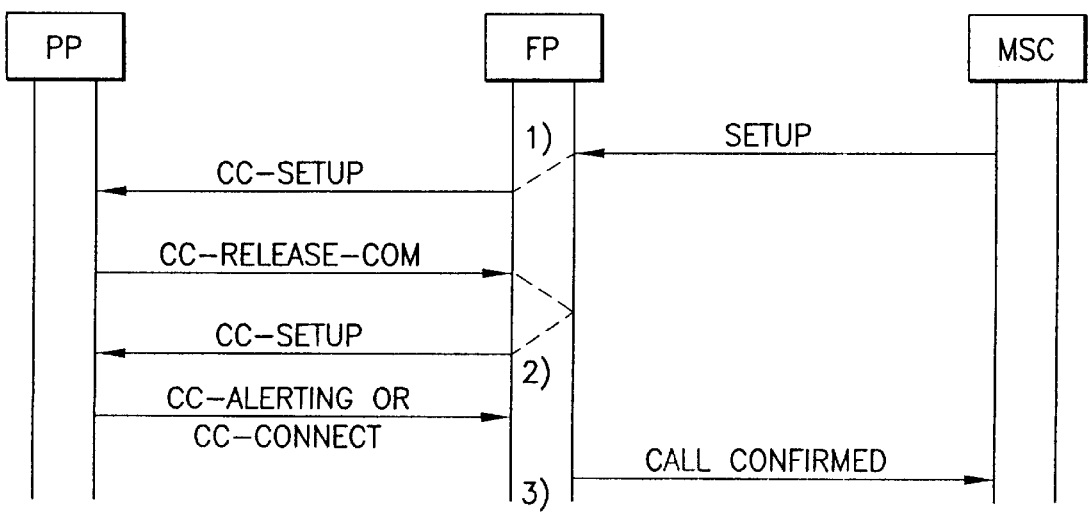
FIG. 15 shows the exchange attributes negotiation procedure in incoming call.

If the PP IWU accepts the parameters proposed by MSC the call establishment proceeds as defined in ETS 300 370 [31]. (See FIG. 15)

5.1.1.4.3. Extended exchange parameter negotiation

The following procedures require the additions defined in subclause 6.

Upon receipt of CC-SETUP-ind with <<IWU-ATTRIBUTES>> containing the value "Extended exchange parameter negotiation" in the <<Negotiation indicator field>> from the CC entity the PP IWU will reject the request immediately issuing MNCC-REJECT-req with <<Release reason>> Hex 07 "Negotiation not supported" if the PP cannot support Extended exchange attributes negotiation.

If the PP can support the Extended exchange parameter negotiation the PP IWU will add the new desired attributes values to the <<IWU-ATTRIBUTES>> and the <<END-TO-END-COMPATIBLITY>> information elements of the {CC-CONNECT} message.

2) and 3). It is then the responsibility of the FP IWU to suspend the submission of the {Call confirm} and {Alerting} message towards the GSM network until the new desired values have been received in the {CC-CONNECT} message. The new values in the <<IWU-ATTRIBUTES>> and <<END-TO-END-COMPATIBLITY>> information elements of the {CC-CONNECT} message are mapped into the GSM BEARER CAPABILTY element of {Call Confirmed} message as described in subclause 5.1.8.3. Other mappings between {CC-CONNECT} and {Connect} message as well as {CC-ALERTING} and {Alerting} messages are done as described in ETS 300 370 [31].

Figure 16:
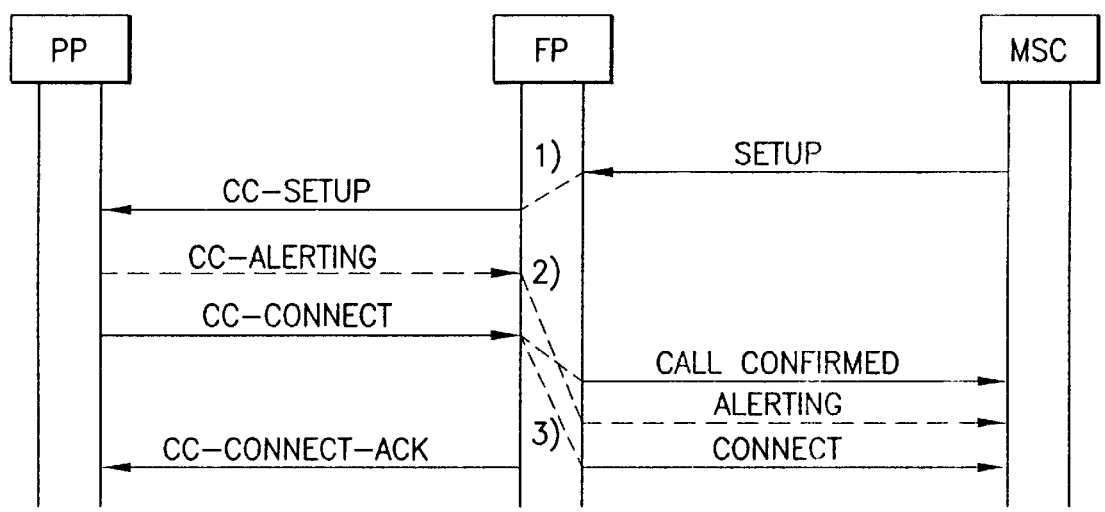
FIG. 16 shows the extended exchange attributes negotiation in the case of incoming call.

The PP IWU shall not use <<IWU-ATTRIBUTES>> and/or <<END-TO-END-COMPATIBILITY>> information elements in the {CC-CONNECT} message if it agrees with the service parameters proposed in the {CC-SETUP} message. If the PP IWU accepts the parameters proposed by MSC the call establishment proceeds as defined in ETS 300 370 [31]. (See FIG. 16)

5.1.1.5. Other CC procedures

Other CC procedures are done according to ETS300 370 [31]. Additional cause code mappings required are presented in subclause 5.1.6.1.20.

5.1.2. MM IWU procedures

The MM procedures follow the procedures defined in the C.2 profile and ETS 300 370 [31].

5.1.3. Other IWU procedures 5.1.4. Message mappings 5.1.4.1. GSM to DECT

TABLE 2

List of mapped CC messages

| Item No | GSM message | Status in GSM | DECT message | Status in GAP | Ref. | Map status | Note |
|---|---|---|---|---|---|---|---|
| 1 | SETUP | M | CC-SETUP | M | 5.1.4.1.1 | M | |
| 2 | CALL PROCEEDING | M | CC-RELEASE-COM | M | 5.1.4.1.2 | C.1 | |
| 3 | CALL PROCEEDING | M | CC-CALL-PROCEEDING | M | 5.1.4.1.3 | C.2 | |

C.1: If Exchange attribute negotiation supported then M else X.
C.2: If Extended exchange parameter negotiation supported then M else X.

1.4.1.1. SETUP—CC-SETUP

TABLE 3

| Item No | Message coding GSM | Message coding DECT | Ref. | Map status | NOTE |
|---|---|---|---|---|---|
| | SETUP | CC-SETUP | | | |
| 1 | bearer capability 1 | iwu-attributes | 5.1.5.1.1 | M | 1. |
| | | end-to-end-compatibility | 5.1.5.1.2 | M | |
| 2 | lower layer compatibility | iwu-to-iwu | 5.1.5.1.3 | C1 | 1. |
| 2 | higher layer compatibility | iwu-to-iwu | 5.1.5.1.4 | C1 | 1. |

C1: IF PRESENT THEN O ELSE X

NOTE 1: The GSM bearer capability information element has to be mapped into two DECT elements.

All other message mappings are done according to ETS 300 370 [31].

5.1.4.1.2. CALL PROCEEDING-CC-RELEASE-COM

TABLE 4

| Item No | Message coding GSM | Message coding DECT | Ref. | Map status | NOTE |
|---|---|---|---|---|---|
| | CALL PROCEEDING | CC-RELEASE-COM | | | |
| 1 | bearer capability 1 | iwu-attributes | 5.1.5.1.1 | C.1 | |
| | | end-to-end-compatibility | 5.1.5.1.2 | C.1 | |

C.1: If Exchange attribute negotiation supported then M else X.

5.1.4.1.3. CALL PROCEEDING-CC-CALL-PROCEEDING

TABLE 5

| Item No | Message coding GSM | Message coding DECT | Ref. | Map status | NOTE |
|---|---|---|---|---|---|
| | CALL PROCEEDING | CC-CALL-PROCEEDING | | | |
| 1 | bearer capability 1 | iwu-attributes | 5.1.5.1.1 | C.1 | |
| | | end-to-end-compatibility | 5.1.5.1.2 | C.1 | |

C.1: If Extended exchange parameter negotiation supported then M else X.

5.1.4.2. DECT to GSM

TABLE 6

List of mapped CC messages

| Item No | DECT message | Status in GAP | GSM message | Status in GSM | Ref. | Map status | Note |
|---|---|---|---|---|---|---|---|
| 1 | CC-SETUP | M | SETUP | M | 5.1.4.2.1 | M | |
| 2 | CC-CONNECT | M | CALL CONFIRMED | M | 5.1.4.2.2 | C.1 | |

C.1: If Extended exchange parameter negotiation supported then M else X.
All other message mappings are done according to ETS 300 370 [31].

5.1.4.2.1. CC-SETUP—SETUP

TABLE 7

| Item No | Message coding DECT | Message coding GSM | Ref. | Map status | NOTE |
|---|---|---|---|---|---|
| | CC-SETUP | SETUP | | | |
| 1 | iwu-attributes | bearer capability 1 | 5.1.5.2.1 | M | 1. |
| | end-to-end-compatibility | | 5.1.5.2.2 | M | |
| 2 | iwu-to-iwu | lower layer compatibility | 5.1.5.2.3 | C1 | 1 |
| 3 | iwu-to-iwu | higher layer compatibility | 5.1.5.2.4 | C1 | 1 |

C1: IF PRESENT THEN O ELSE X
NOTE 1:
The GSM bearer capability information element has to be mapped into two DECT elements.

5.1.4.2.2. CC-CONNECT—CALL CONFIRMED

TABLE 8

| Item No | Message coding DECT | Message coding GSM | Ref. | Map status | NOTE |
|---|---|---|---|---|---|
| | CC-CONNECT | CALL CONFIRMED | | | |
| 1 | iwu-attributes | bearer capability 1 | 5.1.5.2.1 | C.1 | 1. |
| | end-to-end-compatibility | | 5.1.5.2.2 | C.1 | |

C.1: If Extended exchange attribute negotiation supported then M else X.
NOTE 1:
The GSM bearer capability information element has to be mapped into two DECT elements.

5.1.5. Information element mappings

5.5.1. GSM to DECT

5.1.5.1.1. Bearer capability 1—Iwu-attributes

TABLE 9

| Item No | Information element coding GSM | Information element coding DECT | Ref. | Map status | Ref. in ETS 300 370 | NOTE |
|---|---|---|---|---|---|---|
| 1 | bearer capability 1 Bearer capability IEI attributes | iwu-attributes ID for iwu | | M | 6.1.8.1.4 | |
| 2 | Length of bearer capabilities contents | Length of contents | | M | 6.1.8.1.5 | |
| 3 | Radio channel requirements | — | | X | | Note 1 |
| 4 | Coding standard | Coding standard | 5.1.6.1.1 | M | | |
| 5 | Transfer mode | Transfer mode | 5.1.6.1.2 | M | | |
| 6 | Information transfer capability | Information transfer capability | 5.1.6.1.3 | M | | |
| 8 | Structure | Structure | 5.1.6.1.4 | M | | |
| 9 | Duplex mode | <<end-to end-compatibility>> | 5.1.5.1.2 | M | | |
| 10 | Configuration | Configuration | 5.1.6.1.5 | M | | |
| 11 | NIRR | — | | X | | Note 1 |
| 12 | Establishment | Establishment | 5.1.6.1.6 | M | | |
| 13 | Access identity | — | | X | | Note 1 |
| 14 | Rate adaptation | User protocol ID | 5.1.6.1.7 | M | | |
| 15 | Signalling access protocol | — | | X | | Note 1 |
| 16 | Layer 1 identity | — | | X | | Note 1 |
| 17 | User information layer 1 protocol | — | | M | | Note 1 |
| 18 | Synchronous/asynchronous | <<end-to-end-compatibility>> | 5.1.5.1.2 | M | | |

TABLE 9-continued

| Item No | Information element coding GSM | Information element coding DECT | Ref. | Map status | Ref. in ETS 300 370 | NOTE |
|---|---|---|---|---|---|---|
| 19 | Number of stop bits | <<end-to-end-compatibility>> | 5.1.5.1.2 | M | | |
| 20 | Negotiation | <<end-to-end-compatibility>> | 5.1.5.1.2 | M | | |
| 21 | Number of data bits excluding parity bit if present | <<end-to-end-compatibility>> | 5.1.5.1.2 | M | | |
| 22 | User rate | <<end-to-end-compatibility>> | 5.1.5.1.2 | M | | |
| 23 | Intermediate rate | <<end-to-end-compatibility>> | 5.1.5.1.2 | M | | |
| 24 | Network independent clock on transmission | <<end-to-end-compatibility>> | 5.1.5.1.2 | M | | |
| 25 | Network independent clock on reception | <<end-to-end-compatibility>> | 5.1.5.1.2 | M | | |
| 26 | Parity information | <<end-to-end-compatibility>> | 5.1.5.1.2 | M | | |
| 27 | Connection element | — | | X | | Note 1 |
| 28 | Modem type | <<end-to-end-compatibility>> | 5.1.5.1.2 | M | | |
| 29 | Layer 2 identity | — | | X | | |
| 30 | User information layer 2 protocol | L2 protocol ID | 5.1.6.1.8 | M | | |

NOTE 1.
The value carried in this field is ignored by the FP IWU.

5.1.5.1.2. Bearer capability 1—end-to-end-compatibility

TABLE 10

| Item No | Information element coding GSM | Information element coding DECT | Ref. | Map status | Ref. in ETS 300 370 | NOTE |
|---|---|---|---|---|---|---|
| | bearer capability 1 | end-to-end-compatibility | | | | |
| 1 | Bearer capabilities IEI | ID for end-to-end compatibility | | M | 6.1.8.1.4 | |
| 2 | Length of bearer capabilities contents | Length of contents | | M | 6.1.8.1.5 | |
| 3 | Radio channel requirement | — | | X | | Note 1 |
| 4 | Coding standard | <<IWU-attributes>> | 5.1.5.1.1 | M | | |
| 5 | Transfer mode | <<iwu attributes>> | 5.1.5.1.1 | M | | |
| 6 | Information transfer capability | <<IWU-attributes>> | 5.1.5.1.1 | M | | |
| 8 | Structure | <<IWU-attributes>> | 5.1.5.1.1 | M | | |
| 9 | Duplex mode | Duplex mode (DUP) | 5.1.6.1.9 | M | | |
| 10 | Configuration | <<iwu-attributes>> | 5.1.5.1.1 | M | | |
| 11 | NIRR | — | | X | | Note 1 |
| 12 | Establishment | <<iwu-attributes>> | 5.1.5.1.1 | M | | |
| 13 | Access id. | — | | X | | Note 1 |
| 14 | Rate adaptation | <<iwu attributes>> | 5.1.5.1.1 | M | | |
| 15 | Signalling access protocol | — | | X | | Note 1 |
| 16 | Layer 1 id. | — | | X | | Note 1 |
| 17 | User information layer 1 protocol | — | | X | | Note 1 |
| 18 | Synchronous/asynchronous | Synchronous/asynchronous (S/A) 0 | 5.1.6.1.1 | M | | |
| 19 | Number of stop | Stop bits coding | 5.1.6.1.1 | M | | |

TABLE 10-continued

| Item No | Information element coding GSM | Information element coding DECT | Ref. | Map status | Ref. in ETS 300 370 | NOTE |
|---|---|---|---|---|---|---|
| | bits | | 1 | | | |
| 20 | Negotiation | Negotiation (Neg) | 5.1.6.1.12 | M | | |
| 21 | Number of data bits excluding parity bit if . . . | Data bits coding | 5.1.6.1.13 | M | | |
| 22 | User rate | User rate coding | 5.1.6.1.14 | M | | |
| 23 | Intermediate rate | Intermediate rate | 5.1.6.1.15 | M | | |
| 24 | Network independent (NIC) clock on transmission (Tx) | Network Independent Clock on transmission (NIC tx) | 5.1.6.1.16 | M | | |
| 25 | Network independent (NIC) clock on reception (Rx) | Network Independent Clock on reception (NIC Rx) | 5.1.6.1.17 | M | | |
| 26 | Parity information | Parity coding | 5.1.6.1.18 | M | | |
| 27 | Connection element | — | | X | | Note 1 |
| 28 | Modem type | Modem type | 5.1.6.1.19 | M | | |
| 29 | Layer 2 id | — | | X | | Note 1 |
| 30 | User information layer 2 protocol | <<iwu-attributes>> | 5.1.5.1.1 | M | | |

NOTE 1.
The value carried in this field is ignored by the FP IWU.

5.1.5.1.3. Lower layer compatibility—Iwu-to-iwu

If the <<Lower layer compatibility>> information element is contained in GSM CC messages, it is mapped intact into <<iwu-to-iwu>> packet <<iwu-to-iwu-information>> field. The information element <<Protocol discriminator>> in <<iwu-to-iwu>> packet will contain coding "010001"B "GSM Recommendation 04.08, elements".

5.1.5.1.4. Higher layer compatibility—Iwu-to-iwu

If the <<Higher layer compatibility>> information element is contained in GSM CC messages, it is mapped intact into <<iwu-to-iwu>> packet <<iwu-to-iwu-information>> field. The information element <<Protocol discriminator>> in <<iwu-to-iwu>> packet will contain coding "010001"B "GSM Recommendation 04.08, elements".

5.1.5.2. DECT to GSM 5.1.5.2.1. Iwu-attributes—Bearer capability 1

TABLE 11

| Item No | Information element coding DECT | Information element coding GSM | Ref. | Map status | Ref. in ETS 300 370 | NOTE |
|---|---|---|---|---|---|---|
| | iwu-attributes | bearer capability 1 | | | | |
| 1 | ID for iwu attributes | Bearer capability IEI | | M | 6.1.8.1.4 | |
| 2 | Length of contents | Length of bearer capability contents | | M | 8.1.8.1.5 | |
| 3 | Coding standard | coding standard | 5.1.6.1.1 | M | | |
| 4 | Information transfer capability | Information transfer capability | 5.1.6.1.3 | M | | |
| 5 | Negotiation indicator | — | | X | | |
| 6 | External connection type | — | | X | | |
| 7 | Transfer mode | Transfer mode | 5.1.6.1.2 | M | | |
| 8 | Information transfer rate (octet 5) | — | | X | | |
| 9 | Unit rate (octet 5a) | — | | X | | |
| 10 | Rate multiplier (octet 5a) | — | | X | | |
| 11 | Structure | Structure | 5.1.6.1.4 | | | |
| 12 | Configuration | Configuration | 5.1.6.1.5 | | | |
| 13 | Establishment | Establishment | 5.1.6.1.6 | M | | |
| 14 | Symmetry | — | | X | | |
| 15 | Information transfer rate (octet 5c) | — | | X | | |
| 16 | Unit rate (octet 5d) | — | | X | | |

TABLE 11-continued

| Item No | Information element coding DECT | Information element coding GSM | Ref. | Map status | Ref. in ETS 300 370 | NOTE |
|---|---|---|---|---|---|---|
| 17 | Rate multiplier (octet 5d) | — | | X | | |
| 18 | Protocol ID coding | — | | X | | |
| 19 | User protocol ID | Rate adaptation | 5.1.6.1.7 | M | | |
| 20 | L3 protocol ID | — | | X | | |
| 21 | L2 Protocol ID | User information layer 2 protocol | 5.1.6.1.8 | M | | |

NOTE.
The GSM Bearer service fields not presented in the table have the default values defined in subclause 8.

5.1.5.2.2. End-to-end-compatibility—Bearer capability 1

TABLE 12

| Item No | Information element coding DECT | Information element coding GSM | Ref. | Map status | Ref. in ETS 300 370 | NOTE |
|---|---|---|---|---|---|---|
| | end-to-end-compatibility | bearer capability 1 | | | | |
| 1 | ID for end-to-end compatibility | Bearer capability IEI | | M | 6.1.8.1.4 | |
| 2 | Length of contents capability contents | Length of bearer | | M | 6.1.8.1.5 | |
| 3 | Synchronous/asynchronous (S/A) | Synchronous/asynchronous | 5.1.6.1.10 | M | | |
| 4 | Negotiation (Neg) | Negotiation | 5.1.6.1.12 | M | | |
| 5 | User rate coding | User rate | 5.1.6.1.14 | M | | |
| 6 | Intermediate rate | Intermediate rate | 5.1.6.1.15 | M | | |
| 7 | Network Independent Clock on transmission (NIC tx) | Network Independent Clock (NIC) on transmission (Tx) | 5.1.6.1.16 | M | | |
| 8 | Network Independent Clock on reception (NIC rx) | Network Independent Clock (NIC) on reception (Rx) | 5.1.6.1.17 | M | | |
| 9 | Flow control on transmission (F-C tx) | — | | X | | |
| 10 | Flow control on reception (F-C rx) | — | | X | | |
| 11 | Stop bits coding | Stop bits coding | 5.1.6.1.11 | M | | |
| 12 | Data bits coding | Number of data bits excluding parity bit if . . . | 5.1.6.1.13 | M | | |
| 13 | Parity coding | Parity (information | 5.1.6.1.18 | M | | |
| 14 | Duplex mode (Dup) | Duplex mode | 5.1.6.1.9 | M | | |
| 15 | Modem type | Modem type | 5.1.6.1.19 | M | | |

NOTE.
The GSM Bearer service fields not presented in the table have the default values defined in subclause 8.

5.1.5.2.3. Iwu-to-iwu—lower layer compatibility
See subclause 5.1.5.1.3.
5.1.5.2.4. Iwu-to-iwu—Higher layer compatibility subclause 5.1.5.1.4.

5.1.6. Fields in information element coding
5.1.6.1. GSM to DECT and DECT to GSM
5.1.6.1.1. Coding standard—Coding standard

TABLE 13

| Item No | Field(s) coding GSM | Field(s) coding DECT | Ref. | Map status | Ref. in ETS 300 370 | NOTE |
|---|---|---|---|---|---|---|
| | Coding standard | Coding standard | | | | |
| 1 | "0"B | "00"B | | M | | GSM coding < = > DECT coding |
| 2 | "1"B | — | | I | | reserved |

5.1.6.1.2. Transfer mode—transfer mode

TABLE 14

| Item No | Field(s) coding GSM | Field(s) coding DECT | Ref. | Map status | Ref. in ETS 300 370 | NOTE |
|---|---|---|---|---|---|---|
| | transfer mode | transfer mode | | | | |
| 1 | "0"B | "00"B | | M | | circuit mode |
| 2 | "1"B | "10"B | | M | | packet mode |
| 3 | — | "11"B | | I | | None |

5.1.6.1.3. Information transfer capability—information transfer capability

TABLE 15

| Item No | Field(s) coding GSM | Field(s) coding DECT | Ref. | Map status | Ref. in ETS 300 370 | NOTE |
|---|---|---|---|---|---|---|
| | Information transfer capability | Information transfer capability | | | | |
| 1 | "000"B | "00000"B | | O | | Speech (1.) |
| 2 | "001"B | "01000"B | | M | | Unrestricted digital |
| 3 | "010"B | "10000"B | | M | | 3.1 kHz audio ex. PLMN (2.) |
| 4 | "011"B | "10100"B | | M | | facsimile group 3 |
| 5 | "100"B | — | | I | | speech followed by unrestr. digit. inform. |
| 6 | "111"B | — | | I | | alternate speech/fax |
| 7 | — | "01001"B | | I | | Restricted digital info |
| 8 | — | "10001"B | | I | | 7.0 kHz audio |
| 9 | — | "11000"B | | I | | Video |

NOTE 1: Coding will probably not be used especially Speech
NOTE 2: This coding is used when connection through PLMN is done to a PSTN Modem.

5.1.6.1.4. Structure—Structure

TABLE 16

| Item No | Field(s) coding GSM | Field(s) coding DECT | Ref. | Map status | Ref. in ETS 300 370 | NOTE |
|---|---|---|---|---|---|---|
| | Structure | Structure | | | | |
| 1 | "00"B | "100"B | | M | | SDU data integrity |
| 2 | "11"B | "111"B | | M | | Unstructured |
| 3 | — | "000"B | | I | | Default |
| 4 | — | "001"B | | I | | 8 kHz integrity |

5.1.6.1.5. Configuration—Configuration

TABLE 17

| Item No | Field(s) coding GSM | Field(s) coding DECT | Ref. | Map status | Ref. in ETS 300 370 | NOTE |
|---|---|---|---|---|---|---|
| | Configuration | Configuration | | | | |
| 1 | "0"B | "00"B | | M | | point-to-point |

5.1.6.1.6. Establishment—Establishment

TABLE 18

| Item No | Field(s) coding GSM | Field(s) coding DECT | Ref. | Map status | Ref. in ETS 300 370 | NOTE |
|---|---|---|---|---|---|---|
| | establishment | establishment | | | | |
| 1 | "0"B | "00"B | | M | | Demand |

5.1.6.1.7. Rate adaptation—User protocol ID

TABLE 19

| Item No | Field(s) coding GSM | Field(s) coding DECT | Ref. | Map status | Ref. in ETS 300 370 | NOTE |
|---|---|---|---|---|---|---|
| | Rate adaptation | User protocol ID | | | | |
| 1 | "00"B | — | | | | No Rate adaptation |
| 2 | "01"B | "00001"B | | M | | V.110/X.30 |
| 3 | "10"B | "01001"B | | M | | CCITT X.31 |
| 4 | — | "00000"B | | I | | User specific |
| 5 | — | "00010"B | | I | | G.711 μ-law PCM |
| 6 | — | "00011"B | | I | | G.711 A-law PCM |
| 7 | — | "00100"B | | I | | G.721 ADPCM |
| 8 | — | "00101"B | | I | | G.722 and G.725 7.0 kHz audio |
| 9 | — | "00110"B | | I | | H.261 Video |
| 10 | — | "00111"B | | I | | Non-standard rate adaptation |
| 11 | — | "01000"B | | I | | V.120 rate adaptation |
| 12 | — | "10000"B | | I | | Group 3 fax |
| 13 | — | "10001"B | | I | | Group 4 fax |
| 14 | — | "11000"B | | I | | X.28/X.29 |

5.1.6.1.8. User information layer 2 protocol—L2 protocol ID

TABLE 20

| Item No | Field(s) coding GSM | Field(s) coding DECT | Ref. | Map status | Ref. in ETS 300 370 | NOTE |
|---|---|---|---|---|---|---|
| | User information layer 2 protocol | L2 protocol ID | | | | |
| 1 | "00110"B | "00110"B | | M | | recommendation X.25 link level |
| 2 | "01000"B | "11000"B | | O | | ISO 6429, codeset 0 (DC1/DC3) Note 1. |
| 3 | "01001"B | — | | I | | X.75 layer 2 modified (teletex) |
| 4 | "01010"B | — | | I | | videotex profile 1 |
| 6 | "01100"B | "11100"B | | O | | COPnoFlCt Note 1. |

TABLE 20-continued

| Item No | Field(s) coding GSM | Field(s) coding DECT | Ref. | Map status | Ref. in ETS 300 370 | NOTE |
|---|---|---|---|---|---|---|
| 7 | — | "00000"B | | I | | User specific |
| 8 | — | "00001"B | | I | | Basic mode ISO 1745 |
| 9 | — | "00010"B | | I | | CCITT Q.921/1.441 |
| 10 | — | "00111"B | | I | | CCITT X.25 multilink |
| 11 | — | "01000"B | | I | | Extended LAPB |
| 12 | — | "01100"B | | I | | ISO 8802/2 |
| 13 | — | "10001"B | | I | | ISO 8802/x |
| 14 | — | "10010"B | | I | | GSM 04.06 |
| 15 | — | "10110"B | | I | | CCITT V.42 |

NOTE 1. A new coding suggested in subclause 6 of this document.

5.1.6.1.9. Duplex mode—Duplex mode (DUP)

TABLE 21

| Item No | Field(s) coding GSM | Field(s) coding DECT | Ref. | Map status | Ref. in ETS 300 370 | NOTE |
|---|---|---|---|---|---|---|
| | duplex mode | duplex mode (DUP) | | | | |
| 1 | "0"H | "0"B | | M | | half duplex |
| 2 | "1"B | "1"B | | M | | full duplex |

5.1.6.1.10. Synchronous/asynchronous—Synchronous/asynchronous (S/A)

TABLE 22

| Item No | Field(s) coding GSM | Field(s) coding DECT | Ref. | Map status | Ref. in ETS 300 370 | NOTE |
|---|---|---|---|---|---|---|
| | Synchronous/ asynchronous | Synchronous/ asynchronous | | | | |
| 1 | "0"B | "0"B | | M | | synchronous |
| 2 | "1"B | "1"B | | M | | asynchronous |

5.1.6.1.11. Number of stop bits—stop bit coding

TABLE 23

| Item No | Field(s) coding GSM | Field(s) coding DECT | Ref. | Map status | Ref. in ETS 300 370 | NOTE |
|---|---|---|---|---|---|---|
| | number of stop bits | stop bit coding | | | | |
| 1 | — | "00"B | | I | | Not used (1.) |
| 2 | "0"B | "01"B | | M | | 1 bit (1.) |
| 3 | — | "01"B | | I | | 1.5 bits |
| 4 | "1"B | "11"B | | M | | 2 bits |

NOTE 1. GSM uses "1 bit" coding in the case of bit oriented protocol. DECT could use "Not used" coding.

5.1.6.1.12. Negotiation—Negotiation (Neg)

TABLE 24

| Item No | Field(s) coding GSM | Field(s) coding DECT | Ref. | Map status | Ref. in ETS 300 370 | NOTE |
|---|---|---|---|---|---|---|
| | Negotiation | Negotiation (Neg) | | | | |
| 1 | "0"B | "0"B | | M | | in band negotiation not possible |
| 2 | — | "1"B | | I | | in band negotiation possible |

5.1.6.1.13. Number of data bits exI. parity—data bits coding

TABLE 25

| Item No | Field(s) coding GSM | Field(s) coding DECT | Ref. | Map status | Ref. in ETS 300 370 | NOTE |
|---|---|---|---|---|---|---|
| | Number of data bits exl. parity | Data bits coding | | | | |
| 1 | — | "00"B | | I | | Not used (1.) |
| 2 | — | "01"B | | I | | 5 bits |
| 3 | "0"B | "10"B | | M | | 7 bits |
| 4 | "1"B | "11"B | | M | | 8 bits (1.) |

NOTE 1. GSM uses "8 bits" coding in the case of bit oriented protocol. DECT could use "Not used" coding.

5.1.6.1.14. User rate—User rate coding

TABLE 26

| Item No | Field(s) coding GSM | Field(s) coding DECT | Ref. | Map status | Ref. in ETS 300 370 | NOTE |
|---|---|---|---|---|---|---|
| | User rate | User rate coding | | | | |
| 1 | "0001"B | "11110"B | | M | | 0.3 kbit/s |
| 2 | "0010"B | "00010"B | | M | | 1.2 kbit/s |
| 3 | "0011"B | "00011"B | | M | | 2.4 kbit/s |
| 4 | "0100"B | "00101"B | | M | | 4.8 kbit/s |
| 5 | "0101"B | "01000"B | | M | | 9.6 kbit/s |
| 6 | "0110"B | "11111"B | | M | | 12 kbit/s |
| 7 | "0111"B | "11000"B | | M | | 1.2 kbit/s/ 75 bit/s |

5.1.6.1.15. Intermediate rate—intermediate rate

TABLE 27

| Item No | Field(s) coding GSM | Field(s) coding DECT | Ref. | Map status | Ref. in ETS 300 370 | NOTE |
|---|---|---|---|---|---|---|
| | Intermediate rate | Intermediate rate | | | | |
| 1 | "00"B | "00"B | | I | | not used |
| 2 | "01"B | — | | I | | reserved |
| 3 | "10"B | "01"B | | M | | 8 kbit/s |
| 4 | "11" | "10"B | | M | | 16 kbit/s |
| 5 | — | "11"B | | I | | 32 kbit/s |

5.1.6.1.16. Network independent clocking (NIC) on transmission (Tx)—Network independent clocking on transmission (NIC Tx)

TABLE 28

| Item No | Field(s) coding GSM | Field(s) coding DECT | Ref. | Map status | Ref. in ETS 300 370 | NOTE |
|---|---|---|---|---|---|---|
| | NIC on Tx | NIC on Tx | | | | |
| 1 | "0"B | "0"B | | M | | not required |
| 2 | "1"B | "1"B | | M | | required |

5.1.6.1.17. Network independent clocking (NIC) on reception (Tx)—Network independent clocking on reception (NIC Tx)

TABLE 29

| Item No | Field(s) coding GSM | Field(s) coding DECT | Ref. | Map status | Ref. in ETS 300 370 | NOTE |
|---|---|---|---|---|---|---|
| | NIC on Tx | NIC on Tx | | | | |
| 1 | "0"B | "0"B | | M | | not required |
| 2 | "1"B | "1"B | | M | | required |

5.1.6.1.18. Parity information—parity coding

TABLE 30

| Item No | Field(s) coding GSM | Field(s) coding DECT | Ref. | Map status | Ref. in ETS 300 370 | NOTE |
|---|---|---|---|---|---|---|
| | parity information | parity coding | | | | |
| 1 | "000"B | "000"B | | M | | odd |
| 2 | "010"B | "010"B | | M | | even |
| 3 | "011"B | "011"B | | M | | none |
| 4 | "100"B | "100"B | | M | | forced to 0 |
| 5 | "101"B | "101"B | | M | | forced to 1 |

5.1.6.1.19. Modem type—Modem type

TABLE 31

| Item No | Field(s) coding GSM | Field(s) coding DECT | Ref. | Map status | Ref. in ETS 300 370 | NOTE |
|---|---|---|---|---|---|---|
| | modem type | modem type | | | | |
| 1 | "00000"B | — | | I | | none |
| 2 | "00001"B | "000001"B | | M | | V.21 |
| 3 | "00010"B | "000010"B | | M | | V.22 |
| 4 | "00011"B | "000011"B | | M | | V.22 bis |
| 5 | "00100"B | "000100"B | | M | | V.23 |
| 6 | — | "000101"B | | I | | V.26 |
| 7 | — | "000110"B | | I | | V.26 bis |
| 8 | "00101"B | "000111"B | | M | | V.26 ter |
| 9 | — | "001000"B | | I | | V.27 |
| 10 | — | "001001"B | | I | | V.27 bis |
| 11 | — | "001010"B | | I | | V.27 ter |
| 12 | — | "001011"B | | I | | V.29 |
| 13 | "00110"B | "001100"B | | M | | V.32 |

TABLE 31-continued

| Item No | Field(s) coding GSM | Field(s) coding DECT | Map Ref. | status | Ref. in ETS 300 370 | NOTE |
|---|---|---|---|---|---|---|
| 14 | — | "001101"B | | I | | V.35 |
| 15 | "00111"B | — | | I | | modem for undefined interface |
| 16 | "01000"B | "001110"B | | I | | autobauding type 1 NOTE 1. |

NOTE 1. A new coding suggested in subclause 6 of this document.

5.1.6.1.20. Cause-value—Release Reason-code

The following mappings are additions to ETS 300 370 [31] subclause 6.1.8.2.23.

TABLE 32

| Item No | Field(s) coding GSM | Field(s) coding DECT | Map status | NOTE |
|---|---|---|---|---|
| | Cause number | Release Reason-code (Hex) | | |
| 1 | 63 | 05 | M | "Service or option not available, unspecified" <-> "Incompatible service" |
| 2 | 79 | 07 | M | "Service or option not implemented, unspecified" <-> "Negotiation not supported" |

5.2. FP U-plane IWU Procedures 5.2.1. General

This section defines the functional requirements of the FP IWU for the mapping of the user data and the C.2 data profile U-plane flow. Both Transparent and Non-Transparent options have been decribed. However, it is not a mandatory requirement to support both options. It is recommended to provide the Non Transparent interworking since its functionality is closer to the DECT air interface opreration of LAPU.

5.2.2. Transparent service (T)

5.2.2.1. General

Due to usage of LAPU no complete synchronism between the endpoints can be guaranteed.

Figure 17:
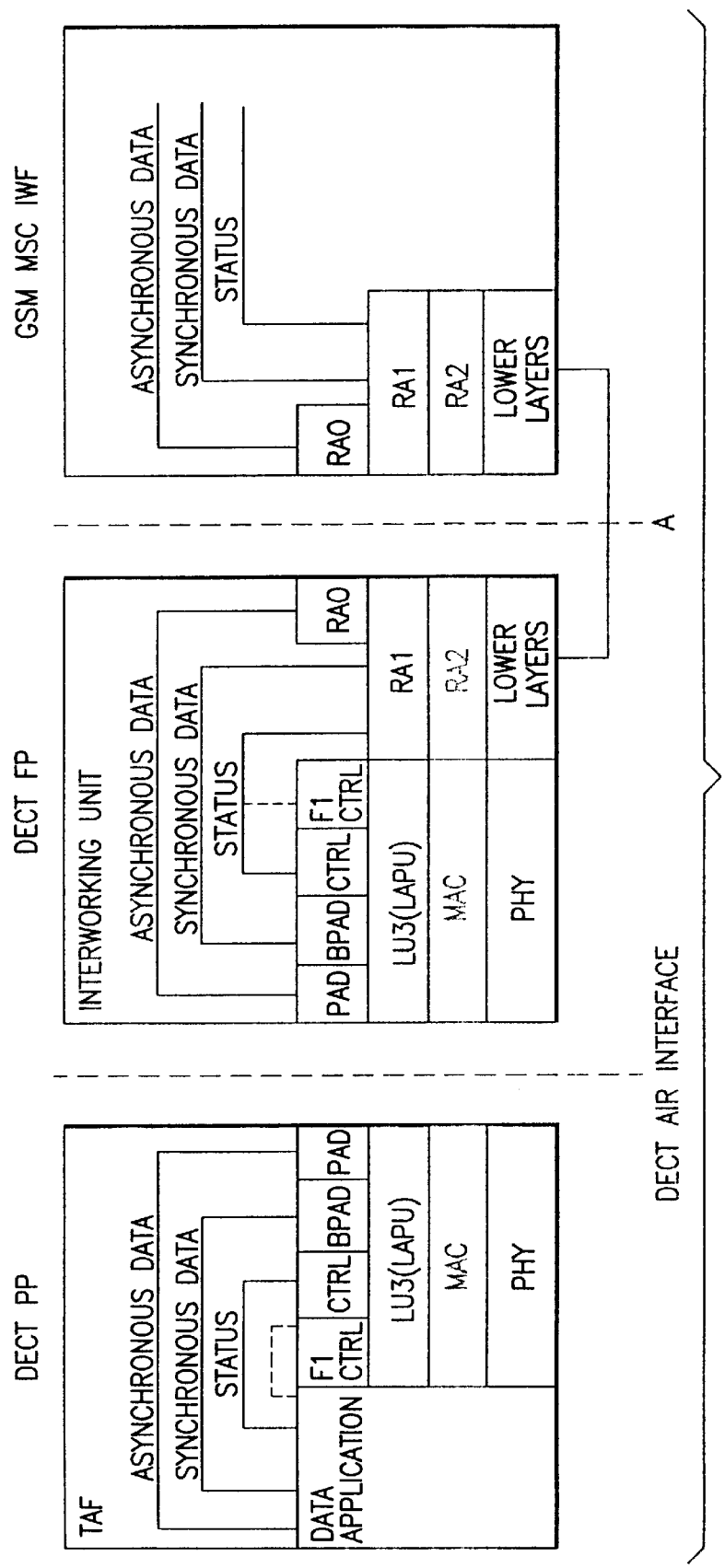
FIG. 17 shows the rate adaptation for the DECT/GSM inter-working of GSM transparent (T) service.

The rate adaptation of the GSM data flow will be done in the FP IWU. A general structure of the rate adaptation function is illustrated in FIG. 17. In the figure it is assumed that the FP is connected to the MSC through the A interface. The functionality of the IWU is to map the synchronous, asynchronous and status data to respective DECT C.2 profile functionality. FP seen by the MSC correspond to the GSM MS TAF functionality.

5.2.2.1.1. Asynchronous

The FP IWU will contain the V.110 RA2, RA1 and RA0 adaptation functions. The information of the RA0 and RA1 will be mapped as follows:

the CCITT V series status information of RA1 will be mapped to the C.2 LAPU Control frame as defined in subclause 5.2.2.3 of this document. The status octets are not carried in the LAPU information frames.

user information of the RA0 will be forwarded C.2 PAD function defined in the subclause 10.1 of the DECT C.2 data profile [30] following the rules defined in the same subclause. The LAPU frame lengths should be adjusted to fit the buffering requirements related to the transparent service.

5.2.2.1.2. Synchronous

The FP IWU will contain the V.110 RA2 and RA1 adaptation functions. The information from the RA1 will be mapped as follows:

the CCITT V series status information of RA1 will be mapped to the respective DECT function defined in the subclause 5.2.2.2 of this document. The status octets are not carried in the LAPU information frames.

user information of the RA0 will be forwarded C.2 BPAD function defined in the subclause 10.2 of the DECT C.2 data profile [30] following the rules defined in the same subclause. The LAPU frame lengths should be adjusted to fit the buffering requirements related to the transparent service.

5.2.2.2. CCITT V.24 Interchange circuit signalling mapping

The CCITT V.24 signalling status information will be mapped between the DECT LAPU control frame function and respective GSM function as follows.

DECT C.2 Data profile Control Status octet defined in C.2 data profile [30] subclause 10.3 is used with <<Frame type coding>> indicating V.24 status interworking.

the status change of the V.24 interface circuits 108, 107, 105, 109 and 106 mapping will be done as shown in tables 24 and 25.

In the direction of GSM to DECT only in the change situation of a status of each SA, SB or X bit will be mapped thus if not change has occurred in the status bit of GSM data flow not LAPU control frame is sent.

In the direction of DECT to GSM the FP IWU will map the old status of a status bit towards GSM if no LAPU control frames with new value has received.

the status of the CCITT V.24 circuits 106 and 105 is mapped into/from the PAD/BPAD flow control

TABLE 24

| Item No | V.24 circuit in direction of GSM => DECT | V.110 bit | DECT LAPU control frame bit | Note |
|---|---|---|---|---|
| 1 | 107 | S1, S2, S3, S6, S8 = SA | DSR coding | DSR |
| 2 | 109 | S4, S9 = SB | DCD coding | CD |
| 3 | 106 | x | Ignored | CTS Note 1. |

TABLE 25

| Item No | V.24 circuit in direction of DECT => GSM | V.110 bit | DECT LAPU control frame bit | Note |
|---|---|---|---|---|
| 1 | 108 | S1, S2, S3, S6, S8 = SA | DTR coding | DTR |
| 2 | 105 | S4, S9 = SB | Ignored | RTS Note 1. |
| 3 | 106 | x | Ignored | CTS Note 1. |

NOTE 1. DECT provides its own flow control mechanism and end-to-end flow control is not recommended. See subclauses 5.2.2.3 and 5.2.3.3.

5.2.2.3. Flow control

The flow control situation indicated by the X-bit or buffers backpressure are mapped into the C.2 data profile [30] PAD/BPAD flow control functionality as defined in respective C.2 profile PAD/BPAD subclauses. It is the matter of implementation to ensure that no data loss occur in flow control.

5.2.2.4. Call establishment signalling mapping

The mapping between DECT call establishment in the FP IWU is done as defined in the ETS 300 370 [31] and in this document in subclause 5.

5.2.3. Non-transparent service (NT)

5.2.3.1. General

Figure 18:
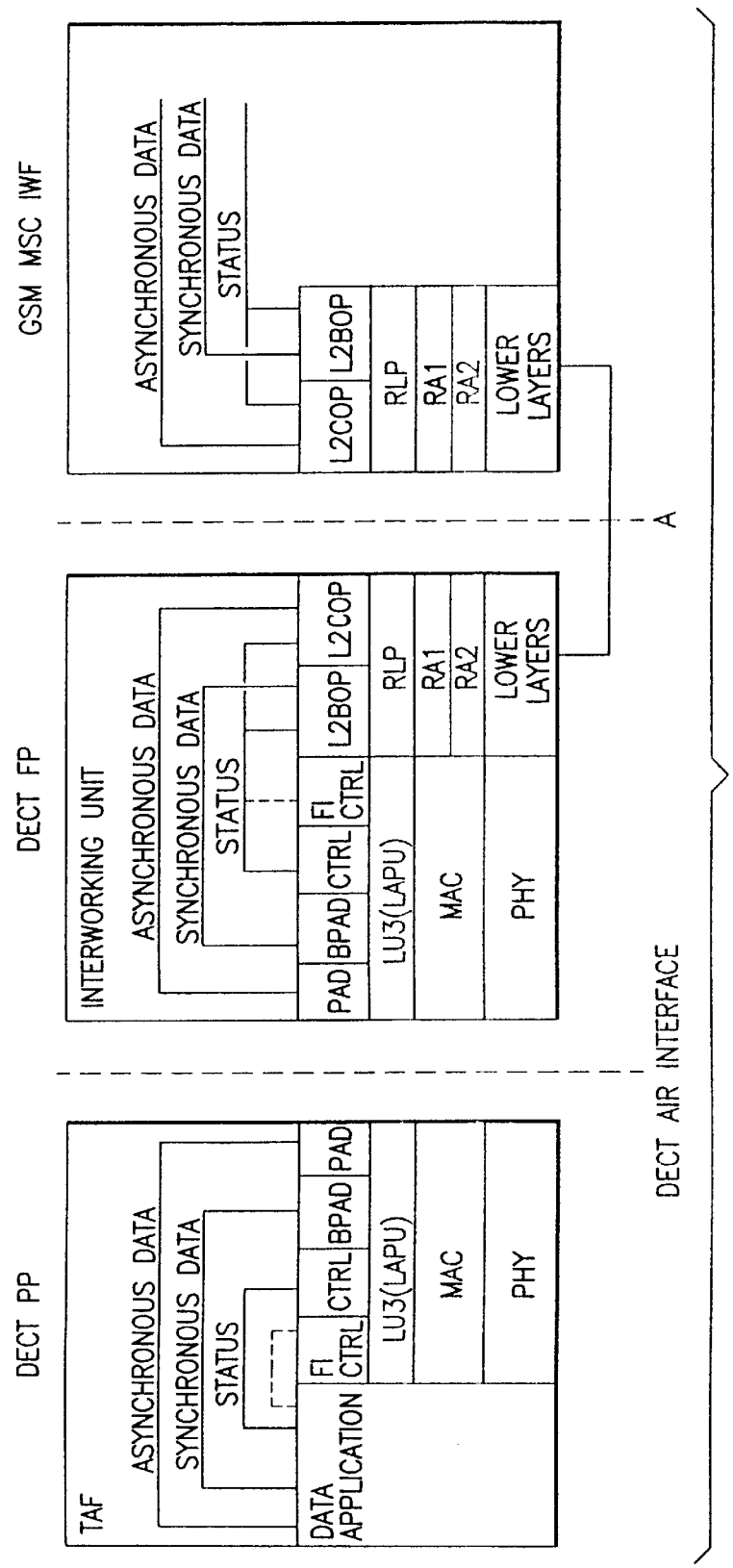
FIG. 18 shows the rate adaptation for the DECT/GSM inter-working of GSM non-transparent (NT) service.

The rate adaptation of the GSM data flow will take place in the FP IWU. A general figure of the rate adaptation functions of GSM non-transparent (NT) case is illustrated in FIG. 18. In the figure it is assumed that the FP is connected to the MSC through the A interface.

The RLP entity and LAPU entity in FP will function completely independently. That is, frame retransmissions and control information regarding RLP and LAPU functions are not dependent of each other.

5.2.3.1.1. Asynchronous

The FP IWU will contain the RA2, RA1, RLP and L2COP functions. The information from the L2COP will be mapped as follows:

The status octets are not carried in the LAPU information frames.

the status bit (3 first bits) information of the status octet will be mapped to the respective DECT function defined in the subclause 5.2.2.3.

character octets will be forwarded to the C.2 PAD function as defined in the subclause 10.1 of the DECT C.2 data profile [30] following the rules defined in the same subclause.

fill octets are not forwarded to the C.2. PAD function.

break signal status received from GSM direction is mapped into the LAPU control frame <<Break coding>> with indication of "Break condition occurred". The duration of the break signal in the BREAK/PAUSE duration octet should be in between 135 ms and 200 ms as defined by GSM 07.02 [33].

break signal status received from DECT direction is mapped into the L2COP address field as defined in the GSM 07.02 [33]. The duration information is ignored.

5.2.3.1.2. Synchronous

The FP IWU will contain the RA2, RA1, RLP and L2BOP functions. The information of the L2BOP will be mapped as follows:

The status octets are not carried in the LAPU information frames.

the status bit (3 first bits) information of the status octet will be mapped to the respective function defined in the subclause 5.2.2.3.

the address bit (5 last bits) information of the status octet is utilized as follows: if address has the value 31 no L2BOP remaining information is forwarded to LAPU information frame. Other address values are ignored.

user information will be forwarded to the C.2 BPAD function as defined in the subclause 10.1 of the DECT C.2 data profile [30] following the rules defined in the same subclause.

fill octets are not inserted to the C.2 LAPU octets.

5.2.3.2. Interchange circuit signalling mapping

See sublause 5.2.2.2.

5.2.3.3. Flow control

The flow control situation indicated by the X-bit or buffers backpressure are mapped into the C.2 data profile [30] PAD/BPAD flow control functionality as defined in respective C.2 profile PAD/BPAD subclauses. It is the matter of implementation to ensure that no data loss occur in flow control.

5.2.3.4. Call establishment signalling mapping

See subclause 5.2.2.4.

5.2.4. Synchronization

It is the responisbilty of the FP to guarantee that no user data is conveyed before both RLP and LAPU links have been succefully established. No CCITT V.24 signalling information is conveyed before information regarding the ready status of the MSC-network connection is guaranteed.

5.3. PP C-plane IWU Procedures

For CCITT V.24 interworking of the PP C-plane procedures are recommended as defined in the C.2 data profile C.2 TAF annex [30].

The mapping between the PP C-plane and V.25bis commands is done according to the C.2 data profile annex C.2 [30].

5.4. PP U-plane IWU Procedures

For CCITT V.24 interworking of the PP U-plane procedures are recommended as defined the C.2 data profile C.2 TAF annex.

6. ADDITIONS TO THE BASE STANDARD

The following changes and additions should be done to the DECT Common interface standard in order to facilitate the optional service negotiation options.

6.1. Exchange Attributes Negotiation 6.1.1. {CC-RELEASE-COM} message

A new structure of the {CC-RELEASE-COM} message is presented below. The subclause numbers are referring the respective clauses in the ETS 300 175-5 [5] standard.

6.3.2.9 CC-RELEASE-COMplete

This message indicates that the sending entity has released the call and the call reference, and the receiving entity shall release the call and call reference.

| Message Type<br>CC-RELEASE-COMplete<br>Information<br>Element | Sub-<br>clause | Format<br>S<br>F to P<br>message | Directions<br>Both<br>P to F<br>message | Length<br>oct |
|---|---|---|---|---|
| Protocol Discriminator | 7.2 | M | M | — |
| Transaction Identifier | 7.3 | M | M | — |
| Message Type | 7.4 | M | M | 1 |
| Release Reason | 7.6.7 | O | O | 2 |
| Identity type 3 | 7.7.19 | O | N | 4 |
| Location area 3 | 7.7.25 | O | N | 3–* |
| IWU attributes 1 | 7.7.21 | O | O | 5–12 |
| End-to-end compatib. 1 | 7.7.14 | O | O | 3–6 |
| Facility | 7.7.15 | O | O | 2–* |
| Display | 7.5.5 | O | N | 2–* |
| Feature Indicate | 7.7.17 | O | N | 4–* |
| Network parameter 2 | 7.7.29 | O | N | 4–* |
| IWU-TO-IWU | 7.7.23 | O | O | 4–* |
| IWU-PACKET | 7.7.22 | O | O | 4–* |

M = Mandatory;
N = Not allowed;
O = Optional;
NOTE 1:
The <<IWU-ATTRIBUTES>> and <<END-TO-END-COMPATIBILITY>> elements shall be included if exchanged attribute negotiation is supported. See subclause 15.2.3.
NOTE 2:
Mandatory when responding to an external handover release.
NOTE 3:
Optional when responding to an external handover release.

6.2. Extended Exchange Parameter Negotiation

A new structure of the {CC-CALL-PROCEEDING} and {CC-CONNECT} messages is presented below. The subclause numbers are referring the respective clauses in ETS 300 175-5 [5] standard. A new coding has to be added into the <<IWU-ATTRIBUTES >>.

6.2.1. {CC-CALL-PROCEEDING} message 6.3.2.4 CC-CALL-PROCeeding

This message indicates that the requested (onward) connection establishment has been initiated by the fixed side interworking unit.

| Message Type<br>CC-CALL-PROCeeding<br>Information<br>Element | Sub-<br>clause | Format<br>S<br>F to P<br>message | Directions<br>F=>P<br>P to F<br>message | Length<br>oct |
|---|---|---|---|---|
| Protocol Discriminator | 7.2 | M | — | — |
| Transaction Identifier | 7.3 | M | — | — |
| Message Type | 7.4 | M | — | 1 |
| Call Attributes 3 | 7.7.11 | O | — | 6–11 |
| Connection identity | 7.7.12 | O | — | 3–* |
| Facility | 7.7.31 | O | — | 2–* |
| Progress indicator | 7.7.31 | O | — | 4 |
| Display | 7.5.5 | O | — | 2–* |
| Signal 2 | 7.6.8 | O | — | 2 |
| Feature Indicate | 7.7.17 | O | — | 4–* |
| Transit Delay 4 | 7.7.42 | O | — | 4 |
| Window size 4 | 7.7.43 | O | — | 4 |
| IWU attributes 5 | 7.7.21 | O | — | 5–12 |
| End-to-end compatib. 5 | 7.7.14 | O | — | 3–6 |
| IWU-TO-IWU | 7.7.23 | O | — | 4–* |
| IWU-PACKET | 7.7.22 | O | — | 4–* |

M = Mandatory;
O = Optional;
— = not applicable.
NOTE 1:
This message may be used in the direction P=>F when using the "OVERLAP RECEIVING" operations.

-continued

| Message Type<br>CC-CALL-PROCeeding<br>Information<br>Element | Sub-<br>clause | Format<br>S<br>F to P<br>message | Directions<br>F=>P<br>P to F<br>message | Length<br>oct |
|---|---|---|---|---|

NOTE 2:
Included if the FT optionally provides additional information describing tones.
NOTE 3:
Included if prioritized list negotiation is used.
NOTE 4:
Included if operational parameter negotiation is used.
NOTE 5:
The <<IWU-ATTRIBUTES>> and <<END-TO-END-COMPATIBILITY>> elements shall be included if extended exchanged parameter negotiation is supported.

6.2.2. {CC-CONNECT} messages 6.3.2.6 CC-CONNECT

This message is sent by the FT to indicate completion of the connection through the WCPE network, and by the PT to request such completion.

| Message Type<br>CC-CONNECT<br>Information<br>Element | Sub-<br>clause | Format<br>S<br>F to P<br>message | Directions<br>Both<br>P to F<br>message | Length<br>oct |
|---|---|---|---|---|
| Protocol Discriminator | 7.2 | M | M | — |
| Transaction Identifier | 7.3 | M | M | — |
| Message Type | 7.4 | M | M | 1 |
| Call Attributes 2 | 7.7.11 | O | O | 6–11 |
| Connection identity | 7.7.12 | O | O | 3–* |
| Facility | 7.7.15 | O | O | 2–* |
| Progress Indicator | 7.7.31 | O | N | 4 |
| Display | 7.5.5 | O | N | 2–* |
| Signal 1 | 7.6.8 | O | N | 2 |
| Feature Indicate | 7.7.17 | O | N | 4–* |
| Terminal capability | 7.7.41 | N | O | 3–7 |
| Transit Delay 3 | 7.7.42 | O | O | 4 |
| Window size 3 | 7.7.43 | O | O | 4 |
| IWU attributes 4 | 7.7.21 | O | O | 5–12 |
| End-to-end compatib. 4 | 7.7.14 | O | O | 3–6 |
| IWU-TO-IWU | 7.7.23 | O | O | 4–* |
| IWU-PACKET | 7.7.22 | O | O | 4–* |

M = Mandatory;
N = Not allowed;
O = Optional;
NOTE 1:
Included if the FT optionally provides additional information describing tones.
NOTE 2:
Included if prioritised list negotiation is used.
NOTE 3:
Included if operational parameter negotiation is used.
NOTE 4:
The <<IWU-ATTRIBUTES>> and <<END-TO-END-COMPATIBILITY>> elements shall be included if extended exchanged parameter negotiation is supported.

6.3. New <<IWU-ATTRIBUTES >> Coding

Negotiation indicator (octet 4):

| Bits | 7 6 5 | Meaning |
|---|---|---|
| | 1 0 1 | Extended exchange parameter negotiation |

Layer 2 protocol ID (octet 6):

| Bits | 5 4 3 2 1 | Meaning |
|---|---|---|
| | 1 1 1 0 0 | Character Oriented Protocol no Flow control |
| | 1 1 0 0 0 | ISO6429 |

6.4. New <<END-TO-END-COMPATIBLITY>> Coding Modem type (octet 4):

| Bits | 6 5 4 3 2 1 | Meaning |
|---|---|---|
| | 0 0 1 1 1 0 | Autobauding 1 |

Authors note: charaters in the coding selection indicate that a new unused coding set has to be selected.

7. INTERWORKING CONNECTION TYPES
7.1. Connection Type Definitions

The supported bearer services are defined in subclause 4.4.2 in table 1. The default coding using the <<IWU-ATRIBUTES>> and <<END-TO-END-COMPATIBLITY>> information elements for all the bearer services are defined in the table Q. These codings should be used in the DECT air interface in order to facilitate connection to GSM bearer services 21–26, 31–34 and 41–45. The values presented here are not all mapped into the respective GSM value but they have importance in the DECT environment. The presence of multiple values in the Field value column indicates options.

7.1.1. IWU-ATTRIBUTES information element for BS 21 . . . 26 UDI

| Octet | Information element field | Field value | Note |
|---|---|---|---|
| 3 | Coding standard | DECT standard coding | |
| 3 | Information transfer capability | Unrestricted Digital information | |
| 4 | Negotiation indicator | Negotiation not possible Exchanged parameter negotiation Extended exchange parameter negotiation | The value should be selected according to the negotiation capabilities of DECT. See subclause 5.1. |
| 4 | External connection type | Connection oriented | |
| 5 | Transfer mode | Circuit | Default value |
| 5 | Information transfer rate | Unspecified | |
| 5b | Structure | SDU | The SDU value is selected since the C.2 profile uses LAPU protocol that is comparable to GSM NT case. This value should be selected always. |
| 5b | Configuration | point-to-point | |
| 5b | Establishment | Demand | |
| 6 | Protocol ID coding | User prot ID L2 prot ID | |
| 6 | User protocol ID | V.110/X.30 | |
| 8 | L2 Protocol ID | ISO6429 COPnoFICT "omitted" | New proposed value New proposed value |

7.1.2. END-TO-END-COMPATIBLITY information element for BS 21 . . . 26, UDI

| Octet | Information element field | Field value | Note |
|---|---|---|---|
| 3 | Synchronous/ asynchronous (S/A) | Async | |
| 3 | Negotiation (Neg) | in band negotiation not possible | Default value |
| 3 | User rate coding | 0.3, 1.2, 2.4, 4.8, 9.6, 1.2/0.0075 | |
| 3a | Intermediate rate | 8 16 | These values are GSM radio and IWF related. However, the values have to be present if the V.110/X.30 is selected. The value should be selected according the GSM rules |
| 3a | Network Independent Clock on transmission (NIC tx) | not required | Default value |
| 3a | Network Independent Clock on reception (NIC rx) | not accepted | Default value |
| 3a | Flow control on transmission (F-C tx) | Not required Required | Not required should be selected if COPNoFICt is the value of Layer 2 ID |
| 3a | Flow control on reception (F-C rx) | Cannot accept Can accept | Cannot accept should be selected if COPNoFICt is the value of Layer 2 ID |
| 3b | Stop bits coding | 1 2 | Selection |
| 3b | Data bits coding | 7 8 | Selection |
| 3b | Parity coding | odd, even, 0, 1, none | Selection |
| 3c | Duplex mode (Dup) | full duplex | The full duplex value is a default. This octet is omitted. |
| 3c | Modem type | — | Octet is omitted since no modem type is defined |

7.1.3. IWU-ATTRIBUTES information element for BS 21 . . . 26 3.1 kHz

| Octet | Information element field | Field value | Note |
|---|---|---|---|
| 3 | Coding standard | DECT standard coding | |
| 3 | Information transfer capability | 3.1 kHz | |
| 4 | Negotiation indicator | Negotiation not possible Exchanged parameter negotiation Extended exchange parameter negotiation | The value should be selected according to the negotiation capabilities of DECT. See subclause 5.1. |
| 4 | External connection type | Connection oriented | |
| 5 | Transfer mode | Circuit | Default value |
| 5 | Information transfer rate | Unspecified | |
| 5b | Structure | SDU | The SDU value is selected since the C.2 profile uses LAPU protocol that is comparable to GSM NT |

7.1.4. END-TO-END-COMPATIBLITY information element for BS 21 . . . 26, 3.1 kHz -continued

| Octet | Information element field | Field value | Note |
|---|---|---|---|
| | | | case. This value should be selected always. |
| 5b | Configuration | point-to-point | |
| 5b | Establishment | Demand | |
| 6 | Protocol ID coding | L2 prot ID | |
| 8 | L2 Protocol ID | ISO6429 | New proposed value |
| | | COPnoFICT | New proposed value |
| | | "omitted" | |

7.1.4. END-TO-END-COMPATIBLITY information element for BS 21 . . . 26, 3.1 kHz

| Octet | Information element field | Field value | Note |
|---|---|---|---|
| 3 | Synchronous/ asynchronous (S/A) | Async | |
| 3 | Negotiation (Neg) | in band negotiation not possible | Default value |
| 3 | User rate coding | 0.3, 1.2, 2.4, 4.8, 9.6, 1.2/0.0075 | |
| 3a | Intermediate rate | 8 16 | These values are GSM radio and IWF related. However, the values have to be present if the V.110/X.30 is selected. The value should be selected according the GSM rules. |
| 3a | Network Independent Clock on transmission (NIC tx) | not required | Default value |
| 3a | Network Independent Clock on reception (NIC rx) | not accepted | Default value |
| 3a | Flow control on transmission (F-C tx) | Not required Required | Not required should be selected if COPNoFICt is the value of Layer 2 ID |
| 3a | Flow control on reception (F-C rx) | Cannot accept Can accept | Cannot accept should be selected if COPNoFICt is the value of Layer 2 ID |
| 3b | Stop bits coding | 1 2 | Selection |
| 3b | Data bits coding | 7 8 | Selection |
| 3b | Parity coding | odd, even, 0, 1, none | Selection |
| 3c | Duplex mode (Dup) | full duplex | The full duplex value is a default. |
| 3c | Modem type | V.21 V.22 V.26ter V.32 V.23 | |

NOTE
octet 3a could be omitted since the V.110/X.30 is not indicated in the User protocol ID.

7.1.5. IWU-ATTRIBUTES information element for BS 31 . . . 34, non X.32, UDI

| Octet | Information element field | Field value | Note |
|---|---|---|---|
| 3 | Coding standard | DECT standard coding | |
| 3 | Information transfer capability | Unrestricted Digital information | |
| 4 | Negotiation indicator | Negotiation not possible Exchanged parameter negotiation Extended exchange parameter negotiation | The value should be selected according to the negotiation capabilities of DECT. See subclause 5.1. |
| 4 | External connection type | Connection oriented | |
| 5 | Transfer mode | Circuit | Default value |
| 5 | Information transfer rate | Unspecified | |
| 5b | Structure | Unstructured | The SDU value is selected since the C.2 profile uses LAPU protocol that is comparable to GSM NT case. Unstructured can be used only with GSM T service. |
| 5b | Configuration | point-to-point | |
| 5b | Establishment | Demand | |
| 6 | Protocol ID coding | User prot ID | |
| 6 | User protocol ID | V.110/X.30 | |

7.1.6. END-TO-END-COMPATIBLITY information element for BS 31 . . . 34, non X.32, UDI

| Octet | Information element field | Field value | Note |
|---|---|---|---|
| 3 | Synchronous/ asynchronous (S/A) | Sync | |
| 3 | Negotiation (Neg) | in band negotiation not possible | Default value |
| 3 | User rate coding | 0.3, 1.2, 2.4, 4.8, 9.6 | |
| 3a | Intermediate rate | 8 16 | These values are GSM radio and IWF related. However, the values have to be present if the V.110/X.30 is selected. The value should be selected according the GSM rules |
| 3a | Network Independent Clock on transmission (NIC tx) | not required | Default value |
| 3a | Network Independent Clock on reception (NIC rx) | not accepted | Default value |
| 3a | Flow control on transmission (F-C tx) | Not required Required | Not required should be selected if COPNoFICt is the value of Layer 2 ID |
| 3a | Flow control on reception (F-C rx) | Cannot accept Can accept | Cannot accept should be selected if COPNoFICt is the value of Layer 2 ID |

-continued

| Octet | Information element field | Field value | Note |
|---|---|---|---|
| 3b | Stop bits coding | 1 | The value if octet is present |
| 3b | Data bits coding |  | The value if octet is present |
| 3b | Parity coding | none | The value if octet is present |
| 3c | Duplex mode (Dup) | full duplex | The full duplex value is a default. |
| 3c | Modem type | — | The octet is omitted since no modem type is defined |

NOTE.
Octets 3b and 3c could be omitted.

7.1.7. IWU-ATTRIBUTES information element for BS 31 . . . 34, X.32, UDI

| Octet | Information element field | Field value | Note |
|---|---|---|---|
| 3 | Coding standard | DECT standard coding |  |
| 3 | Information transfer capability | Unrestricted Digital information |  |
| 4 | Negotiation indicator | Negotiation not possible Exchanged parameter negotiation Extended exchange parameter negotiation | The value should be selected according to the negotiation capabilities of DECT. See subclause 5.1. |
| 4 | External connection type | Connection oriented |  |
| 5 | Transfer mode | Circuit | Default value |
| 5 | Information transfer rate | Unspecified |  |
| 5b | Structure | SDU | The SDU value is selected since the C.2 profile uses LAPU protocol that is comparable to GSM NT case. Unstructured can be used only with GSM T service. |
| 5b | Configuration | point-to-point |  |
| 5b | Establishment | Demand |  |
| 6 | Protocol ID coding | User prot ID Layer 2 protocol ID |  |
| 6 | User protocol ID | X.31 |  |
| 7 | L3 protocol ID | — |  |
| 8 | L2 Protocol ID | X.25 |  |

7.1.8. END-TO-END-COMPATIBLITY information element for BS 31 . . . 34, X.32, UDI

| Octet | Information element field | Field value | Note |
|---|---|---|---|
| 3 | Synchronous/asynchronous (S/A) | Sync |  |
| 3 | Negotiation (Neg) | in band negotiation not possible | Default value |
| 3 | User rate coding | 0.3, 1.2, 2.4, 4.8, 9.6, 1.2/0.075 |  |
| 3a | Intermediate rate | 8 16 | These values are GSM radio and IWF related. However, the values have to be present if the V.110/X.30 is selected. The value should be selected according to the GSM rules |
| 3a | Network Independent Clock on transmission (NIC tx) | not required | Default value |
| 3a | Network Independent Clock on reception (NIC rx) | not accepted | Default value |
| 3a | Flow control on transmission (F-C tx) | Not required Required | Not required should be selected if COPNoFICt is the value of Layer 2 ID |
| 3a | Flow control on reception (F-C rx) | Cannot accept Can accept | Cannot accept should be selected if COPNoFICt is the value of Layer 2 ID |
| 3b | Stop bits coding | 1 | The value if octet is present |
| 3b | Data bits coding | 8 |  |
| 3b | Parity coding | none | The value if octet is present |
| 3c | Duplex mode (Dup) | full duplex | The full duplex value is a default. |
| 3c | Modem type | — | The octet is omitted since no modem type is defined |

NOTE.
Octets 3a could be omitted since V.110/X.30 is not indicated.

7.1.9. IWU-ATTRIBUTES information element for BS 31 . . . 34, non X.32, 3.1 kHz

| Octet | Information element field | Field value | Note |
|---|---|---|---|
| 3 | Coding standard | DECT standard coding |  |
| 3 | Information transfer capability | Unrestricted Digital information |  |
| 4 | Negotiation indicator | Negotiation not possible Exchanged parameter negotiation Extended exchange negotiation | The value should be selected according to the negotiation capabilities of DECT. See subclause 5.1. |
| 4 | External connection type | Connection oriented |  |
| 5 | Transfer mode | Circuit | Default value |
| 5 | Information transfer rate | Unspecified |  |
| 5b | Structure | Unstructured | The SDU value is selected since the C.2 profile uses LAPU protocol that is comparable to GSM NT case. Unstructured can be used only with GSM T service. |
| 5b | Configuration | point-to-point |  |
| 5b | Establishment | Demand |  |

7.1.10. END-TO-END-COMPATIBLITY information element for BS 31 . . . 34, non X.32, 3.1 kHz

| Octet | Information element field | Field value | Note |
|---|---|---|---|
| 3 | Synchronous/ asynchronous (S/A) | Sync | |
| 3 | Negotiation (Neg) | in band negotiation not possible | Default value |
| 3 | User rate coding | 0.3, 1.2, 2.4, 4.8, 9.6 | |
| 3a | Intermediate rate | 8 16 | These values are GSM radio and IWF related. However, the values have to be present if the V.110/X.30 is selected. The value should be selected according the GSM rules |
| 3a | Network Independent Clock on transmission (NIC tx) | not required | Default value |
| 3a | Network Independent Clock on reception (NIC rx) | not accepted | Default value |
| 3a | Flow control on transmission (F-C tx) | Not required Required | Not required should be selected if COPNoFICt is the value of Layer 2 ID |
| 3a | Flow control on reception (F-C rx) | Cannot accept Can accept | Cannot accept should be selected if COPNoFICt is the value of Layer 2 ID |
| 3b | Stop bits coding | 1 | The value if octet is present |
| 3b | Data bits coding | 8 | The value if octet is present |
| 3b | Parity coding | none | The value if octet is present |
| 3c | Duplex mode (Dup) | full duplex | The full duplex value is a default. |
| 3c | Modem type | V.22 V22bis V.26ter V.32 | The octet is omitted since no modem type is defined |

NOTE.
Octets 3b could be omitted.

7.1.11. IWU-ATTRIBUTES information element for BS 31 . . . 34, X.32, 3.1 kHz

| Octet | Information element field | Field value | Note |
|---|---|---|---|
| 3 | Coding standard | DECT standard coding | |
| 3 | Information transfer capability | Unrestricted Digital information | |
| 4 | Negotiation indicator | Negotiation not possible Exchanged parameter negotiation Extended exchange parameter negotiation | The value should be selected according to the negotiation capabilities of DECT. See subclause 5.1. |
| 4 | External connection type | Connection oriented | |
| 5 | Transfer mode | Circuit | Default value |
| 5 | Information transfer rate | Unspecified | |
| 5b | Structure | SDU Unstruct | The SDU value is selected since the C.2 profile uses LAPU protocol that is comparable to GSM NT |

| Octet | Information element field | Field value | Note |
|---|---|---|---|
| | | | case. Unstructured can be used only with GSM T service. |
| 5b | Configuration | point-to-point | |
| 5b | Establishment | Demand | |
| 8 | Protocol ID coding | Layer 2 protocol ID "omitted" | This octet is omitted if no coding is indicated in the GSM |
| 8 | L2 Protocol ID | X.25 "omitted" | This octet is omitted if no coding is indicated in the GSM |

7.1.12. END-TO-END-COMPATIBLITY information element for BS 31 . . . 34, X.32, 3.1k kHz

| Octet | Information element field | Field value | Note |
|---|---|---|---|
| 3 | Synchronous/ asynchronous (S/A) | Sync | |
| 3 | Negotiation (Neg) | in band negotiation not possible | Default value |
| 3 | User rate coding | 0.3, 1.2, 2.4, 4.8, 9.8 | |
| 3a | Intermediate rate | 8 16 | These values are GSM radio and IWF related. However, the values have to be present if the V.110/X.30 is selected. The value should be selected according to the GSM rules |
| 3a | Network Independent Clock on transmission (NIC tx) | not required | Default value |
| 3a | Network Independent Clock on reception (NIC rx) | not accepted | Default value |
| 3a | Flow control on transmission (F-C tx) | Not required Required | Not required should be selected if COPNoFICt is the value of Layer 2 ID |
| 3a | Flow control on reception (F-C rx) | Cannot accept Can accept | Cannot accept should be selected if COPNoFICt is the value of Layer 2 ID |
| 3b | Stop bits coding | 1 | The value if octet is present |
| 3b | Data bits coding | 8 | The value if octet is present |
| 3b | Parity coding | none | The value if octet is present |
| 3c | Duplex mode (Dup) | full duplex | The full duplex value is a default. |
| 3c | Modem type | V.22bis V26ter V.32 | |

NOTE.
Octets 3a could be omitted since V.110/X.30 is not indicated.

7.1.13. IWU-ATTRIBUTES information element for BS 41 . . . 46, PAD

| Octet | Information element field | Field value | Note |
|---|---|---|---|
| 3 | Coding standard | DECT standard coding | |
| 3 | Information transfer capability | Unrestricted Digital information | |
| 4 | Negotiation indicator | Negotiation not possible Exchanged parameter negotiation Extended exchange parameter negotiation | The value should be selected according to the negotiation capabilities of DECT. See subclause 5.1. |
| 4 | External connection type | Connection oriented | |
| 5 | Transfer mode | Circuit | Default value |
| 5 | Information transfer rate | Unspecified | |
| 5b | Structure | SDU Unstructured | The SDU value is selected since the C.2 profile uses LAPU protocol that is comparable to GSM NT case. Unstructured can be used only with GSM T service. |
| 5b | Configuration | point-to-point | |
| 5b | Establishment | Demand | |
| 6 | Protocol ID coding | User port ID L2 prot ID | |
| 6 | User protocol ID | V.110/X.30 | |
| 8 | L2 Protocol ID | ISO6429 COPnoFICT "omitted" | New proposed value New proposed value |

7.1.14. END-TO-END-COMPATIBLITY information element for BS 41 ... 46, PAD

| Octet | Information element field | Field value | Note |
|---|---|---|---|
| 3 | Synchronous/ asynchronous (S/A) | Async | |
| 3 | Negotiation (Neg) | in band negotiation not possible | Default value |
| 3 | User rate coding | 0.3, 1.2, 2.4, 4.8, 9.6, 1.2/0.075 | |
| 3a | Intermediate rate | 8 16 | These values are GSM radio and IWF related. However, the values have to be present if the V.110/X.30 is selected. The value should be selected according the GSM rules |
| 3a | Network Independent Clock on transmission (NIC tx) | not required | Default value |
| 3a | Network Independent Clock on reception (NIC rx) | not accepted | Default value |
| 3a | Flow control on transmission (F-C tx) | Not required Required | Not required should be selected if COPNoFICt is the value of Layer 2 ID |
| 3a | Flow control on reception (F-C rx) | Cannot accept Can accept | Cannot accept should be selected if COPNoFICt is the value of Layer 2 ID |
| 3b | Stop bits coding | 1 2 | The value if octet is present |
| 3b | Data bits coding | 7 8 | The value if octet is present |
| 3b | Parity coding | odd even 0 1 none | The value if octet is present |
| 3c | Duplex mode (Dup) | full duplex | The full duplex value is a default. |
| 3c | Modem type | — | The octet is omitted since no modem type is defined |

NOTE.
Octets 3C could be omitted.

7.1.15. IWU-ATTRIBUTES information element for BS 51 ... 53, Packet

| Octet | Information element field | Field value | Note |
|---|---|---|---|
| 3 | Coding standard | DECT standard coding | |
| 3 | Information transfer capability | Unrestricted Digital information | |
| 4 | Negotiation indicator | Negotiation not possible Exchanged parameter negotiation Extended exchange parameter negotiation | The value should be selected according to the negotiation capabilities of DECT. See subclause 5.1. |
| 4 | External connection type | Connection oriented | |
| 5 | Transfer mode | Circuit | Default value |
| 5 | Information transfer rate | Unspecified | |
| 5b | Structure | SDU | The SDU value is selected since the C.2 profile uses LAPU protocol that is comparable to GSM NT case. Unstructured can be used only with GSM T service. |
| 5b | Configuration | point-to-point | |
| 5b | Establishment | Demand | |
| 6 | Protocol ID coding | User prot ID L2 prot ID | |
| 6 | User protocol ID | X.31 | |
| 8 | L2 protocol ID | X.25 | |

7.1.16. END-TO-END-COMPATIBLITY information element for BS 51 ... 53, Packet

| Octet | Information element field | Field value | Note |
|---|---|---|---|
| 3 | Synchronous/ asynchronous (S/A) | Sync | |
| 3 | Negotiation (Neg) | in band negotiation not possible | Default value |
| 3 | User rate coding | 1.2, 2.4, 4.8, 9.6 | |
| 3a | Intermediate rate | 8 16 | These values are GSM radio and IWF related. However, the values |

-continued

| Octet | Information element field | Field value | Note |
|---|---|---|---|
| | | | have to be present if the V.110/X.30 is selected. The value should be selected according the GSM rules |
| 3a | Network Independent Clock on transmission (NIC tx) | not required | Default value |
| 3a | Network Independent Clock on reception (NIC rx) | not accepted | Default value |
| 3a | Flow control on transmission (F-C tx) | Not required Required | Not required should be selected if COPNoFICt is the value of Layer 2 ID |
| 3a | Flow control on reception (F-C rx) | Cannot accept Can accept | Cannot accept should be selected if COPNoFICt is the value of Layer 2 ID |
| 3b | Stop bits coding | 1 | The value if octet is present |
| 3b | Data bits coding | 8 | The value if octet is present |
| 3b | Parity coding | none | The value if octet is present |
| 3c | Duplex mode (Dup) | full duplex | The full duplex value is a default. |
| 3c | Modem type | — | The octet is omitted since no modem type is defined |

NOTE.
Octets 3a could be omitted since V.110/X.30 is not indicated.
NOTE.
Octets 3b and 3c could be omitted.

8. GSM BEARER CAPABILITY DEFAULT VALUES

If mapping has not been defined or field is missing the following values are used in GSM Bearer capability 1 information element as specified in GSM 07.01 [33].

| Item No | Information element coding GSM | Value | NOTE |
|---|---|---|---|
| | bearer capability 1 | | |
| 1 | Radio channel requirement | FR HR DR/HR preferred DR/FR preferred | Note 3 |
| 2 | Coding standard | GSM | |
| 3 | Transfer mode | Circuit | |
| 4 | Information transfer capability | — | Note 2 |
| 5 | Structure | SDU (Non Transparent) Unstructured (Transparent) | Note 1 |
| 6 | Duplex mode | Full duplex | |
| 7 | Configuration | point to point | |
| 8 | NIRR | No meaning | |
| 9 | Establishment | Demand | |
| 14 | Rate adaptation | No rate adaptation | |
| 15 | Signalling access protocol | 1.440/450 | |
| 17 | User information layer 1 protocol | Default layer 1 protocol | |
| 18 | Synchronous/asynchronous | | Note 2 |
| 19 | Number of stop bits | 1 | |
| 20 | Negotiation | in band neg. not possible | |
| 21 | Number of data bits excluding parity bit if . . . | 8 | |
| 22 | User rate | — | Note 2 |
| 23 | Intermediate rate | not-used | |
| 24 | Network independent (NIC) clock on transmission (Tx) | Not required | |
| 25 | Network independent (NIC) clock on reception (Rx) | Not accepted | |
| 26 | Parity information | None | |
| 27 | Connection element | NT (Non Transparent) T (Transparent) | Note 1 |
| 28 | Modem type | None | |
| 30 | User information layer 2 protocol | — | Note 2 |

NOTE 1.
The value depends on the functionality of the FP IWU.
NOTE 2.
No default value has been defined thus this field has to be present and mapped from DECT.
NOTE 3.
The field has value only for GSM air interface thus any value appropriate for the GSM network can be selected.

DECT/GSM Interworking of Bearer Services:
Implementation Description, Transparent Coding
Transportation of the Bearer Capability Contents

1. REFERENCES 4
2. DEFINITIONS, ABBREVIATIONS AND SYMBOLS 6

-continued

Contents

| | | | |
|---|---|---|---|
| | 2.1. | DECT definitions | 6 |
| | 2.2. | Abbreviations | 9 |
| | 2.3. | GSM abbreviations and definitions | 10 |
| | 2.4. | Symbols for status columns | 10 |
| 3. | GENERAL | | 10 |
| 4. | INTER-WORKING REQUIREMENTS | | 11 |
| | 4.1. | General | 11 |
| | 4.2. | Reference configurations | 11 |
| | | 4.2.1. FP functional attachment to the GSM PLMN | 11 |
| | 4.3. | General inter-working model for FP GSM PLMN attachment | 11 |
| | 4.4. | Inter-working context | 12 |
| | | 4.4.1. General | 12 |
| | | 4.4.2. Basic inter-working rules | 12 |
| | | 4.4.3. Interpretation of broadcast attributes | 13 |
| | | 4.4.4. Interpretation of Terminal capability | 13 |
| 5. | INTER-WORKING MAPPINGS, FP ATTACHED TO THE GSM PLMN | | 14 |
| | 5.1. | FP C-plane IWU procedures | 14 |
| | | 5.1.1. CC IWU procedures | 14 |
| | | 5.1.1.1. Outgoing data call | 14 |
| | | 5.1.1.2. Service negotiation in the case of outgoing call | 14 |
| | | 5.1.1.2.1. Negotiation not possible | 14 |
| | | 5.1.1.2.2. Exchange attributes negotiation | 15 |
| | | 5.1.1.2.3. Extended exchange parameter negotiation | 16 |
| | | 5.1.1.3. Incoming data call | 17 |
| | | 5.1.1.4. Service negotiation in the case of incoming call | 17 |
| | | 5.1.1.4.1. Negotiation not possible | 17 |
| | | 5.1.1.4.2. Exchange attributes negotiation | 17 |
| | | 5.1.1.4.3. Extended exchange parameter negotiation | 18 |
| | | 5.1.1.5. Other CC procedures | 19 |
| | | 5.1.2. MM IWU procedures | 19 |
| | | 5.1.3. Other IWU procedures | 19 |
| | | 5.1.4. Message mappings | 19 |
| | | 5.1.4.1. GSM to DECT | 19 |
| | | 5.1.4.1.1. SETUP - CC-SETUP | 20 |
| | | 5.1.4 1.2. CALL PROCEEDING-CC-RELEASE-COM | 20 |
| | | 5.1.4.1.3. CALL PROCEEDING-CC-CALL-PROCEEDING | 21 |
| | | 5.1.4.2. DECT to GSM | 21 |
| | | 5.1.4.2.1. CC-SETUP - SETUP | 21 |
| | | 5.1.4.2.2. CC-CONNECT - CALL CONFIRMED | 22 |
| | | 5.1.5. Information element mappings | 23 |
| | | 5.1.5.1. DECT to GSM and GSM to DECT | 23 |
| | | 5.1.5.1.1. Iwu-attributes - Bearer capability 1 | 23 |
| | | 5.1.5.1.2. Lower layer compatibility - Iwu-to-iwu | 24 |
| | | 5.1.5.1.3. Higher layer compatibility - Iwu-to-iwu | 24 |
| | | 5.1.6. Fields in information element coding | 24 |
| | | 5.1.6.1. GSM to DECT and DECT to GSM | 24 |
| | | 5.1.6.1.1. Coding standard - Coding standard | 24 |
| | | 5.1.6.1.2. Transfer mode - transfer mode | 25 |
| | | 5.1.6.1.3. Information transfer capability - information transfer capability | 25 |
| | | 5.1.6.1.4. General coding principle for other fields | 25 |
| | 5.2. | FP U-plane IWU procedures | 26 |
| | | 5.2.1. General | 26 |
| | | 5.2.2. Transparent service (T) | 26 |
| | | 5.2.2.1. General | 26 |
| | | 5.2.2.1.1. Asynchronous | 26 |
| | | 5.2.2.1.2. Synchronous | 27 |
| | | 5.2.2.2. CCITT V.24 Interchange circuit signalling mapping | 27 |
| | | 5.2.2.3. Flow control | 28 |
| | | 5.2.2.4. Call establishment signalling mapping | 28 |
| | | 5.2.3. Non-transparent service (NT) | 28 |
| | | 5.2.3.1. General | 28 |
| | | 5.2.3.1.1. Asynchronous | 29 |
| | | 5.2.3.1.2. Synchronous | 29 |
| | | 5.2.3.2. Interchange circuit signalling mapping | 30 |
| | | 5.2.3.3. Flow control | 30 |
| | | 5.2.3.4. Call establishment signalling mapping | 30 |
| | | 5.2.4. Synchronization | 30 |
| | 5.3. | PP C-plane IWU procedures | 30 |
| | 5.4. | PP U-plane IWU procedures | 30 |
| 6. | ADDITIONS TO THE BASE STANDARD | | 31 |
| | 6.1. | Extended exchange parameter negotiation | 31 |
| | | 6.1.1. {CC-CALL-PROCEEDING} message | 31 |
| | | 6.1.2. {CC-CONNECT} messages | 32 |
| | 6.2. | New GSM coding of the <<IWU-ATTRIBUTES>> | 32 |
| 7. | INTERWORKING CONNECTION TYPES | | 38 |
| | 7.1. | Connection type definitions | 38 |

1. REFERENCES

[1] ETS 300 175-1: "Radio Equipment and Systems (RES); Digital European Cordless Telecommunications (DECT) Common Interface Part 1: Overview".

[2] ETS 300 175-2: "Radio Equipment and Systems (RES); Digital European Cordless Telecommunications (DECT) Common Interface Part 2: Physical layer".

[3] ETS 300 175-3: "Radio Equipment and Systems (RES); Digital European Cordless Telecommunications (DECT) Common Interface Part 3: Medium access control layer".

[4] ETS 300 175-4: "Radio Equipment and Systems (RES); Digital European Cordless Telecommunications (DECT) Common Interface Part 4: Data link control layer".

[5] ETS 300 175-5: "Radio Equipment and Systems (RES); Digital European Cordless Telecommunications (DECT) Common Interface Part 5: Network layer".

[6] ETS 300 175-6: "Radio Equipment and Systems (RES); Digital European Cordless Telecommunications (DECT) Common Interface Part 6: Identities and addressing".

[7] ETS 300 175-7: "Radio Equipment and Systems (RES); Digital European Cordless Telecommunications (DECT) Common Interface Part 7: Security features".

[8] ETS 300 175-8: "Radio Equipment and Systems (RES); Digital European Cordless Telecommunications (DECT) Common Interface Part 8: Speech coding and transmission".

[9] prETS 300 444: "Radio Equipment and Systems (RES); Digital European Cordless Telecommunications (DECT): Generic Access Profile (GAP)".

[10] prETS 300 331: "Radio Equipment and Systems (RES); Digital European Cordless Telecommunications (DECT) Common Interface: DECT Authentication Module".

[11] I-ETS 300 176: "Radio Equipment and Systems (RES); Digital European Cordless Telecommunications Approval Test Specification".

[12] 911263/EEC: "Council Directive of 29 Apr. 1991 on the approximation of the laws of the Member states concerning telecommunications terminal equipment, including the mutual recognition of their conformity". (Terminal Directive).

[13] ETR 015: "Digital European Cordless Telecommunications Reference document".

[14] ETR 043: "Radio Equipment and Systems (RES); Digital European Cordless Telecommunications (DECT) Common Interface Services and Facilities requirements specification".

[15] ETR 056: "Digital European Cordless Telecommunications System description document".

[16] prETS 300 466: "Digital European Cordless TelecommunicationslGlobal System for Mobile Communications (DECT/IGSM) Inter-working profile: General Description of Service Requirements, Functional Capabilities and Information flows".

[17] Reserved.

[18] ECMA TR/44 (1989): "An architectural framework for private networks".

[19] GSM 01.02: "European digital cellular telecommunication system (Phase 2); General Description of a GSM PLMN".

[20] GSM 01.04: "European digital cellular telecommunication system (Phase 2); Abbreviations and acronyms".

[21] ETS 300 522: "European digital cellular telecommunication system; Network architecture GSM 03.02—phase 2".

[22] ETS 300 551: "European digital cellular telecommunication system; GSM PLMN Access Reference Configuration GSM 04.02—phase 2".

[23] PH2 GSM 04.08 (v4.8.0): "European digital cellular telecommunication system; Mobile Radio Interface—Layer 3 Specification GSM 04.08—phase 2".

[24] ETS 300 580-1: "European digital cellular telecommunication system; Speech Processing Functions: General Description GSM 06.01—phase 2".

[25] ETS 300 590: "European digital cellular telecommunication system; BSS-MSC Layer 3 Specification GSM 08.08—phase 2".

[26] PH2 GSM 11.11: "European digital cellular telecommunication system; Specifications of the SIM/ME interface GSM 11.11—phase 2".

[27] ISO IS 9646-1: "Information Technology—OSI Conformance Testing Methodology and Framework, Part 1: General Concepts".

[28] ISO IS 9646-6: "Information Technology—OSI Conformance Testing Methodology and Framework, Part 6: Protocol Profile Test Specification".

[29] ISO/IEC 9646-7 (1992): "Information Technology—OSI Conformance Testing Methodology and Framework, Part 7: Implementation Conformance Statements" (working draft for CD 9646-7).

[30] Draft prETS 300 xxx Version 5.00: "Radio Equipment and Systems (RES); Digital European Cordless Telecommunications (DECT) Data services profile, Generic data link service, Service Type C, Class 2".

[31] ETS 300 370: Radio Equipment and Systems (RES); Digital European Cordless Telecommunications/Global System for Mobile Communcations (DECT/GSM) Interworking profile, Access and mapping (Protocol/procedure description for 3.1 kHz speech service).

[32] ETS 300 582: European digital cellular telecommunication system (Phase 2); General on Terminal Adaptation Functions (TAF) for Mobile Stations (MS) (GSM 07.01).

[33] ETS 300 583: European digital cellular telecommunication system (Phase 2); Terminal Adaptation Functions (TAF) for services using asynchronous bearer capabilities (GSM 07.02).

[34] ETS 300 584: European digital cellular telecommunication system (Phase 2); Terminal Adaptation Functions (TAF) for services using synchronous bearer capabilities (GSM 07.03).

2. DEFINITIONS, ABBREVIATIONS AND SYMBOLS 2.1. DECT Definitions

Attach: the process whereby a PP within the coverage area of a FP to which it has access rights, notifies this FP that it is operative. The reverse process is detach, which reports the PP as inoperative.

NOTE 1: An operative PP is assumed to be ready to receive calls.

Authentication: the process whereby a DECT subscriber is positively verified to be a legitimate user of a particular FP.

NOTE 2: Authentication is generally performed at call set-up, but may also be done at any other time (e.g. during a call).

Bearer service: a type of telecommunication service that provides a defined capability for the transmission of signals between user-network interfaces.

NOTE 3: The DECT user-network interface corresponds to the top of the network layer (layer 3).

C-plane: the control plane of the DECT protocol stacks, which contains all of the internal DECT protocol control, but may also include some external user information.

NOTE 4: The C-plane stack always contains protocol entities up to and including the network layer.

Call: all of the NetWork (NWK) layer processes involved in one network layer peer-to-peer association.

NOTE 5: Call may sometimes be used to refer to processes of all layers, since lower layer processes are implicitly required.

DECT NetWork (DNW): a network that uses the DECT air interface to interconnect a local network to one or more portable applications. The logical boundaries of the DECT network are defined to be at the top of the DECT network layer.

NOTE 6: A DECT NetWork (DNW) is a logical grouping that contains one or more fixed radio termination plus their associated portable radio termination. The boundaries of the DECT network are not physical boundaries.

Fixed Part (DECT Fixed Part) (FP): a physical grouping that contains all of the elements in the DECT network between the local network and the DECT air interface.

NOTE 7: A DECT FP contains the logical elements of at least one fixed radio termination, plus additional implementation specific elements.

Fixed Part GSM PLMN Attachment (DECT Fixed Part attached to a GSM MSC): a definition of a functional environment where a DECT system (FP) is attached to an GSM MSC. The MSC in this case refers to a functional entity providing the required MM and CC functionality defined in this ETS in order to communicate with the FP.

Fixed radio Termination (FT): a logical group of functions that contains all of the DECT processes and procedures on the fixed side of the DECT air interface.

NOTE 8: A fixed radio termination only includes elements that are defined in the DECT CI standard. This includes radio transmission elements together with a selection of layer 2 and layer 3 elements.

Generic Access Profile (GAP): a defined part of the DECT Common Interface standard (DECT CI) that ensures inter-operability between FPs and PPs for public business and residential access services.

Geographically unique identity: this term relates to FP identities, Primary Access Rights Identities (PARIs) and Radio Fixed Part Identities (RFPIs). It indicates that two systems with the same PARI, or respectively two RFPs with the same RFPI, can not be reached or listened to at the same geographical position.

Global NetWork (GNW): a telecommunication network capable of offering a long distance telecommunication service.

NOTE 9: The term does not include legal or regulatory aspects, nor does it indicate if the network is a public or a private network.

Globally unique identity: the identity is unique within DECT (without geographical or other restrictions).

Handover: the process of switching a call in progress from one physical channel to another physical channel. These processes can be internal (see internal handover) or external (see external handover).

NOTE 10: There are two physical forms of handover, intra-cell handover and inter-cell handover. Intra-cell handover is always internal. Inter-cell handover can be internal or external.

Incoming call: a call received at a PP.

Inter-cell handover: the switching of a call in progress from one cell to another cell.

Internal handover: handover processes that are completely internal to one Fixed radio Termination (FT). Internal handover re-connects the call at the lower layers, while maintaining the call at the NWK layer.

NOTE 11: The lower layer reconnection can either be at the Data Link Control (DLC) layer (connection handover) or at the MAC layer (bearer handover).

Inter-operability: the capability of FPs and PPs, that enable a PP to obtain access to teleservices in more than one location area and/or from more than one operator (more than one service provider).

Inter-operator roaming: roaming between FP coverage areas of different operators (different service providers).

Inter-Working Unit (IWU): a unit that is used to interconnect sub-networks.

NOTE 12: The IWU will contain the inter-working functions necessary to support the required sub-network inter-working.

Intra-cell handover: the switching of a call in progress from one physical channel of one cell to another physical channel of the same cell.

Intra-operator roaming: roaming between different FP coverage areas of the same operator (same service provider).

Local NetWork (LNW): a telecommunication network capable of offering local telecommunication services.

NOTE 13: The term does not include legal or regulatory aspects, nor does it indicate if the network is a public network or a private network.

Locally unique identity: the identity is unique within one FP or location area, depending on application.

Location area: the domain in which a PP may receive (and/or make) calls as a result of a single location registration.

Location registration: the process whereby the position of a DECT portable termination is determined to the level of one location area, and this position is updated in one or more databases.

NOTE 14: These databases are not included within the DECT FT.

Medium Access Control (MAC) Connection: an association between one source MAC Multi-Bearer Control (MBC) entity and one destination MAC MBC entity. This provides a set of related MAC services (a set of logical channels), and it can involve one or more underlying MAC bearers.

Outgoing call: a call originating from a PP.

Portable Application (PA): a logical grouping that contains all the elements that lie beyond the DECT network boundary on the portable side.

NOTE 15: The functions contained in the portable application may be physically distributed, but any such distribution is invisible to the DECT network.

Portable Part (DECT Portable Part) (PP): a physical grouping that contains all elements between the user and the DECT air interface. PP is a generic term that may describe one or several physical pieces.

NOTE 16: A DECT PP is logically divided into one portable termination plus one or more portable applications.

Portable radio Termination (PT): a logical group of functions that contains all of the DECT processes and procedures on the portable side of the DECT air interface.

NOTE 17: A PT only includes elements that are defined in the DECT CI standard. This includes radio transmission elements (layer 1) together with a selection of layer 2 and layer 3 elements.

Radio Fixed Part (RFP): one physical sub-group of an FP that contains all the radio end points (one or more) that are connected to a single system of antennas.

Registration: an ambiguous term, that should always be qualified. See either location registration or subscription registration.

Roaming: the movement of a PP from one FP coverage area to another FP coverage area, where the capabilities of the FPs enable the PP to make or receive calls in both areas.

NOTE 18: Roaming requires the relevant FPs and PP to be inter-operable.

Subscription registration: the infrequent process whereby a subscriber obtains access rights to one or more FPs.

NOTE 19: Subscription registration is usually required before a user can make or receive calls.

2.2. Abbreviations

For the purposes of this ETS, the following abbreviations apply:

| | |
|---|---|
| ARI | Access Rights identity. See SARI and TARI |
| BCD | Binary Coded Decimal |
| BSC | GSM Base Station Controller |
| CC | Call Control |
| CCITT | (The) International Telegraph and Telephone Consultative Committee |
| CI | Common Interface |
| CISS | Call Independent Supplementary Services |
| CK | Cipher Key. |
| CLMS | ConnectionLess Message Service |
| COMS | Connection Oriented Message Service |
| CRSS | Call Related Supplementary Services |
| DAM | DECT Authentication Module |
| DAM DA | DECT Authentication Module DECT Application |
| DAM GA | DECT Authentication Module, GSM Application |
| DECT | Digital European Cordless Telecommunications |
| DLC | Data Link Control, Layer 2b of the DECT protocol stack |
| DSAA | DECT Standard Authentication Algorithm |
| DTMF | Dual Tone Multi-Frequency |
| FP | Fixed Part, (see definitions) |
| FT | Fixed radio Termination, (see definitions) |
| GAP | Generic Access Profile |
| IMEI | International Mobile Equipment Identity |
| IMSI | International Mobile Subscriber Identity |
| IPEI | International Portable Equipment Identity |
| IPUI | International Portable User Identity |
| ISDN | Integrated Services Digital Network |
| ISO | International Organisation for Standardisation |
| ISUP | Integrated Services Digital Network User Part |
| IWU | Inter-Working Unit, (see definitions) |
| K | authentication Key |
| LCE | Link Control Entity |
| LLME | Lower Layer Management Entity |
| MAC | Medium Access Control, Layer 2a of the DECT protocol stack |
| MAP | GSM Mobile Application Part |
| MM | Mobility Management, a NWK layer functional grouping |
| MSB | Most Significant Bit |
| MS | Mobile Station |
| MSC | Mobile Switching Centre |
| NWK | NetWorK, Layer 3 of the DECT protocol stack |
| OSI | Open Systems Interconnection |
| PA | Portable Application |
| PARI | Primary Access Rights Identity |
| PARK | Portable Access Rights Key |
| PCM | Pulse Coded Modulation |
| PE | Portable Equipment |
| PLMN | Public Land Mobile Network |
| PP | Portable Part |
| PSTN | Public Switched Telephone Network |
| PT | Portable radio Termination. See definition |
| PTNX | Private Telecommunications Network Exchange |
| PUN | Portable User Number |
| PUT | Portable User Type |
| RAND | A RANDdom challenge issued by a FP |
| RES | A RESponse calculated by a PP |
| RFP | Radio Fixed Part, (see definitions) |
| RFPI | Radio Fixed Part Identity |
| RS | A value used to establish authentication session keys |
| SARI | Secondary Access Rights Identity |
| SS | Supplementary Services |
| SRES | A GSM specific authentication response calculated by the GSM SIM or the DAM |
| TAF | Terminal Adaptation Function |

-continued

| | |
|---|---|
| TARI | Tertiary Access Rights Identity |
| TMSI | Temporary Mobile Subscriber Identity |
| TPUI | Temporary Portable User Identity |
| TUP | Telephony User Part |
| UPI | User Personal Identification |

2.3. GSM Abbreviations and Definitions

Definition and specific GSM abbreviations may be found in GSM 01.04 [20].

2.4. Symbols for Status Columns

The symbols defined in this subclause are applied for procedures, features, messages, information elements, fields and field codings in this document if not explicitly otherwise stated. The interpretation of status columns in all tables is as follows:

M for mandatory to map/support/use;

O for optional to map/support/use;

I for out-of-scope (not subject for testing);

X for prohibited or excluded to map/support/use (the message, information element may be allowed to be used in the standard/standards but it is not allowed to be mapped/used depending on the environment/dynamic conditions etc.);

N/A or -(dash) for not applicable to map/support/use;

C for conditional to map/support/use (the message, information element mapping depends on the selection of other optional or/and conditional items).

NOTE: The symbol "-" in the mapping section of this ETS means that there is no message, information element or coding specified in this column.

3. GENERAL

This document specifies how GSM circuit switched bearer services are provided over the DECT air interface. The difference between this and the document "DECT/GSM interworking of bearer services: implementation decription, complete coding mapping of GSM and DECT elements" is that this implementation does not utlilize the old DECT <<iwu-attributes>> coding but defines a new coding of the element for GSM interworking. The new coding defined in subclause 6 fulfills completely the requirements of the GSM bearer services thus simplifies the selection of a service.

This document is made up of 4 main clauses:

Clause 4: Inter-working requirements—includes reference configurations and the protocol architecture models. Also describes the main service requirements.

Clauses 5: Inter-Working Unit (IWU) mappings—shows the C plane and U plane mappings needed in addition to the ETS 300 370 [31] for the FP GSM PLMN attachment in respective order. Two IWUs are considered; the FP IWU and the PP IWU, although the FP IWU is expected to be the largest. The signalling mappings are described in terms of IWU procedures with informative data flow diagrams. Detailed descriptions follow using tables of what is mapped, what is ignored, and what is transferred transparently.

Clause 6: Additions to the base standard—this clause defines the optional changes needed in the ETS 300 175-5 [5] for a full interworking in service negotiation. Also some new attributes/parameter codings are proposed to widen the service range closer to GSM PLMN bearer services.

Clause 7: Connection types—this clause identifies the main DECT connection types (U plane+C plane) at the air interface and defines the attributes codings used in the DECT air interface for identification of the different GSM bearer services.

4. INTER-WORKING REQUIREMENTS

4.1. General

This document defines the mandatory requirements to the FP interworking functions if the GSM circuit switched bearer services are interworked to DECT. The interworking shall comply completely with ETS 300 370 [31] in terms of MM and CC message mappings with the additions presented in this document. The additional interworking mapping are based on the GSM phase 2 standards.

The mandatory basic requirements of this document are compatible with the DECT/GSM interworking profile ETS 300 370 [31], ETS 300 xxx DECT C.2. data profile [30] and ETS 300 175-5 DECT Network Layer [5]. In addition the new codings defiened in subclause 6.2. are required. However, if full interworking with service negotiation is needed some changes/additions listed in subclause 6 of this document are required to ETS 300 175-5 [5]. The procedures for service negotiation utilizing these changes are optional.

4.2. Reference Configurations

4.2.1. FP functional attachment to the GSM PLMN

The configuration is shown in FIG. 10.

4.3. General Inter-working Model for FP GSM PLMN Attachment

The general interworking model is shown in FIG. 11. It describes a general interworking model contained both control and user planes. The figure also shows the locations of the interworking units (IWUs).

The FP IWU provides mappings between GSM CC/MM and DECT CC/MM messages. The mapping defined in this document in subclause 5 are additions to the ETS 300 370 [31]. The PP TAF defined in the ETS 300 xxx C.2 profile annex C.2 "Network interworking to connection oriented bearer services" [30] provides a CCITT V.24 connection to the DECT data application.

4.4. Inter-working Context

4.4.1. General

The PP complying with this standard shall be compatible with the requirements of the ETS 300 xxx C.2 data profile [30] and ETS 300 370 [31], those which are based on the minimum requirements of GAP [9] when regarding the MM aspects. The CC requirements are based on the C.2 data profile [30] which are GAP [9] with some data transmission specific additional requirements. also the additions defined in subclause 6.2 are required. This document does not require the support of the GAP based voice services i.e. the PP may be a data only terminal with the GSM access capabilities and a GSM subcription as defined in ETS 300 370 [31].

4.4.2. Basic inter-working rules

The interworking rules are as defined in ETS 300 370 [31].

Table 1 defined the GSM bearer services supported by this document. Both, GSM transparent (T) and non-transparent (NT) bearer services are supported while DECT is interworking with GSM. The DECT air interface does not separate the NT or T cases thus the C.2 profile will be used for both cases. Both rate adaptation schemes are terminated to the FP IWU and are introduced in the FP IWU U-plane section, however, to support both is not a mandatory requirement. With <<Connection element>> filed of <<IWU-ATTRIBUTES>> as defiend in subclause 6.2. the PP can receive information/select the NT/T option in FP IWU.

TABLE 1

The GSM bearer services supported

| Bearer service number | Bearer service name |
|---|---|
| 21 | Asynchronous 300 bps |
| 22 | Asynchronous 1.2 kpbs |
| 23 | Asynchronous 1200/75 bps |
| 24 | Asynchronous 2.4 bps |
| 25 | Asynchronous 4.8 bps |
| 26 | Asynchronous 9.6 bps |
| 31 | Synchronous 1.2 kbps |
| 32 | Synchronous 2.4 kbps |
| 33 | Synchronous 4.8 kbps |
| 34 | Synchronous 9.6 kbps |
| 41 | PAD access 300 bps |
| 42 | PAD access 1.2 kbps |
| 43 | PAD access 1200/75 bps |
| 44 | PAD access 2.4 kbps |
| 45 | PAD access 4.8 kbps |
| 46 | PAD access 9.6 kbps |

The selection of a GSM bearer service is done in the mobile originated call by defining the service requirements in the <<iwu-attributes>> information element with coding standard field indicating GSM coding as defined in subclause 6. The values of these elements are mapped to GSM <<Bearer capability>> element as defined in subclause 5.1.4.

The selection of a GSM bearer service is done in the mobile terminated call by defining the service requirements in the GSM <<Bearer capability>> element. The values of this element are mapped to <<iwu-attributes>> information element with coding standard field indicating GSM coding. The mapping of the elements is defined in subclause 5.1.4. New field/coding requirements of DECT <<iwu-attributes>> are defeined in subclause 6.

4.4.3. Interpretation of broadcast attributes This subclause refers to Annex F of ETS 300 175-5 [5] (Broadcast attributes coding).

The coding are done as defined in ETS 300 370 [31] with the exceptions listed here.

- a32 ADPCM/G721 Voice service: may be set to value "1". (NOTE 1)
- a33 PAP/GAP voice supported: may be set to value "1". (NOTE 1)
- a34 Non-voice circuit switched service: shall be set to value "1";

NOTE 1. This document does not require the support of the voice service, however, it is not prohibited either.

4.4.4. Interpretation of Terminal capability

If <<TERMINAL CAPABILTY>> information element is used the following codings indicated the support of the GSM bearer services:

Profile Indicator_1 Coding (Octet 4) of TERMINAL CAPABLITY information element:

| Bits | 7 | 6 | 5 | 4 | 3 | 2 | 1 | Meaning |
|---|---|---|---|---|---|---|---|---|
| | x | x | x | x | 1 | x | x | GSM profile supported |
| | 1 | x | x | x | x | x | x | Data Services Profile C Class 2 |

Both codings are required.

5. Inter-working Mappings, FP Attached to the GSM PLMN

5.1. FP C-plane IWU Procedures

5.1.1. CC IWU procedures

The CC procedures are compatible with ETS 300 370 [31] with the exceptions described here.

The <<IWU ATTRIBUTES>> information element included in the {CC-SETUP} message will define the GSM bearer service to be requested. The coding combinations used for alternate bearer services is defined in the subclause 7 of this document.

Only BEARER CAPABILITY 1 is recognized in the GSM messages. That is, if a GSM Call Control message contains multiple BEARER CAPABLITY information elements only the first one is mapped and conveyed to DECT PP.

Only the first <<IWU-ATTRIBUTES>> information element is mapped into GSM BEARER CAPABILITY element.

The LOWER LAYER COMPATIBILITY and HIGHER LAYER COMPATIBILITY information elements, if present in a GSM CC message, are carried with no mappings over the air interface as described in subclauses 5.1.5.1.3, 5.1.5.1.4, 5.1.5.2.3 and 5.1.5.2.4. The FP will not do any mapping of these elements. The utilization of these elements is completely a matter of the DECT data application in PP i.e this document does not define their usage.

5.1.1.1. Outgoing data call

The call procedures for outgoing data call (PP originated) are compatible with the procedures of containing the <<CALLED-PARTY-NUMBER>> in the {CC-INFO} message as defined in the ETS 300 370 [31]. This procedure is compatible with ETS 300 xxx C.2 data profile [30] call establishment.

5.1.1.2. Service negotiation in the case of outgoing call

There are three alternate options in the services negotiation procedures in (PP originated) outgoing call. Minimum mandatory requirement is to support the negotiation not possible case defined in clause 5.1.1.2.1. The alternate service negotiation procedures are indicated/requested with <<Negotiation indicator>> field in the <<IWU-ATTRIBUTES>> information element. In order to facilitate the optional service negotiations defined in subclauses 5.1.1.2,2. and 5.1.1.2.3. changes/additions defined in subclause 7 of this document to DECT network layer ETS 300 175-5 [5] have to be implemented.

The negotiable parameters in the case of mobile originated call is <<Modem type>>.

5.1.1.2.1. Negotiation not possible

Upon receipt of CC-SETUP-ind with <<IWU-ATTRIBUTES>> containing the value "Negotiation not possible" in the <<Negotiation indicator field>> from the CC entity the FP IWU will reject all negotiation towards/from MSC. That is, if the MSC cannot provide the PP the requested service the connection is disconnected by using CC-REJECT-req with <<Release reason>> Hex 05 "Incompatible service" towards PP.

It is then the responsiblity of the FP IWU in the case the {Call proceeding} contains new service parameter values to disconnect the connection towards the GSM PLMN by issuing {Release complete} message with cause 79; "Service or option not implemented, unspecified".

If no {Call proceeding} message is received from MSC or it does not contain <<BEARER CAPABILITY>> information element the service parameters have been accepted by the MSC IWF and the call establishment proceeds as defined in ETS 300 370 [31]. (See FIG. 12)

5.1.1.2.2. Exchange attributes negotiation

The following procedures require the additions defined in subclause 6.

Upon receipt of CC-SETUP-ind with <<IWU-ATTRIBUTES>> containing the value "Exchange parameter negotiation" in the <<Negotiation indicator field>> from the CC entity the FP IWU will reject the request immediately issuing MNCC-REJECT-req with <<Release reason>> Hex 07 "Negotiation not supported" if the FP cannot support exchange attributes negotiation as defined in the subclause 15.2.3 of ETS 300 175-5 [5].

If the FP can support the Exchange parameter negotiation the FP IWU will map the <<IWU-ATTRIBUTES>> information element contained in {CC-SETUP} to the GSM BEARER CAPABILTY element of GSM {Setup} message as described in subclause 5.1.4.2.1.

1) Upon receipt of the GSM {Call proceeding} message with new values in <<Bearer capabilty>> information element the FP IWU will release the connection by using MNCC-REJECT-ind with new values in the <<IWU-ATTRIBUTES>> information element.

2) Whereupon the FP IWU will send the MSC {RELEASE COMPLETE} message with cause code 31 "Normal, unspecified". The PP may now initiate a new call with new parameter values following the normal call establishment precedures defined in this document and in ETS 300 370 [31].

If no {Call proceeding} message is received or it does not contain <<BEARER CAPABILITY>> information element the service parameters have been accepted by the MSC IWF and the call establishment proceeds as defined in ETS 300 370 [31]. (See FIG. 13)

5.1.1.2.3. Extended exchange parameter negotiation

The following procedures require the additions defined in subclause 6.

Upon receipt of CC-SETUP-ind with <<IWU-ATTRIBUTES>> containing the value "Extended exchange parameter negotiation" in the <<Negotiation indicator field>> from the CC entity the FP IWU will reject the request immediately issuing MNCC-REJECT-req with <<Release reason>> Hex 07 "Negotiation not supported" if the FP cannot support Extended exchange attributes negotiation.

If the FP can support the Extended exchange parameter negotiation the FP IWU will map the <<IWU-ATTRIBUTES>> information element contained in {CC-SETUP} message to the GSM <<BEARER CAPABILTY>> element of GSM {Setup} message as described in subclause 5.1.4.2.1.

1) Upon receipt of the GSM {Call proceeding} message the FP IWU will map the new values of the <<Bearer capability>> into the <<IWU-ATTRIBUTES>> information element of the DECT <<CC-CALL-PROCEEDING>> message as defined in subclause 5.1.4.1.3.

If no {Call proceeding} message is received or it does not contain <<BEARER CAPABILITY>> information element the service parameters have been accepted by the MSC IWF and no mapping between the <<BEARER CAPABILITY>> and <<IWU-ATTRIBUTES>> information element is needed. (See FIG. 14)

5.1.1.3. Incoming data call

The call procedures for incoming data call (network originated) are compatible with the procedures defined in the ETS 300 370 [31]. This procedure is compatible with ETS 300 xxx C.2 data profile [30] call establishment.

5.1.1.4. Service negotiation in the case of incoming call

There are three alternate options in the services negotiation procedures in (network originated) incoming call. Minimum mandatory requirement is to support the negotiation not possible case defined in clause 5.1.1.4.1. The alternate service negotiation procedures are indicated/requested with <<Negotiation indicator>> field in the <<IWU- ATTRIBUTES>> information element. In order to facilitate the optional service negotiations defined in subclauses 5.1.1.4.2. and 5.1.1.4.3. changes/additions defined in subclause 6 of this document to DECT network layer ETS 300 175-5 [5] have to be implemented.

The negotiable parameters in the case of mobile terminated call are <<number of data bits>>, <<number of stop bits>>, <<number of parity bits >>, <<user layer 2 protocol>> and <<Modem type>>.

5.1.1.4.1. Negotiation not possible

Upon receipt of CC-SETUP-ind with <<IWU-ATTRIBUTES>> containing the value "Negotiation not possible" in the <<Negotiation indicator field>> from the CC entity the PP IWU will reject all negotiation. That is, if the PP cannot accept the parameters indicated in the <<IWU-ATTRIBUTES>> information element the connection is disconnected by using CC-REJECT-req with <<Release reason>> Hex 05 "Incompatible service".

If the PP IWU accepts the parameters proposed by MSC the call establishment proceeds as defined in ETS 300 370 [31].

5.1.1.4.2. Exchange attributes negotiation

The following procedures require the additions defined in subclause 6.

1). Upon receipt of CC-SETUP-ind with <<IWU-ATTRIBUTES>> containing the value "Exchange parameter negotiation" in the <<Negotiation indicator field>> from the CC entity the PP IWU will reject the request immediately issuing MNCC-REJECT-req with <<Release reason>> Hex 07 "Negotiation not supported" if the PP cannot support exchange attributes negotiation as defined in the subclause 15.2.3 in ETS 300 175-5 [5].

If the PP can support the Exchange parameter negotiation the PP IWU will add the new desired values into the <<IWU-ATTRIBUTES>> and the <<END-TO-END-COMPATIBLITY>> information elements of the {CC-RELEASE-COM} message.

2). Upon receipt of the {CC-RELEASE-COM} message with indication of "Exchange parameter negotiation" in the <<Negotiation indicator>> field of the <<IWU-ATTRIBUTES>> element the FP will not directly map the message according to 300 370 [31] but issue immediately a new CC-SETUP-ind with new set parameters in <<IWU-ATTRIBUTES>> and <<END-TO-END-COMPATIBLITY>> elements. It is then the responsibility of the FP IWU to join the GSM call waiting for response and the new DECT call with new parameters.

3) Upon receipt of the {CC-ALERTING} or {CC-CONNECT} as a response to the new {SETUP} message the procedure will proceed as illustrated in ETS 300 370 [31] with new parameter values mapped into the <<BEARER CAPABILITY>> element in the {Call Confirmed} message.

If the PP IWU accepts the parameters proposed by MSC the call establishment proceeds as defined in ETS 300 370 [31]. (See FIG. 15)

5.1.1.4.3. Extended exchange parameter negotiation

The following procedures require the additions defined in subclause 6.

Upon receipt of CC-SETUP-ind with <<IWU-ATTRIBUTES>> containing the value "Extended exchange parameter negotiation" in the <<Negotiation indicator field>> from the CC entity the PP IWU will reject the request immediately issuing MNCC-REJECT-req with <<Release reason>> Hex 07 "Negotiation not supported" if the PP cannot support Extended exchange attributes negotiation.

If the PP can support the Extended exchange parameter negotiation the PP IWU will add the new desired attributes values to the <<IWU-ATTRIBUTES>> information element of the {CC-CONNECT} message.

2) and 3). It is then the responsibility of the FP IWU to suspend the submission of the {Call confirm} and {Alerting} message towards the GSM network until the new desired values have been received in the {CC-CONNECT} message. The new values in the <<IWU-ATTRIBUTES>> information element of the {CC-CONNECT} message are mapped into the GSM BEARER CAPABILTY element of {Call Confirmed} message as described in subclause 5.1.8.3. Other mappings between {CC-CONNECT} and {Connect} message as well as {CC-ALERTING} and {Alerting} messages are done as described in ETS 300 370 [31].

The PP IWU shall not use <<IWU-ATTRIBUTES>> information element in the {CC-CONNECT} message if it agrees with the service parameters proposed in the {CC-SETUP} message. If the PP IWU accepts the parameters proposed by MSC the call establishment proceeds as defined in ETS 300 370 [31]. (See FIG. 16)

5.1.1.5. Other CC procedures

Other CC procedures are done according to ETS300 370 [31]. Additional cause code mappings required are presented in subclause 5.1.6.1.20.

5.1.2. MM IWU procedures

The MM procedures follow the procedures defined in the C.2 profile and ETS 300 370 [31].

5.1.3. Other IWU procedures 5.1.4. Message mappings 5.1.4.1. GSM to DECT

TABLE 2

List of mapped CC messages

| Item No | GSM message | Status in GSM | DECT message | Status in GAP | Ref. | Map Status | Note |
|---|---|---|---|---|---|---|---|
| 1 | SETUP | M | CC-SETUP | M | 5.1.4.1.1 | M | |
| 2 | CALL PROCEEDING | M | CC-RELEASE-COM | M | 5.1.4.1.2 | C.1 | |
| 3 | CALL PROCEEDING | M | CC-CALL-PROCEEDING | M | 5.1.4.1.3 | C.2 | |

C.1: If Exchange attribute negotiation supported then M else X.
C.2: If Extended exchange parameter negotiation supported then M else X.

5.1.4.1.1. SETUP—CC-SETUP

TABLE 3

| Item No | Message coding GSM | Message coding DECT | Ref. | Map status | NOTE |
|---|---|---|---|---|---|
| 1 | SETUP bearer capability 1 | CC-SETUP iwu-attributes | 5.1.5.1.1 | M | 1. |
| 2 | lower layer compatibility | iwu-to-iwu | 5.1.5.1.3 | C1 | 1. |
| 2 | higher layer compatibility | iwu-to-iwu | 5.1.5.1.4 | C1 | 1. |

C1: IF PRESENT THEN O ELSE X
NOTE 1:
The GSM bearer capability information element has to be mapped into two DECT elements.

All other message mappings are done according to ETS 300 370 [31].

5.1.4.1.2. CALL PROCEEDING-CC-RELEASE-COM

TABLE 4

| Item No | Message coding GSM | Message coding DECT | Ref. | Map status | NOTE |
|---|---|---|---|---|---|
| 1 | CALL PROCEEDING bearer capability 1 | CC-RELEASE-COM iwu-attributes | 5.1.5.1.1 | C.1 | |

C.1: If Exchange attribute negotiation supported then M else X.

5.1.4.1.3. CALL PROCEEDING-CC-CALL-PROCEEDING

TABLE 5

| Item No | Message coding GSM | Message coding DECT | Ref. | Map status | NOTE |
|---|---|---|---|---|---|
| 1 | CALL PROCEEDING bearer capability 1 | CC-CALL-PROCEEDING iwu-attributes | 5.1.5.1.1 | C.1 | |

C.1: If Extended exchange parameter negotiation supported then M else X.

5.1.4.2. DECT to GSM

TABLE 6

| | List of mapped CC messages | | | | | |
|---|---|---|---|---|---|---|
| Item No | DECT message | Status in GAP | GSM message | Status in GSM | Ref. | Map status | Note |
| 1 | CC-SETUP | M | SETUP | M | 5.1.4.2.1 | M | |
| 2 | CC-CONNECT | M | CALL CONFIRMED | M | 5.1.4.2.2 | C.1 | |

C.1: If Extended exchange parameter negotiation supported then M else X.
All other message mappings are done according to ETS 300 370 [31].

5.1.4.2.1. CC-SETUP—SETUP

TABLE 7

| Item No | Message coding DECT | Message coding GSM | Ref. | Map status | NOTE |
|---|---|---|---|---|---|
| 1 | CC-SETUP iwu-attributes | SETUP bearer capability 1 | 5.1.5.2.1 | M | 1. |
| 2 | iwu-to-iwu | lower layer compatibility | 5.1.5.2.3 | C1 | 1 |
| 3 | iwu-to-iwu | higher layer compatibility | 5.1.5.2.4 | C1 | 1 |

C1: IF PRESENT THEN O ELSE X
NOTE 1:
The GSM bearer capability information element has to be mapped into two DECT elements.

5.1.4.2.2. CC-CONNECT—CALL CONFIRMED

TABLE 8

| Item No | Message coding DECT | Message coding GSM | Ref. | Map status | NOTE |
|---|---|---|---|---|---|
| 1 | CC-CONNECT iwu-attributes | CALL CONFIRMED bearer capability 1 | 5.1.5.2.1 | C.1 | 1. |

C.1: If Extended exchange attribute negotiation supported then M else X.
NOTE 1:
The GSM bearer capability information element has to be mapped into two DECT elements.

5.1.5. Information element mappings

5.1.5.1. DECT to GSM and GSM to DECT

5.1.5.1.1. Iwu-attributes—Bearer capability 1

The mapping is done between GSM standard element and a new IWU-ATTRIBUTES elements defiend in the subclause 6.

TABLE 9

| Item No | Information element coding DECT | Information element coding GSM | Ref. | Map status | Ref. in ETS 300 370 | NOTE |
|---|---|---|---|---|---|---|
| 1 | iwu-attributes ID for iwu attributes | bearer capability 1 Bearer capability IEI | | M | 6.1.8.1.4 | |
| 2 | Length of contents | Length of bearer capabilities contents | | M | 6.1.8.1.5 | |
| | — | Radio channel requirements | 7.1 | X | | Note 1 |
| 3 | Coding standard | Coding standard | 5.1.6.1.1 | M | | |
| 4 | Information transfer capability | Information transfer capability | 5.1.6.1.2 | M | | |
| 5 | Negotiation indicator | — | 7.1 | X | | Note 2 |
| 6 | Transfer mode | Transfer mode | 5.1.6.1.3 | M | | |
| 7 | Information transfer rate | — | 7.1 | M | | Note 2 |
| 8 | Structure | Structure | 5.1.6.1.4 | M | | |
| 9 | Duplex mode | Duplex mode | 5.1.6.1.4 | M | | |
| 10 | Configuration | Configuration | 5.1.6.1.4 | M | | |
| 11 | NIRR | NIRR | 5.1.6.1.4 | M | | |
| 12 | Establishment | Establishment | 5.1.6.1.4 | M | | |
| 13 | Access identity | Access identity | 5.1.6.1.4 | M | | |
| 14 | Rate adaptation | Rate adaptation | 5.1.6.1.4 | M | | |
| 15 | Signaling access protocol | Signalling access protocol | 5.1.6.1.4 | M | | |
| 16 | Layer 1 identity | Layer 1 identity | 5.1.6.1.4 | M | | |
| 17 | User information layer 1 protocol | User information layer 1 protocol | 5.1.6.1.4 | M | | |
| 18 | Synchronous/ asynchronous | Synchronous/ asynchronous | 5.1.6.1.4 | M | | |
| 19 | Number of stop bits | Number of stop bits | 5.1.6.1.4 | M | | |
| 20 | Negotiation | Negotiation | 5.1.6.1.4 | M | | |
| 21 | Number of data bits excluding parity bit if present | Number of data bits excluding parity bit if present | 5.1.6.1.4 | M | | |
| 22 | User rate | User rate | 5.1.6.1.4 | M | | |
| 23 | Intermediate rate | Intermediate rate | 5.1.6.1.4 | M | | |
| 24 | Network independent clock on transmission | Network independent clock on transmission | 5.1.6.1.4 | M | | |
| 25 | Network independent clock on reception | Network independent clock on reception | 5.1.6.1.4 | M | | |
| 26 | Parity information | Parity information | 5.1.6.1.4 | M | | |
| 27 | Connection element | Connection element | 5.1.6.1.4 | M | | Note 3 |
| 28 | Modem type | Modem type | 5.1.6.1.4 | M | | |
| 29 | Layer 2 identity | Layer 2 identity | 5.1.6.1.4 | M | | |
| 30 | User information layer 2 protocol | User information layer 2 protocol | 5.1.6.1.4 | M | | |

NOTE 1.
This field is not mapped between the DECT and GSM systems since it has no meaning for DECT.
NOTE 2.
This field is not mapped between the DECT and GSM systems since it has no meaning for GSM. It is used only for DECT air interface purposes.
NOTE 3.
This field has no meaning for the DECT air interface but to the selection or the indication of the service provided by the IWU towards GSM PLMN.

5.1.5.1.2. Lower layer compatibility—Iwu-to-iwu

If the <<Lower layer compatibility>> information element is contained in GSM CC messages, it is mapped intact into <<iwu-to-iwu>> packet <<iwu-to-iwu-information>> field. The information element <<Protocol discriminator>> in <<iwu-iwu>> packet will contain coding "010001"B "GSM Recommendation 04.08, elements".

5.1.5.1.3. Higher layer compatibility—Iwu-to-iwu

If the <<Higher layer compatibility>> information element is contained in GSM CC messages, it is mapped intact into <<iwu-to-iwu>> packet <<iwu-to-iwu-information>> field. The information element <<Protocol discriminator>> in <<iwu-to-iwu>> packet will contain coding "010001"B "GSM Recommendation 04.08, elements".

5.1.6. Fields in information element coding 5.1.6.1. GSM to DECT and DECT to GSM 5.1.6.1.1. Coding standard—Coding standard

TABLE 13

| Item No | Field(s) coding GSM | Field(s) coding DECT | Ref. | Map status | Ref. in ETS 300 370 | NOTE |
|---|---|---|---|---|---|---|
| 1 | Coding standard "0"B | Coding standard "01"B | 6.2. | M | | GSM coding |
| 2 | "1"B | — | | I | | reserved |
| | — | "00"B | | I | | DECT coding |

5.1.6.1.2. Transfer mode—transfer mode

TABLE 14

| Item No | Field(s) coding GSM | Field(s) coding DECT | Ref. | Map status | Ref. in ETS 300 370 | NOTE |
|---|---|---|---|---|---|---|
| 1 | transfer mode "0"B | transfer mode "00"B | | M | | circuit mode |
| 2 | "1"B | "10"B | | M | | packet mode |
| 3 | — | "11"B | | I | | None |

5.1.6.1.3. Information transfer capability—information transfer capability

TABLE 15

| Item No | Field(s) coding GSM | Field(s) coding DECT | Ref. | Map status | Ref. in ETS 300 370 | NOTE |
|---|---|---|---|---|---|---|
| 1 | Information transfer capability "000"B | Information transfer capability "00000"B | | 0 | | Speech (1.) |
| 2 | "001"B | "01000"B | | M | | Unrestricted digital |
| 3 | "010"B | "10000"B | | M | | 3.1 kHz audio ex. PLMN (2.) |
| 4 | "011"B | "10100"B | | M | | facsimile group 3 |
| 5 | "100"B | | | I | | speech followed by unrestr. digit. inform. |
| 6 | "111"B | | | I | | alternate speech/fax |
| 7 | — | "01001"B | | I | | Restricted digital info |
| 8 | — | "10001"B | | I | | 7.0 kHz audio |
| 9 | — | "11000"B | | I | | Video |

NOTE 1.
Coding will probably not be used especially Speech
NOTE 2.
This coding is used when connection through PLMN is done to a PSTN Modem.

5.1.6.1.4. General coding priciple for other fields

This field does not require mapping between DECT and GSM. That is, the coding of GSM field and DECT field are identical thus the value of the field does not change in IWU and it can be copied as it is between systems.

5.2. FP U-plane IWU Procedures 5.2.1. General

This section defines the functional requirements of the FP IWU for the mapping of the user data and the C.2 data profile U-plane flow. Both Transparent and Non-Transparent options have been decribed. However, it is not a mandatory requirement to support both options. It is recommended to provide the Non Transparent interworking since its functionality is closer to the DECT air interface oprreation of LAPU. The PP may select the interworking of T or NT services with the coding in the field <<Connection element>> of <<iwu-attributes>>.

5.2.2. Transparent service (T)

5.2.2.1. General

Due to usage of LAPU no complete synchronism between the endpoints can be guaranteed.

The rate adaptation of the GSM data flow will be done in the FP IWU. A general structure of the rate adaptation function is illustrated in FIG. 17. In the figure it is assumed that the FP is connected to the MSC through the A interface. The functionality of the IWU is to map the synchronous, asynchronous and status data to respective DECT C.2 profile functionality. FP seen by the MSC correspond to the GSM MS TAF functionality.

5.2.2.1.1. Asynchronous

The FP IWU will contain the V.110 RA2, RA1 and RA0 adaptation functions. The information of the RA0 and RA1 will be mapped as follows:

the CCITT V series status information of RA1 will be mapped to the C.2 LAPU Control frame as defined in subclause 5.2.2.3 of this document. The status octets are not carried in the LAPU information frames.

user information of the RA0 will be forwarded C.2 PAD function defined in the subclause 10.1 of the DECT C.2 data profile [30] following the rules defined in the same subclause. The LAPU frame lengths should be adjusted to fit the buffering requirements related to the transparent service.

5.2.2.1.2. Synchronous

The FP IWU will contain the V.110 RA2 and RA1 adaptation functions. The information from the RA1 will be mapped as follows:

the CCITT V series status information of RA1 will be mapped to the respective DECT function defined in the subclause 5.2.2.2 of this document. The status octets are not carried in the LAPU information frames.

user information of the RA0 will be forwarded C.2 BPAD function defined in the subclause 10.2 of the DECT C.2 data profile [30] following the rules defined in the same subclause. The LAPU frame lengths should be adjusted to fit the buffering requirements related to the transparent service.

5.2.2.2. CCITT V.24 Interchange circuit signalling mapping

The CCITT V.24 signalling status information will be mapped between the DECT LAPU control frame function and respective GSM function as follows.

DECT C.2 Data profile Control Status octet defined in C.2 data profile [30] subclause 10.3 is used with <<Frame type coding>> indicating V.24 status interworking.

the status change of the V.24 interface circuits 108, 107, 105, 109 and 106 mapping will be done as shown in tables 24 and 25.

In the direction of GSM to DECT only in the change situation of a status of each SA, SB or X bit will be mapped thus if not change has occurred in the status bit of GSM data flow not LAPU control frame is sent.

In the direction of DECT to GSM the FP IWU will map the old status of a status bit towards GSM if no LAPU control frames with new value has received.

the status of the CCITT V.24 circuits 106 and 105 is mapped into/from the PAD/BPAD flow control

TABLE 24

| Item No | V.24 circuit in direction of GSM => DECT | V.110 bit | DECT LAPU control frame bit | Note |
|---|---|---|---|---|
| 1 | 107 | S1, S2, S3, S6, S8 = SA | DSR coding | DSR |
| 2 | 109 | S4 S9 = SB | DCD coding | CD |
| 3 | 106 | X | Ignored | CTS Note 1. |

TABLE 25

| Item No | V.24 circuit in direction of DECT => GSM | V.110 bit | DECT LAPU control frame bit | Note |
|---|---|---|---|---|
| 1 | 108 | S1, S2, S3 S6, S8 = SA | DTR coding | DTR |
| 2 | 105 | S4, S9 = SB | Ignored | RTS Note 1. |
| 3 | 106 | X | Ignored | CTS Note 1. |

NOTE 1.
DECT provides its own flow control mechanism and end-to-end flow control is not recommended. See subclauses 5.2.2.3 and 5.2.3.3.

5.2.2.3. Flow control

The flow control situation indicated by the X-bit or buffers backpressure are mapped into the C.2 data profile [30] PAD/BPAD flow control functionality as defined in respective C.2 profile PAD/BPAD subclauses. It is the matter of implementation to ensure that no data loss occur in flow control.

5.2.2.4. Call establishment signalling mapping

The mapping between DECT call establishment in the FP IWU is done as defined in the ETS 300 370 [31] and in this document in subclause 5.

5.2.3. Non-transparent service (NT)

5.2.3.1. General

The rate adaptation of the GSM data flow will take place in the FP IWU. A general figure of the rate adaptation functions of GSM non-transparent (NT) case is illustrated in FIG. 18. In the figure it is assumed that the FP is connected to the MSC through the A interface.

The RLP entity and LAPU entity in FP will function completely independently. That is, frame retransmissions and control information regarding RLP and LAPU functions are not dependent of each other.

5.2.3.1.1. Asynchronous

The FP IWU will contain the RA2, RA1, RLP and L2COP functions. The information from the L2COP will be mapped as follows:

The status octets are not carried in the LAPU information frames.

the status bit (3 first bits) information of the status octet will be mapped to the respective DECT function defined in the subclause 5.2.2.3.

character octets will be forwarded to the C.2 PAD function as defined in the subclause 10.1 of the DECT C.2 data profile [30] following the rules defined in the same subclause.

fill octets are not forwarded to the C.2. PAD function.

break signal status received from GSM direction is mapped into the LAPU control frame <<Break coding>> with indication of "Break condition occurred". The duration of the break signal in the BREAK/PAUSE duration octet should be in between 135 ms and 200 ms as defined by GSM 07.02 [33].

break signal status received from DECT direction is mapped into the L2COP address field as defined in the GSM 07.02 [33]. The duration information is ignored.

5.2.3.1.2. Synchronous

The FP IWU will contain the RA2, RA1, RLP and L2BOP functions. The information of the L2BOP will be mapped as follows:

The status octets are not carried in the LAPU information frames.

the status bit (3 first bits) information of the status octet will be mapped to the respective function defined in the subclause 5.2.2.3.

the address bit (5 last bits) information of the status octet is utilized as follows: if address has the value 31 no L2BOP remaining information is forwarded to LAPU information frame. Other address values are ignored.

user information will be forwarded to the C.2 BPAD function as defined in the subclause 10.1 of the DECT C.2 data profile [30] following the rules defined in the same subclause.

fill octets are not inserted to the C.2 LAPU octets.

5.2.3.2. Interchange circuit signalling mapping

See sublause 5.2.2.2.

5.2.3.3. Flow control

The flow control situation indicated by the X-bit or buffers backpressure are mapped into the C.2 data profile [30] PAD/BPAD flow control functionality as defined in respective C.2 profile PAD/BPAD subclauses. It is the matter of implementation to ensure that no data loss occur in flow control.

5.2.3.4. Call establishment signalling mapping See subclause 5.2.2.4.

5.2.4. Synchronization

It is the responisbilty of the FP to guarantee that no user data is conveyed before both RLP and LAPU links have been succefully established. No CCITT V.24 signalling information is conveyed before information regarding the ready status of the MSC-network connection is guaranteed.

5.3. PP C-plane IWU Procedures

For CCITT V.24 interworking of the PP C-plane procedures are recommended as defined in the C.2 data profile C.2 TAF annex [30].

The mapping between the PP C-plane and V.25bis commands is done according to the C.2 data profile annex C.2 [30].

5.4. PP U-plane IWU Procedures

For CCITT V.24 interworking of the PP U-plane procedures are recommended as defined the C.2 data profile C.2 TAF annex.

6. ADDITIONS TO THE BASE STANDARD

The following changes and additions should be done to the DECT Common interface standard in order to facilitate the optional service negotiation options.

6.1. Extended Exchange Parameter Negotiation

A new structure of the {CC-CALL-PROCEEDING} and {CC-CONNECT} messages is presented below. The subclause numbers are referring the respective clauses in ETS 300 175-5 [5] standard. A new coding has to be added into the <<IWU-ATTRIBUTES>>.

6.1.1. {CC-CALL-PROCEEDING} message
6.3.2.4CC-CALL-PROCeeding

This message indicates that the requested (onward) connection establishment has been initiated by the fixed side interworking unit.

| Message Type<br>CC-CALL-PROCeeding | | Format<br>S | Directions<br>F=>P | |
|---|---|---|---|---|
| Information<br>Element | Sub-<br>clause | F to P<br>message | P to F<br>message | Length<br>oct |
| Protocol Discriminator | 7.2 | M | — | — |
| Transaction Identifier | 7.3 | M | — | — |
| Message Type | 7.4 | M | — | 1 |
| Call Attributes 3 | 7.7.11 | O | — | 6–11 |
| Connection identity | 7.7.12 | O | — | 3–* |
| Facility | 7.7.15 | O | — | 2–* |
| Progress indicator | 7.7.31 | O | — | 4 |
| Display | 7.5.5 | O | — | 2–* |
| Signal 2 | 7.6.8 | O | — | 2 |
| Feature Indicate | 7.7.17 | O | — | 4–* |
| Transit Delay 4 | 7.7.42 | O | — | 4 |
| Window size 4 | 7.7.43 | O | — | 4 |
| IWU attributes 5 | 7.7.21 | O | — | 5–12 |
| IWU-TO-IWU | 7.7.23 | O | — | 4–* |
| IWU-PACKET | 7.7.22 | O | — | 4–* |

M = Mandatory;
O = Optional;
— = not applicable.
NOTE 1: This message may be used in the direction P=>F when using the "OVERLAP RECEIVING" operations.
NOTE 2: Included if the FT optionally provides additional information describing tones.
NOTE 3: Included if prioritized list negotiation is used.
NOTE 4: Included if operational parameter negotiation is used.
NOTE 5: The <<IWU-ATTRIBUTES>> element shall be included if extended exchanged parameter negotiation is supported.

6.1.2. {CC-CONNECT} messages
6.3.2.6 CC-CONNECT

This message is sent by the FT to indicate completion of the connection through the WCPE network, and by the PT to request such completion.

| Message Type<br>CC-CONNECT | | Format<br>S | Directions<br>Both | |
|---|---|---|---|---|
| Information Element<br>ANSI/TIA Standard | Sub-<br>clause | F to P<br>message | P to F<br>message | Length<br>oct |
| Protocol Discriminator | 7.2 | M | M | — |
| Transaction Identifier | 7.3 | M | M | — |
| Message Type | 7.4 | M | M | 1 |
| Call Attributes 2 | 7.7.11 | O | O | 6–11 |
| Connection identity | 7.7.12 | O | O | 3–* |
| Facility | 7.7.15 | O | O | 2–* |
| Progress Indicator | 7.7.31 | O | N | 4 |
| Display | 7.5.5 | O | N | 2–* |
| Signal 1 | 7.6.8 | O | N | 2 |
| Feature Indicate | 7.7.17 | O | N | 4–* |
| Terminal capability | 7.7.41 | N | O | 3–7 |
| Transit Delay 3 | 7.7.42 | O | O | 4 |
| Window size 3 | 7.7.43 | O | O | 4 |
| IWU attributes 4 | 7.7.21 | O | O | 5–12 |
| IWU-TO-IWU | 7.7.23 | O | O | 4–* |
| IWU-PACKET | 7.7.22 | O | O | 4–* |

M = Mandatory;
N = Not allowed;
O = Optional;
NOTE 1: Included if the FT optionally provides additional information describing tones.
NOTE 2: Included if prioritised list negotiation is used.
NOTE 3: Included if operational parameter negotiation is used.
NOTE 4: The <<IWU-ATTRIBUTES>> element shall be included if extended exchanged parameter negotiation is supported.

6.2. New GSM Coding of the <<IWU-ATTRIBUTES>>

The following new coding that is a combination of DECT and GSM coding is required for GSM interworking.

InterWorking Unit (IWU) attributes

The purpose of the <<IWU-ATTRIBUTES>> element is to provide a means for service compatibility information to be exchanged (e.g. between a PP application and a FP interworking unit). This element is transferred transparently by the DECT protocol entities.

| Bit: 8 | 7 | 6 | 5 | 4 | 3 | 2 | 1 | Octet: |
|---|---|---|---|---|---|---|---|---|
| 0 | << IWU-ATTRIBUTES >> | | | | | | | 1 |
| Length of Contents (L) | | | | | | | | 2 |
| 1 | Coding:<br>GSM | | Information transfer capability | | | | | 3 |
| 1 | Negotiaiotion<br>indicator | | External connection type | | | | | 4 |
| 0/1<br>ext | Trans<br>mode | | Information transfer rate | | | | | 5 |
| 1 | 0<br>spare | structure | | dupl<br>mod | con<br>fig. | NIR | establ. | 6 |
| 1 | access id. | | rate adapt. | | signalling access<br>protocol | | | 7 |
| 0/1<br>ext | layer 1 id. | | User information layer<br>1 protocol | | | | S/A | 8 |
| 0/1<br>ext | S.<br>bits | neg<br>ot. | data<br>bits | User rate | | | | 8a |
| 0/1<br>ext | Interm.<br>rate | | NIC<br>on<br>TX | NIC<br>on<br>RX | Parity | | | 8b |
| 1 | Connecting<br>element | | Modern type | | | | | 8c |
| 1 | Layer 2 id. | | User information layer 2<br>protocol | | | | | 9 |

IWU-ATTRIBUTES information element

Coding standard (octet 3):
Bits 7 6 Meaning
    0 0 DECT standard coding

01 GSM standard coding

All other values reserved.

Information transfer capability (octet 3):

Bits 5 4 3 2 1 Meaning
    0 0 0 0 0 Speech
    0 1 0 0 0 Unrestricted digital information
    0 1 0 0 1 Restricted digital information
    1 0 0 0 0 3,1 kHz audio
    1 0 0 0 1 7,0 kHz audio
    1 0 1 0 0 Fax
    1 1 0 0 0 Video
All other values reserved.

-continued

Negotiation indicator (octet 4):

| Bits | 7 | 6 | 5 | Meaning |
|---|---|---|---|---|
| | 0 | 0 | 0 | Negotiation not possible |
| | 1 | 0 | 0 | Exchanged parameter negotiation |
| | 1 | 0 | 1 | Extended exchange parameter negotiation |

All other values reserved.

External connection type (octet 4):

| Bits | 4 | 3 | 2 | 1 | Meaning |
|---|---|---|---|---|---|
| | 0 | 0 | 0 | 0 | Not applicable |
| | 0 | 0 | 0 | 1 | Connection oriented |
| | 0 | 0 | 1 | 0 | Permanent Virtual Circuit |
| | 0 | 0 | 1 | 1 | Non-permanent Virtual Circuit |
| | 0 | 1 | 0 | 0 | Datagram |
| | 1 | 0 | 0 | 0 | Connectionless |

All other values reserved.

Transfer mode (octet 5):

| Bits | 7 | 6 | Meaning |
|---|---|---|---|
| | 0 | 0 | Circuit mode |
| | 1 | 0 | Packet mode |
| | 1 | 1 | None (no transfer mode required) |

All other values reserved.

Information transfer rate (octet 5):

| Bits | 5 | 4 | 3 | 2 | 1 | |
|---|---|---|---|---|---|---|
| | 0 | 0 | 0 | 0 | 0 | Packet mode calls |
| | 0 | 1 | 0 | 1 | 0 | 16 kbps |
| | 0 | 1 | 0 | 1 | 1 | 32 kbps |
| | 1 | 0 | 0 | 0 | 0 | 64 kbps |
| | 1 | 0 | 0 | 0 | 1 | 2 × 64 kbps |
| | 1 | 0 | 0 | 1 | 1 | 384 kbps |
| | 1 | 1 | 1 | 1 | 0 | Unspecified |

All other values reserved.

Structure (octet 6)

| | 6 | 5 | Meaning |
|---|---|---|---|
| | 0 | 0 | SDU integrity |
| | 1 | 1 | Unstructured |

All other values reserved.

Duplex mode (octet 6)

| | 4 | Meaning |
|---|---|---|
| | 0 | half duplex |
| | 1 | full duplex |

Configuration (octet 6):

| Bits | 3 | Meaning |
|---|---|---|
| | 0 | point-to-point |

All other values reserved.

NIRR (octet 6) (Negotiation of Intermediate Rate Requested)

| Bits | 2 | Meaning |
|---|---|---|
| | 0 | No meaning is associated with this value |
| | 1 | Data up to and including 4.8 kb/s, full rate, non-transparent, 6 kb/s radio interface rate is requested |

Establishment (octet 6):

| Bits | 1 | Meaning |
|---|---|---|
| | 0 | demand |

All other values reserved.

Access identity (octet 7):

| Bits | 7 | 6 | Meaning |
|---|---|---|---|
| | 0 | 0 | octet identifier |

All other values reserved.

Rate adaption (octet 7):

| Bits | 5 | 4 | Meaning |
|---|---|---|---|
| | 0 | 0 | no rate adaption |
| | 0 | 1 | V.110/X.30 rate adaption |
| | 1 | 0 | CCITT X.31 flag stuffing |

All other values reserved.

Signalling access protocol (octet 7):

| Bits | 3 | 2 | 1 | Meaning |
|---|---|---|---|---|
| | 0 | 0 | 1 | I.440/450 |
| | 0 | 1 | 0 | X.21 |
| | 0 | 1 | 1 | X.28 - dedicated PAD, individual NUI |
| | 1 | 0 | 0 | X.28 - dedicated PAD, universal NUI |
| | 1 | 0 | 1 | X.28 - non dedicated PAD |
| | 1 | 1 | 0 | X.32 |

All other values reserved.

Layer 1 identity (octet 8):

| Bits | 7 | 6 | Meaning |
|---|---|---|---|
| | 0 | 0 | octet identifier |

All other values reserved.

User information layer 1 protocol (octet 8):

| Bits | 5 | 4 | 3 | 2 | Meaning |
|---|---|---|---|---|---|
| | 0 | 0 | 0 | 0 | default layer 1 protocol |

All other values reserved.

Synchronous/asynchronous (octet 8)

| | 1 | Meaning |
|---|---|---|
| | 0 | synchronous |
| | 1 | asynchronous |

Number of Stop Bits (octet 8a)

| Bits | 7 | Meaning |
|---|---|---|
| | 0 | 1 bit (This value is also used in the case of synchronous mode) |
| | 1 | 2 bits |

Negotiation (octet 8a)

| Bits | 6 | Meaning |
|---|---|---|
| | 0 | in-band negotiation not possible |

All other values reserved.

NOTE: See Rec. V.110 and X.30

-continued

Number of data bits excluding parity bit (octet 8a)

| 5 | Meaning |
|---|---|
| 0 | 7 bits |
| 1 | 8 bits (this value is also used in the case of bit oriented protocols) |

User rate (octet 8a):

| Bits | 4 | 3 | 2 | 1 | Meaning |
|---|---|---|---|---|---|
| | 0 | 0 | 0 | 1 | 0.3 kbit/s Recommendation X.1 and V.110 |
| | 0 | 0 | 0 | 1 | 0.3 kbit/s Recommendation X.1 and V.110 |
| | 0 | 0 | 1 | 0 | 1.2 kbit/s Recommendation X.1 and V.110 |
| | 0 | 0 | 1 | 1 | 2.4 kbit/s Recommendation X.1 and V.110 |
| | 0 | 1 | 0 | 0 | 4.8 kbit/s Recommendation X.1 and V.110 |
| | 0 | 1 | 0 | 1 | 9.6 kbit/s Recommendation X.1 and V.110 |
| | 0 | 1 | 1 | 0 | 12.0 kbit/s transparent (non compliance with X.1 and V.110) |
| | 0 | 1 | 1 | 1 | 1.2 kbit/s/75 bit/s Recommendation V.23, (asymmetric) X.1, V.110. |
| All other values reserved. | | | | | |

NOTE: For facsimile group 3 calls the user rate indicates the first and maximum speed the mobile station is using.

Octet 8b for V.110/X.30 rate adaption
Intermediate rate (octet 8b):

| Bits | 7 | 6 | Meaning |
|---|---|---|---|
| | 1 | 0 | 8 kbit/s |
| | 1 | 1 | 16 kbit/s |
| All other values reserved. | | | |

Network independent clock (NIC) on transmission (Tx) (See Rec. V.110 and X.30) (octet 8b)

| Bits | 5 | Meaning |
|---|---|---|
| | 0 | does not require to send data with network independent clock |
| | 1 | requires to send data with network independent clock |

Network independent clock (NIC) on reception (Rx) (See Rec. V.110 and X.30) (octet 8b)

| Bits | 4 | Meaning |
|---|---|---|
| | 0 | cannot accept data with network independent clock (i.e. sender does not support this optional procedure) |
| | 1 | can accept data with network independent clock (i.e. sender does support this optional procedure) |

Parity information (octet 8b):

| Bits | 3 | 2 | 1 | Meaning |
|---|---|---|---|---|
| | 0 | 0 | 0 | odd |
| | 0 | 1 | 0 | even |
| | 0 | 1 | 1 | none |
| | 1 | 0 | 0 | forced to 0 |
| | 1 | 0 | 1 | forced to 1 |
| All other values reserved. | | | | |

Connection element (octet 8c):

| Bits | 7 | 6 | Meaning |
|---|---|---|---|
| | 0 | 0 | transparent |
| | 0 | 1 | non transparent (RLP) |
| | 1 | 0 | both, transparent preferred |
| | 1 | 1 | both, non transparent preferred |
| All other values reserved. | | | |

The requesting end (e.g. the one sending the SETUP message) should use the 4 values depending on its capabilities to support the different modes. The answering party shall only use the codings 00 or 01, based on its own capabilities and the proposed choice if any. If both MS and network support both transparent and non transparent, priority should be given to the MS preference.

Modem type (octet 8c):

| Bits | 5 | 4 | 3 | 2 | 1 | Meaning |
|---|---|---|---|---|---|---|
| | 0 | 0 | 0 | 0 | 0 | none |
| | 0 | 0 | 0 | 0 | 1 | V.21 |
| | 0 | 0 | 0 | 1 | 0 | V.22 |
| | 0 | 0 | 0 | 1 | 1 | V.22 bis |
| | 0 | 0 | 1 | 0 | 0 | V.23 |
| | 0 | 0 | 1 | 0 | 1 | V.26 ter |
| | 0 | 0 | 1 | 1 | 0 | V.32 |
| | 0 | 0 | 1 | 1 | 1 | modem for undefined interface |
| | 0 | 1 | 0 | 0 | 0 | autobauding type 1 |
| All other values reserved. | | | | | | |

Layer 2 identity (octet 9):

| Bits | 7 | 6 | Meaning |
|---|---|---|---|
| | 0 | 0 | octet identifier |
| All other values reserved. | | | |

User information layer 2 protocol (octet 9):

| Bits | 5 | 4 | 3 | 2 | 1 | Meaning |
|---|---|---|---|---|---|---|
| | 0 | 0 | 1 | 1 | 0 | recommendation X.25, link level |
| | 0 | 1 | 0 | 0 | 0 | ISO 6429, codeset 0 (DC1/DC3) |
| | 0 | 1 | 0 | 0 | 1 | X.75 layer 2 modified (teletex) |
| | 0 | 1 | 0 | 1 | 0 | videotex profile 1 |
| | 0 | 1 | 1 | 0 | 0 | COPnoFlCt (Character oriented Protocol with no Flow Control mechanism) |
| All other values reserved. | | | | | | |

7. Interworking Connection Types 7.1. Connection Type Definitions

The supported bearer services are defined in subclause 4.4.2 in table 1. The codings used for the bearer services are as defiend in GS 07.01 [32].

<<Radio channel requirement>> field

The <<Radio channel requirement>> field GSM <<Bearer capability>> element use the standard value defined for it in 07.01 [32]. That is, the element mapping has not been defined in this document thus the value of the field is ignored in the direction from GSM to DECT and the standard value is used in the direction from DECT to GSM mapping.

<<Negotiation indicator>> field

The <<Negotiation indicator>> field of the <<iwu-attributes>> element contains information important only to DECT part. That is, the GSM PLMN does not use this field.

<<Information transfer rate>> field

<<Informaton transfer rate>> field of the <<iwu-attributes>> element contains the value unspecifed in this context. That is, the GSM PLMN does not use this field and it has no meaning in DECT air interface nor in GSM interworking.

What is claimed is:

1. A method for using data services of a first telecommunication system from a terminal (26) of a second telecommunication system by means of a base station (20) and a switching centre (1), comprising steps of:

performing in the base station rate adaptations and mappings required for the conversions of data between the format of said first telecommunication system and the format of said second telecommunication system, wherein the first telecommunication system is a GSM system and the second telecommunication system is a DECT system, and wherein the step of performing rate adaptations and mappings includes a step of performing rate adaptations RA2 and RA1 conforming to a CCITT V.110 standard, as well as a mapping between the RA1 rate adaptation and at least two separate parallel operating protocol entities of the DECT system, for a conversion of transmission rate between a transmission rate used between the switching centre and the base station and a lower synchronous transmission rate.

2. The method of claim 1, wherein in said base station there is also performed rate adaptation RA0 (24) conforming to the CCITT V.110 standard, required for the conversions of the transmission format between the synchronous and asynchronous transmission modes.

3. The method of claim 1, wherein in said base station there is also performed steps of:

forming L2COP protocol units according to the GSM standard GSM 07.02 or L2BOP protocol units according to the GSM standard GSM 07.03;

forming RLP frames according to the GSM standard GSM 04.22 for data transferred from said terminal to said switching centre; and unpacking the RLP frames according to the GSM standard GSM 04.22 and the L2COP protocol units according to the GSM standard GSM 07.02 or L2BOP protocol units according to the GSM standard GSM 07.03 for data transferred from said switching centre to said terminal.

4. The method of claim 1, wherein in said base station there is also performed for data transferred a fax adaptation according to the T.30 standard.

5. The method of claim 1, wherein when establishing a connection from said terminal to said switching centre using a service negotiation function according to the GSM standard, said base station, as a response to a "Call proceeding" message (56) sent by said switching centre and containing in the <<bearer capability>> record a value set by said switching centre representing the negotiable connection parameter, maps the value in question into a certain record in the CC-CALL-PROCEEDING message (57) sent to said terminal (26).

6. The method of claim 5, wherein said certain record is at least one of an <<END-TO-END-COMPATIBILITY>> record or an <<IWU-ATTRIBUTES>> record.

7. The method of claim 5, wherein said negotiable connection parameter is comprised of a modem type.

8. The method of claim 1, wherein when establishing a connection from said switching centre to said terminal using a service negotiation function according to the GSM standard, the method further comprises steps of:

said terminal, as a response to a CC-SETUP message (65) sent by said base station, adds negotiable connection parameters to a certain record in a CC-CONNECT message (67) which it has sent to said base station 20, and said base station, as a response to said CC-CONNECT message (67), maps said negotiable connection parameters into a <<bearer capability>> record in a "Call Confirmed" message (68) sent to said switching centre.

9. The method of claim 8, wherein said certain record is at least one of a <<IWU-ATTRIBUTES>> or an <<END-TO-END-COMPATIBILITY>> record.

10. The method of claim 7, wherein said negotiable connection parameter is comprised of at least one of: a number of data, stop and parity bits, use of a user layer 2 protocol, and modem type.

11. A method as in claim 1, wherein the at least two separate parallel operating protocol entities of the DECT system are BPAD and Ctrl.

12. Equipment, including a base station (20), for using data services of a first telecommunication system from a terminal (26) of a second telecommunication system, said base station comprising means for performing rate adaptations and mappings required for the conversions of data between the format of said first telecommunication system and the format of said second telecommunication system, wherein the first telecommunication system is a GSM system and the second telecommunication system is a DECT system, and wherein said base station comprises means for performing rate adaptations and mappings includes a step of performing rate adaptations RA2 and RA1 conforming to a CCITT V.110 standard, as well as a mapping between the RA1 rate adaptation and at least two separate parallel operating protocol entities of the DECT system, for converting a transmission rate between a transmission rate used between a GSM switching centre and said base station and a lower synchronous transmission rate.

13. The equipment of claim 12, wherein said base station (20) further comprises:

means for performing rate adaptation RA0 (24) according to the CCITT V.110 standard, required for the conversions of the transmission format between the synchronous and asynchronous transmission modes.

14. The equipment of claim 12, wherein said base station (20) further comprises:

means for forming L2COP protocol units according to the GSM standard GSM 07.02 or L2BOP protocol units according to the GSM standard GSM 07.03;

means for performing RLP framing according to the GSM standard GSM 04.22 for data transferred from said terminal to said switching centre; and means for unpacking RLP frames according to the GSM standard GSM 04.22 and the L2COP protocol units according to the GSM standard GSM 07.02 or L2BOP protocol units according to the GSM standard GSM 07.03 for data transferred from said switching centre to said terminal.

15. The equipment of claim 12, wherein the at least two separate parallel operating protocol entities of the DECT system are BPAD and Ctrl.

16. A Digital European Cordless Telecommunications (DECT) fixed part for coupling to a DECT portable part, said DECT fixed part comprising an interworking unit (IWU) that comprises:

means for performing data rate adaptations RA2 and RA1 conforming to a CCITT V.110 standard, as well as a mapping between the RA1 rate adaptation and at least two separate parallel operating protocol entities of the DECT system, for converting a transmission rate between a transmission rate used between a Global System for Mobile Communications (GSM) switching center and said DECT fixed part and a lower synchronous transmission rate;

means for performing rate adaptation RA0 (24) according to the CCITT V.110 standard for converting a transmission format between a synchronous transmission mode and an asynchronous transmission mode;

means for forming L2COP protocol units according to the GSM standard GSM 07.02 or L2BOP protocol units according to the GSM standard GSM 07.03;

means for forming Radio Link Protocol (RLP) frames according to the GSM standard GSM 04.22 for data transferred from said DECT portable part to said GSM switching center; and means for unpacking RLP frames according to the GSM standard GSM 04.22 and the L2COP protocol units according to the GSM standard GSM 07.02 or L2BOP protocol units according to the GSM standard GSM 07.03 for data transferred from said GSM switching center to said DECT portable part.

17. The DECT fixed part of claim 16, wherein the at least two separate parallel operating protocol entities of the DECT system are BPAD and Ctrl.

18. A method for using data services of a first telecommunication system from a terminal of a second telecommunication system by means of a base station and a switching center, comprising steps of: converting data between a format of the first telecommunication system and a format of the second telecommunication system;

the step of converting comprising a step of performing in the base station any rate adaptations and mappings required for converting the data, and including a step of performing rate adaptations RA2 and RA1 conforming to a CCITT V.110 standard for a conversion of transmission rate between a transmission rate used between the switching center and the base station and a lower synchronous transmission rate, wherein the mappings comprise a mapping between the RA1 rate adaptation and a plurality of separate parallel operating protocol entities.

19. The method of claim 18, wherein in the base station there is also executed a step of performing rate adaptation RA0 conforming to the CCITT V.110 standard, required for the conversion of a transmission format between synchronous and asynchronous transmission modes.

20. A method as in claim 18, wherein the plurality of separate parallel operating protocol entities are BPAD and Ctrl of a Digital European Cordless Telecommunications (DECT) system.

21. A base station, comprising:

means for using data services of a first telecommunication system from a terminal of a second telecommunication system by means of said base station in cooperation with a switching center coupled to said base station;

said using means comprising means for converting data between a format of the first telecommunication system and a format of the second telecommunication system by performing rate adaptations and mappings required for converting the data, including rate adaptations RA2 and RA1 conforming to a CCITT V.110 standard for a conversion of transmission rate between a transmission rate used between the switching center and the base station and a lower synchronous transmission rate, wherein the mappings comprise a mapping between a predetermined one of the rate adaptations and a plurality of separate parallel operating protocol entities.

22. The base station of claim 21, wherein said using means further comprises means for performing rate adaptation RA0 conforming to the CCITT V.110 standard, required for the conversion of a transmission format between synchronous and asynchronous transmission modes.

23. A base station as in claim 21, wherein the predetermined one of the rate adaptations is the RA1 rate adaptation, and wherein the plurality of separate parallel operating protocol entities are BPAD and Ctrl of a Digital European Cordless Telecommunications (DECT) system.

* * * * *